(12) United States Patent
Taylor

(10) Patent No.: US 10,563,084 B2
(45) Date of Patent: Feb. 18, 2020

(54) ACID-CONTAINING POLYMERS AS COALESCING AGENTS FOR LATEXES

(71) Applicant: BASF SE, Ludwigshafen am Rhein (DE)

(72) Inventor: James W. Taylor, Grosse Ile, MI (US)

(73) Assignee: BASF SE, Ludwigshafen (DE)

( * ) Notice: Subject to any disclaimer, the term of this patent is extended or adjusted under 35 U.S.C. 154(b) by 40 days.

(21) Appl. No.: 15/541,223

(22) PCT Filed: Dec. 16, 2015

(86) PCT No.: PCT/EP2015/079947
§ 371 (c)(1),
(2) Date: Jun. 30, 2017

(87) PCT Pub. No.: WO2016/107744
PCT Pub. Date: Jul. 7, 2016

(65) Prior Publication Data
US 2018/0002563 A1    Jan. 4, 2018

Related U.S. Application Data

(60) Provisional application No. 62/098,922, filed on Dec. 31, 2014.

(51) Int. Cl.
*C09D 201/08* (2006.01)
*C09D 133/08* (2006.01)
(Continued)

(52) U.S. Cl.
CPC ........ *C09D 151/003* (2013.01); *C08F 220/18* (2013.01); *C08F 265/06* (2013.01);
(Continued)

(58) Field of Classification Search
CPC ................ C08F 265/06; C08F 265/343; C08F 2220/1825; C08F 220/14; C08F 220/18;
(Continued)

(56) References Cited

U.S. PATENT DOCUMENTS 3,980,602 A * 9/1976 Jakubauskas ......... C09B 67/009
524/431
5,739,196 A * 4/1998 Jenkins ..................... C08F 2/26
523/201
(Continued)

FOREIGN PATENT DOCUMENTS

EP 0854153 A1 7/1998
EP 1710284 A1 * 10/2006 ............ C08F 220/18
(Continued)

OTHER PUBLICATIONS

International Search Report dated Jun. 9, 2016, from International Application No. PCT/EP2015-079947, 4 pages.

*Primary Examiner* — Satya B Sastri
(74) *Attorney, Agent, or Firm* — Meunier Carlin & Curfman LLC

(57) ABSTRACT

Provided herein are aqueous dispersions. The aqueous dispersions can comprise a first copolymer derived from one or more ethylenically unsaturated monomers, and a second carboxy-functional copolymer derived from one or more carboxylic acid-containing monomers. The aqueous dispersions can be used to prepare low- or zero-VOC aqueous coating compositions that possess desirable properties, including good block resistance and scrub resistance. Coatings and coating formulations comprising the aqueous dispersion, as well as methods of making and using the same are also provided.

17 Claims, 21 Drawing Sheets

(51) Int. Cl.
*C08F 265/06* (2006.01)
*C08F 220/18* (2006.01)
*C09D 151/00* (2006.01)
*C08J 3/05* (2006.01)

(52) U.S. Cl.
CPC .............. *C08J 3/05* (2013.01); *C09D 133/08* (2013.01); *C09D 201/08* (2013.01); *C08F 2220/1825* (2013.01); *C08J 2333/06* (2013.01); *C08L 2201/54* (2013.01)

(58) Field of Classification Search
CPC .... C08F 220/34; C08L 101/00; C08L 101/08; C08L 2201/54; C09D 201/00; C09D 201/08; C09D 151/003; C09D 133/08; C08J 3/05; C08J 2333/06; C08J 2433/06
See application file for complete search history.

(56) References Cited

U.S. PATENT DOCUMENTS

| | | | | |
|---|---|---|---|---|
| 7,772,318 B2* | 8/2010 | Fasano | .................. | C08F 220/18 |
| | | | | 524/501 |
| 10,047,232 B2* | 8/2018 | Akkerman | ............. | C09D 5/022 |
| 2011/0237736 A1* | 9/2011 | Roller | ..................... | C08L 33/00 |
| | | | | 524/516 |

FOREIGN PATENT DOCUMENTS

| | | | |
|---|---|---|---|
| EP | 1710284 A1 | 10/2006 |
| WO | 2015/071590 A1 | 5/2015 |

* cited by examiner

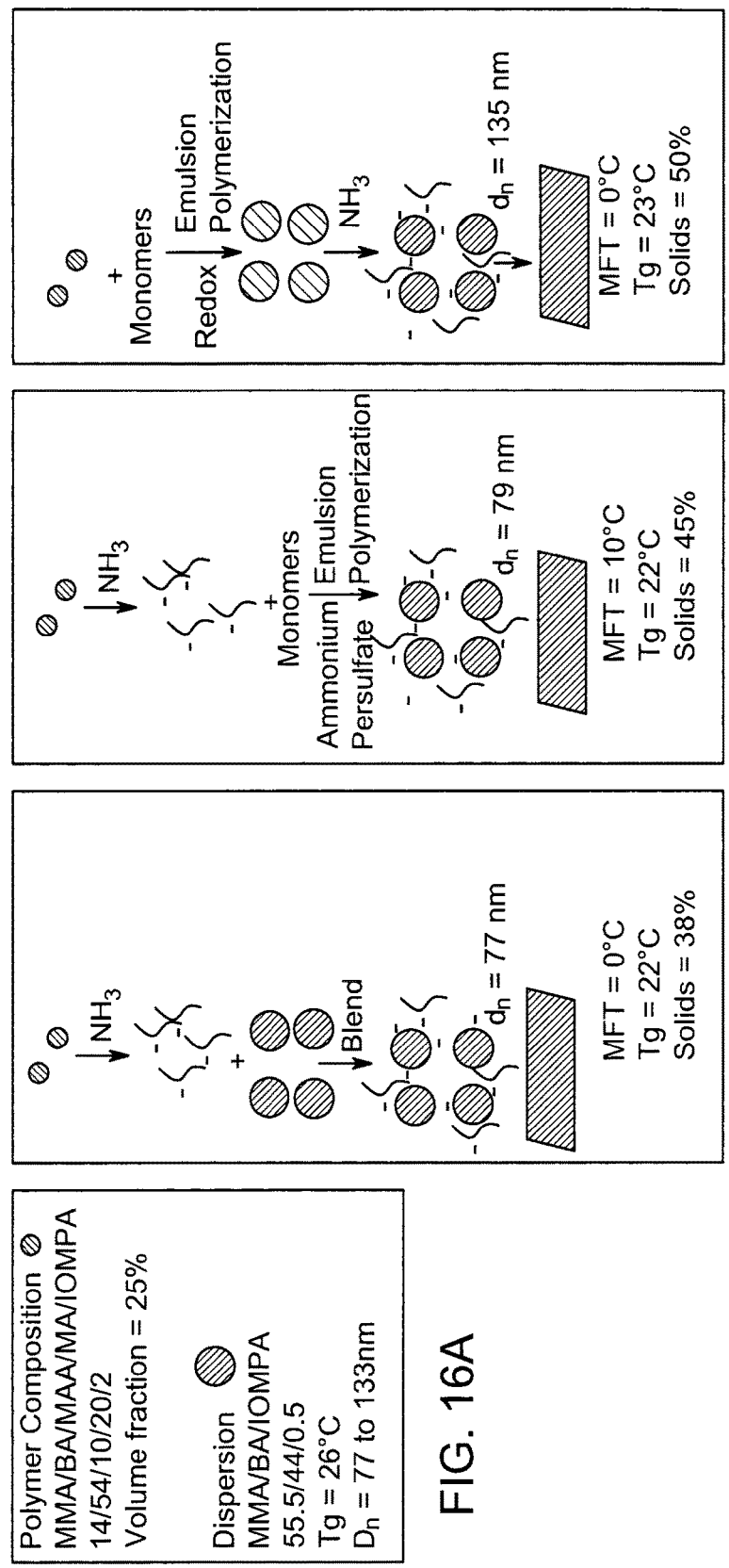

ACID-CONTAINING POLYMERS AS COALESCING AGENTS FOR LATEXES

FIELD OF THE INVENTION

This disclosure relates aqueous coating compositions, including low- or zero-VOC aqueous coating compositions.

BACKGROUND

Coalescing agents are high boiling point solvents (that are slow to evaporate) used to reduce the minimum film formation temperature (MFFT) of paints, inks, other coating compositions and the like. In paint formulations in particular, coalescing agents act as temporary plasticizers to reduce the glass transition temperature ($T_g$) of the latex below that of the drying temperature to allow for good film formation.

Generally, coalescing agents function by softening the polymer particles in a latex, enabling the formation of a continuous film as the coating cures. To increase their effectiveness, is generally desirable for coalescing agents to have good hydrolytic stability and low water solubility.

Typical paint formulations can include one or more coalescing agents that range from 0.1 to 10% by weight that are used to promote the formation of a continuous film as the paint cures. This market has been historically dominated by volatile compounds such as 2,2,4-trimethyl-1,3-pentanediol monoisobutyrate (commercially available from Eastman Chemical under the trade name TEXANOL®) or 2-ethylhexyl benzoate (commercially available from Velsicol Corporation under the trade name VELATE® 378). However, the emission of these volatile organic compounds ("VOC") during the curing of paint has adverse environmental and health consequences.

Several approaches can be used to provide low- or zero-VOC latex paints. However, less desirable properties are often associated with these paints. For example, reactive diluents can be used to replace traditional coalescence solvents. But high reactive diluents have short shelf-lives and are not suitable for architectural paints, while low reactive diluents are not effective enough and have poor blocking resistance. Accordingly, there remains a need for low- or zero-VOC aqueous coating compositions that possess desirable properties, including good block resistance and scrub resistance.

SUMMARY

Provided herein are aqueous dispersions. The aqueous dispersions can comprise a first copolymer derived from one or more ethylenically unsaturated monomers, and a second carboxy-functional copolymer derived from one or more carboxylic acid-containing monomers. The aqueous dispersions can be used to prepare low- or zero-VOC aqueous coating compositions that possess desirable properties, including good block resistance and scrub resistance.

For example, provided herein are aqueous dispersions that comprise (a) a plurality of particles comprising a first copolymer derived from one or more ethylenically unsaturated monomers; and (b) a second water-soluble carboxy-functional copolymer derived from one or more carboxylic acid-containing monomers. The second copolymer can have an acid number of from 50 to 250, and can be at least partially neutralized with a volatile amine base.

The theoretical $T_g$ of the first copolymer can be from 17° C. to 35° C. The theoretical $T_g$ of the second copolymer can be at least 20° C. lower than the theoretical $T_g$ of the first copolymer. For example, the theoretical $T_g$ of the second copolymer can be from 20° C. to 30° C. lower than the theoretical $T_g$ of the first copolymer. In some embodiments, the theoretical $T_g$ of the second copolymer can be from −10° C. to 10° C.

The number average molecular weight of the first copolymer can be 15,000 Da or greater (e.g., from 15,000 Da to 250,000 Da). The first copolymer can be derived from one or more ethylenically-unsaturated monomers selected from the group consisting of styrene, butadiene, meth(acrylate) monomers, vinyl acetate, vinyl ester monomers and combinations thereof.

In some embodiments, the first copolymer can be an acrylic-based copolymer. For example, the first copolymer can be derived from one or more (meth)acrylate monomers, one or more carboxylic acid-containing monomers, and optionally one or more additional ethylenically-unsaturated monomers. In some cases, the first copolymer can be derived from greater than 80% by weight of one or more (meth)acrylate monomers, based on the total weight of all of the monomers used to form the first copolymer. In certain cases, the one or more (meth)acrylate monomers can be selected from methyl methacrylate, butyl acrylate, 2-ethylhexylacrylate, methyl acrylate, and combinations thereof. Optionally, the first copolymer can further be derived from one or more carboxylic acid-containing monomers. For example, in some embodiments, the first copolymer can be derived from greater than 0% by weight to 5% by weight of one or more carboxylic acid-containing monomers, based on the total weight of all of the monomers used to form the first copolymer.

The second copolymer can be present in the aqueous dispersion in an amount from 1% by weight and 20% by weight, based on the dry weight of the plurality of particles present in the composition. The second copolymer can have a number average molecular weight of less than 30,000 Da. For example, the number average molecular weight of the second copolymer can be from 2,000 Da to 20,000 Da, or from 4,000 Da to 8,000 Da.

The second copolymer can be derived from one or more carboxylic acid-containing monomers (e.g., one or more carboxylic acid-containing monomers can be selected from acrylic acid, methacrylic acid, itaconic acid, maleic acid, fumaric acid, and combinations thereof). In some embodiments, the second copolymer can be derived from 5% by weight to 35% by weight (e.g., from 10% by weight to 20% by weight) of one or more carboxylic acid-containing monomers, based on the total weight of all of the monomers used to form the second copolymer.

In some embodiments, the second copolymer can be derived from greater than 50% to 95% by weight of one or more (meth)acrylate monomers, based on the total weight of all of the monomers used to form the second copolymer. In some embodiments, second copolymer can be derived from one or more (meth)acrylate monomers, one or more carboxylic acid-containing monomers, and optionally one or more additional ethylenically-unsaturated monomers. In some cases, the one or more (meth)acrylate monomers can be selected from methyl methacrylate, butyl acrylate, 2-ethylhexylacrylate, methyl acrylate, and combinations thereof.

In certain embodiments, the second copolymer can be derived from 10-25% by weight methyl methacrylate, 40-60% by weight butyl acrylate, 0-20% by weight methyl acrylate, 10-35% by weight acid monomers, and 0-10% by weight molecular weight regulators.

In some embodiments, the first copolymer and the second copolymer have calculated Hoy solubility parameters that satisfy the equation below $$((\delta_{p1})^2-(\delta_{p2})^2)^{1/2}<3.90 \text{ MPa}^{1/2}$$

wherein $\delta_{p1}$ is the calculated Hoy solubility parameter of the first copolymer and $\delta_{p2}$ is the calculated Hoy solubility parameter of the second copolymer. In certain embodiments, the first copolymer and the second copolymer have calculated Hoy solubility parameters that satisfy the equation below $$((\delta_{p1})^2-(\delta_{p2})^2)^{1/2}<1.50 \text{ MPa}^{1/2}$$

wherein $\delta_{p1}$ is the calculated Hoy solubility parameter of the first copolymer and $\delta_{p2}$ is the calculated Hoy solubility parameter of the second copolymer.

Also provided herein are aqueous dispersions that comprise a multistage polymer. The multistage polymer can comprise (a) a first stage comprising a first copolymer derived from one or more ethylenically unsaturated monomers; and (b) a second stage comprising a second carboxy-functional copolymer derived from one or more carboxylic acid-containing monomers. The second copolymer can have an acid number of from 50 to 250. The weight ratio of the first stage to the second stage can be from 10:1 to 3:1 (e.g., 7:1 to 4:1).

The theoretical $T_g$ of the first copolymer can be from 17° C. to 35° C. The theoretical $T_g$ of the second copolymer can be at least 20° C. lower than the theoretical $T_g$ of the first copolymer. For example, the theoretical $T_g$ of the second copolymer can be from 20° C. to 30° C. lower than the theoretical $T_g$ of the first copolymer. In some embodiments, the theoretical $T_g$ of the second copolymer can be from −10° C. to 10° C.

The number average molecular weight of the first copolymer can be 15,000 Da or greater (e.g., from 15,000 Da to 250,000 Da). The first copolymer can be derived from one or more ethylenically-unsaturated monomers selected from the group consisting of styrene, butadiene, meth(acrylate) monomers, vinyl acetate, vinyl ester monomers and combinations thereof.

In some embodiments, the first copolymer can be an acrylic-based copolymer. For example, the first copolymer can be derived from one or more (meth)acrylate monomers, one or more carboxylic acid-containing monomers, and optionally one or more additional ethylenically-unsaturated monomers. In some cases, the first copolymer can be derived from greater than 80% by weight of one or more (meth)acrylate monomers, based on the total weight of all of the monomers used to form the first copolymer. In certain cases, the one or more (meth)acrylate monomers can be selected from methyl methacrylate, butyl acrylate, 2-ethylhexylacrylate, methyl acrylate, and combinations thereof. Optionally, the first copolymer can further be derived from one or more carboxylic acid-containing monomers. For example, in some embodiments, the first copolymer can be derived from greater than 0% by weight to 5% by weight of one or more carboxylic acid-containing monomers, based on the total weight of all of the monomers used to form the first copolymer.

The second copolymer can have a number average molecular weight of less than 30,000 Da. For example, the number average molecular weight of the second copolymer can be from 2,000 Da to 20,000 Da, or from 4,000 Da to 8,000 Da.

The second copolymer can be derived from one or more carboxylic acid-containing monomers (e.g., one or more carboxylic acid-containing monomers can be selected from acrylic acid, methacrylic acid, itaconic acid, maleic acid, fumaric acid, and combinations thereof). In some embodiments, the second copolymer can be derived from 5% by weight to 35% by weight (e.g., from 10% by weight to 20% by weight) of one or more carboxylic acid-containing monomers, based on the total weight of all of the monomers used to form the second copolymer.

In some embodiments, the second copolymer can be derived from greater than 50% to 95% by weight of one or more (meth)acrylate monomers, based on the total weight of all of the monomers used to form the second copolymer. In some embodiments, second copolymer can be derived from one or more (meth)acrylate monomers, one or more carboxylic acid-containing monomers, and optionally one or more additional ethylenically-unsaturated monomers. In some cases, the one or more (meth)acrylate monomers can be selected from methyl methacrylate, butyl acrylate, 2-ethylhexylacrylate, methyl acrylate, and combinations thereof.

In certain embodiments, the second copolymer can be derived from 10-25% by weight methyl methacrylate, 40-60% by weight butyl acrylate, 0-20% by weight methyl acrylate, 10-35% by weight acid monomers, and 0-10% by weight molecular weight regulators.

In some embodiments, the first copolymer and the second copolymer have calculated Hoy solubility parameters that satisfy the equation below $$((\delta_{p1})^2-(\delta_{p2})^2)^{1/2}<3.90 \text{ MPa}^{1/2}$$

wherein $\delta_{p1}$ is the calculated Hoy solubility parameter of the first copolymer and $\delta_{p2}$ is the calculated Hoy solubility parameter of the second copolymer. In certain embodiments, the first copolymer and the second copolymer have calculated Hoy solubility parameters that satisfy the equation below $$((\delta_{p1})^2-(\delta_{p2})^2)^{1/2}<1.50 \text{ MPa}^{1/2}$$

wherein $\delta_{p1}$ is the calculated Hoy solubility parameter of the first copolymer and $\delta_{p2}$ is the calculated Hoy solubility parameter of the second copolymer.

Also provided are coating formulations. The coating formulations can include any of the dispersions described herein and one or more fillers. In certain embodiments, the coating formulation can be a paint, such as a semi-gloss paint. In certain embodiments, the coating formulation can comprise less than or equal to 50 grams per liter of volatile organic compounds.

Also provided are methods of producing a coating on a surface. The methods can comprise applying to the surface the coating formulation described herein, and allowing the formulation to dry to produce a coating. In certain embodiments, the resulting coating exhibits a wet scrub resistance of at least 200 cycles (e.g., from 200 cycles to 2,000 cycles, or from 400 to 2,000 cycles) as measured in accordance with ASTM D 2486.

BRIEF DESCRIPTION OF THE DRAWINGS

FIGS. 11C and 11D are DMA storage modulus (E') plots prepared from a blend of Dispersion A and Polymer B, Dispersion A, and Rhoplex SG-30. FIG. 11D are the DMA tan delta plots prepared from a blend of Dispersion A and Polymer B, Dispersion A, and Rhoplex SG-30. The blend was prepared using a volume fraction of 0.20 for Polymer B based on total dry solids. Wet films were cast in a 300 μm TEFLON tray, air dried then baked in a forced-air oven for at 60° C. to condition the films

FIGS. 16A-16D are schematic diagrams showing preparation of the copolymers disclosed herein. FIG. 16A shows the acid-based oligomer, Polymer C, and Dispersion A.

FIG. 16B shows the blending process for the ammonia-carboxylate based oligomer (Polymer C) blended with Dispersion A. FIG. 16C shows the use of the ammonium-carboxylate oligomer (Polymer C) as a support polymer during emulsion polymerization using the composition of Dispersion A (RCD A). FIG. 16D shows the use of Polymer C (before neutralization) as a seed for a persulfate/redox emulsion polymerization process using the composition of Dispersion A (RCD B) with post-neutralization using ammonium hydroxide. The monomer composition used to generate the MFT results in FIGS. 16B, 16C, and 16D are essentially the same for all three processes.

DETAILED DESCRIPTION

Figure 1:
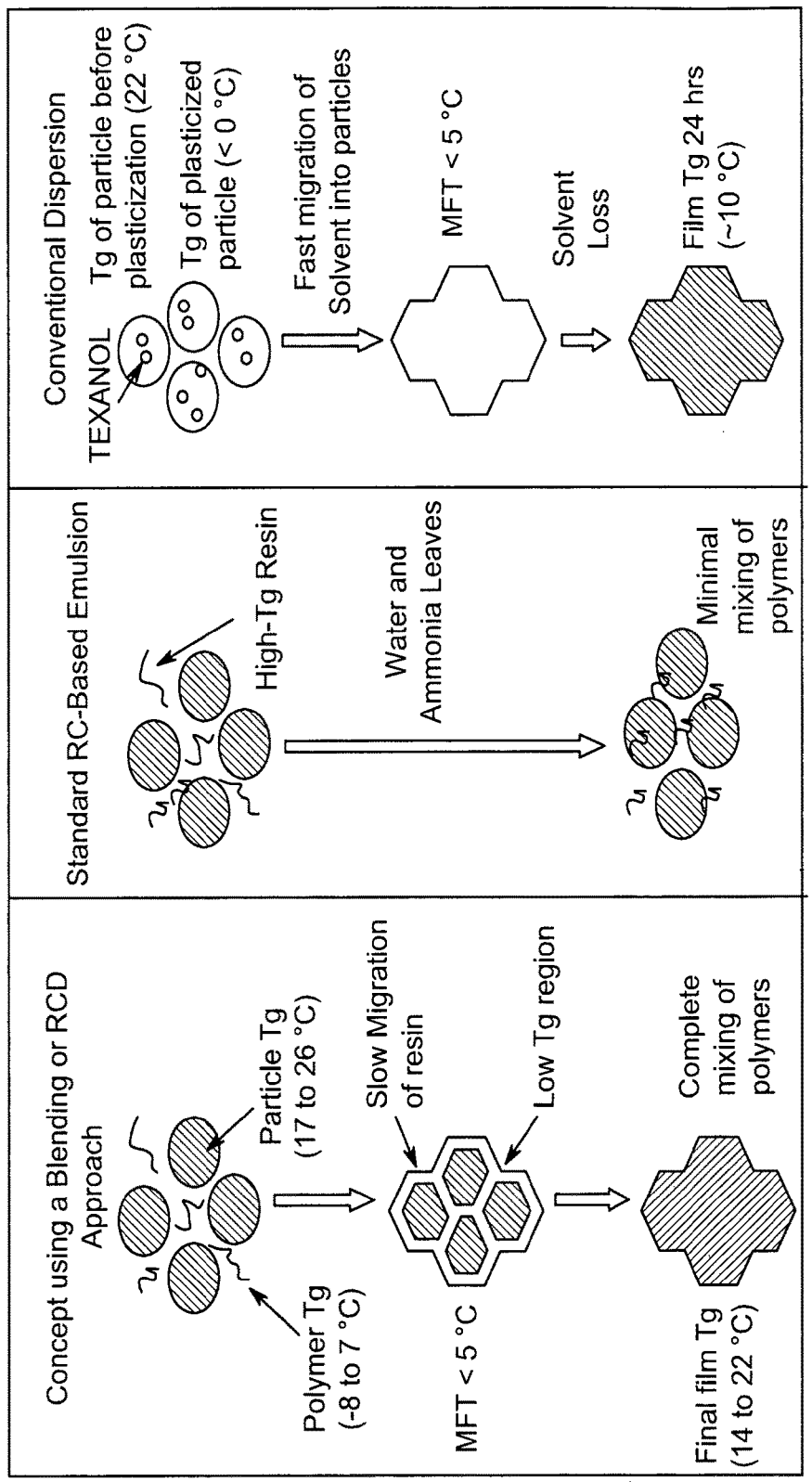
FIG. 1 are schematic diagrams illustrating three film formation processes. The far right diagram illustrates the use of the filming aid, TEXANOL®, in a typical dispersion. The calculated $T_g$ of a 25 micron film (dry film thickness) aged for 24 hours in a CTH room at 25° C. is ~10° C. The middle diagram illustrates the process and expected morphology where the high-$T_g$ oligomer is the continuous phase. The left diagram shows an ammonium carboxylate-based oligomer designed to be compatible with high-molecular weight polymeric particles.

As used herein, "(meth)acryl . . . " includes acryl . . . , methacryl . . . , diacryl . . . , and dimethacryl . . . . For example, the term "(meth)acrylate monomer" includes acrylate, methacrylate, diacrylate, and dimethacrylate monomers.

Provided herein are aqueous dispersions. The aqueous dispersions can comprise a first copolymer derived from one or more ethylenically unsaturated monomers, and a second carboxy-functional copolymer derived from one or more carboxylic acid-containing monomers. The aqueous dispersions can be used to prepare low- or zero-VOC aqueous coating compositions that possess desirable properties, including good block resistance and scrub resistance.

For example, provided herein are aqueous dispersions that comprise (a) a plurality of particles comprising a first copolymer derived from one or more ethylenically unsaturated monomers; and (b) a second water-soluble carboxy-functional copolymer derived from one or more carboxylic acid-containing monomers.

In these embodiments, the first copolymer and the second copolymer can be present in the aqueous dispersion in varying amounts so as to provide a resultant composition with the desired properties for a particular application. For example, in some embodiments, the first copolymer can be present in the aqueous dispersion in an amount of at least 10% by weight (e.g., at least 15% by weight, at least 25% by weight, at least 35% by weight, at least 45% by weight, at least 50% by weight, at least 55% by weight, at least 60% by weight, at least 70% by weight, at least 75% by weight, at least 80% by weight, at least 85% by weight, at least 90% by weight, or at least 95% by weight), based on the total copolymer content of the aqueous dispersion. In some embodiments, the first copolymer can be present in the aqueous dispersion in an amount of 99% or less by weight (e.g., 95% or less by weight, 90% or less by weight, 85% or less by weight, 80% or less by weight, 75% or less by weight, 70% or less by weight, 60% or less by weight, 50% or less by weight, 40% or less by weight, 30% or less by weight, or 20% or less by weight), based on the total polymer content of the aqueous dispersion.

The first copolymer can be present in the dispersion in an amount ranging from any of the minimum values described above to any of the maximum values described above. For example, in some embodiments, first copolymer can be present in the aqueous dispersion in an amount of from 10% by weight to 99% by weight (e.g., from 70% by weight to 99% by weight, from 80% by weight to 99% by weight, or from 85% by weight to 95% by weight, based on the total copolymer content of the aqueous dispersion).

The second copolymer can be present in the aqueous dispersion in an amount of at least 1% by weight (e.g., at least 2% by weight, at least 3% by weight, at least 4% by weight, at least 5% by weight, at least 7.5% by weight, at least 8% by weight, at least 9% by weight, at least 10% by weight, at least 15% by weight, at least 20% by weight, or at least 25% by weight), based on the dry weight of the plurality of particles comprising the first copolymer, present in the dispersion. In some embodiments, the second copolymer can be present in the aqueous dispersion in an amount of 30% or less by weight (e.g., 25% or less by weight, 20% or less by weight, 15% or less by weight, 10% or less by weight, 9% or less by weight, 8% or less by weight, 7.5% or less by weight, 5% or less by weight, 4% or less by weight, 3% or less by weight, or 2% or less by weight), based on the dry weight of the plurality of particles comprising the first copolymer, present in the dispersion.

In some embodiments, the second copolymer can be present in the aqueous dispersion in an amount ranging from any of the minimum values described above to any of the maximum values described above. For example, the second copolymer can be present in dispersion in an amount of from 1% to 30% by weight (e.g., from 1% to 25%, 1% to 20%, 5% to 30%, 5% to 25%, 1% to 15%, 1% to 10%, or 5% to 20%), based on the dry weight of the plurality of particles present in the dispersion.

Also provided herein are aqueous dispersions that comprise a multistage polymer. The multistage polymer can comprise (a) a first stage comprising a first copolymer derived from one or more ethylenically unsaturated monomers; and (b) a second stage comprising a second carboxy-functional copolymer derived from one or more carboxylic acid-containing monomers.

In these embodiments, the first stage and the second stage can be present in the multistage particle in varying amounts so as to provide a resultant composition with the desired properties for a particular application. For example, in some embodiments, the weight ratio of the first stage to the second stage can be at least 3:1 (e.g., at least 4:1, at least 5:1, at least 6:1, at least 7:1, at least 8:1, or at least 9:1). In some embodiments, the weight ratio of the first stage to the second stage can be 10:1 or less (e.g., 9:1 or less, 8:1 or less, 7:1 or less, 6:1 or less, 5:1 or less, or 4:1 or less).

The weight ratio of the first stage to the second stage can range from any of the minimum values described above to any of the maximum values described above. For example, the weight ratio of the first stage to the second stage can be from 10:1 to 3:1 (e.g., from 10:1 to 4:1, 10:1 to 5:1, 10:1 to 6:1, 9:1 to 4:1, 8:1 to 4:1, or 7:1 to 4:1).

The first copolymer can be derived from one or more ethylenically unsaturated monomers. For example, the first copolymer can be a pure acrylic polymer (i.e., a polymer derived exclusively from (meth)acrylate and/or (meth)acrylic acid monomers), a vinyl-aromatic-acrylic polymer (i.e., a polymer derived from a vinyl aromatic such as styrene and one or more (meth)acrylate monomers), a vinyl-acrylic polymer (i.e., a polymer derived from one or more vinyl ester monomers and one or more (meth)acrylate monomers), a vinyl chloride polymer (i.e., a polymer derived from one or more vinyl chloride monomers), an acrylic-polyurethane hybrid polymer, a vinyl alkanoate polymer (i.e., a polymer derived from one or more vinyl alkanoate monomers, such as polyvinyl acetate or a copolymer derived from ethylene and vinyl acetate monomers), or a combination thereof.

In some embodiments, the first copolymer can be an acrylic-based copolymer. In these embodiments, the first copolymer can be derived from one or more (meth)acrylate monomers. (Meth)acrylate monomers can include esters of α,β-monoethylenically unsaturated monocarboxylic and dicarboxylic acids having 3 to 6 carbon atoms with alkanols having 1 to 12 carbon atoms (e.g., esters of acrylic acid, methacrylic acid, maleic acid, fumaric acid, or itaconic acid, with C1-C20, C1-C12, C1-C8, or C1-C4 alkanols).

Exemplary acrylate and (meth)acrylate monomers include, but are not limited to, methyl acrylate, methyl (meth)acrylate, ethyl acrylate, ethyl (meth)acrylate, butyl acrylate, butyl (meth)acrylate, isobutyl (meth)acrylate, n-hexyl (meth)acrylate, ethylhexyl (meth)acrylate, n-heptyl (meth)acrylate, ethyl (meth)acrylate, 2-methylheptyl (meth)

acrylate, octyl (meth)acrylate, isooctyl (meth)acrylate, n-nonyl (meth)acrylate, isononyl (meth)acrylate, n-decyl (meth)acrylate, isodecyl (meth)acrylate, dodecyl (meth) acrylate, lauryl (meth)acrylate, tridecyl (meth)acrylate, stearyl (meth)acrylate, glycidyl (meth)acrylate, alkyl crotonates, vinyl acetate, di-n-butyl maleate, di-octylmaleate, acetoacetoxyethyl (meth)acrylate, acetoacetoxypropyl (meth)acrylate, hydroxyethyl (meth)acrylate, allyl (meth) acrylate, tetrahydrofurfuryl (meth)acrylate, cyclohexyl (meth)acrylate, 2-ethoxyethyl (meth)acrylate, 2-methoxy (meth)acrylate, 2-(2-ethoxyethoxy)ethyl (meth)acrylate, 2-ethylhexyl (meth)acrylate, 2-propylheptyl (meth)acrylate, 2-phenoxyethyl (meth)acrylate, isobornyl (meth)acrylate, caprolactone (meth)acrylate, polypropyleneglycol mono (meth)acrylate, polyethyleneglycol (meth)acrylate, benzyl (meth)acrylate, 2,3-di(acetoacetoxy)propyl (meth)acrylate, hydroxypropyl (meth)acrylate, methylpolyglycol (meth) acrylate, 3,4-epoxycyclohexylmethyl (meth)acrylate, 1,6 hexanediol di(meth)acrylate, 1,4 butanediol di(meth)acrylate and combinations thereof.

In certain instances, the first copolymer can be derived from two or more, three or more, or four or more (meth) acrylate monomers. In certain embodiments, the first copolymer is derived from at least two (meth)acrylate monomers. In some examples, the first copolymer can be derived from one or more (meth)acrylate monomers selected from butyl acrylate, 2-ethylhexyl acrylate, methyl methacrylate, and combinations thereof.

In some embodiments, the first copolymer can be derived from greater than 55% by weight or greater of one or more (meth)acrylate monomers (e.g., 65% by weight or greater, 75% by weight or greater, 80% by weight or greater, 85% by weight or greater, 88% by weight or greater, 90% by weight or greater, 91% by weight or greater, 92% by weight or greater, 93% by weight or greater, 94% by weight or greater, or 95% by weight or greater of the (meth)acrylate monomer) based on the total weight of monomers from which the first copolymer is derived.

The first copolymer can be derived from greater than 0% by weight to 5% by weight of one or more carboxylic acid-containing monomers, based on the total weight of monomers from which the first copolymer is derived. Examples of carboxylic acid-containing monomers include α,β-monoethylenically unsaturated mono- and dicarboxylic acids (e.g., acrylic acid, methacrylic acid, itaconic acid, maleic acid, fumaric acid, crotonic acid, dimethacrylic acid, ethylacrylic acid, allylacetic acid, vinylacetic acid, mesaconic acid, methylenemalonic acid, or citraconic acid). In some embodiments, the one or more carboxylic acid-containing monomers can be selected from the group consisting of acrylic acid, methacrylic acid, itaconic acid, maleic acid, fumaric acid, and combinations thereof. In certain embodiments, the first copolymer can be derived from greater than 0% by weight to 5% by weight, or greater than 0% by weight to 2.5% by weight of one or more carboxylic acid-containing monomers (e.g., acrylic acid, methacrylic acid, or combinations thereof), based on the total weight of monomers from which the first copolymer is derived.

In some embodiments, the first copolymer can be derived from greater than 0% by weight to 35% by weight of one or more additional ethylenically-unsaturated monomers. For example, the first copolymer can further be derived from a vinyl aromatic monomer having up to 20 carbon atoms, a vinyl ester of a carboxylic acid comprising up to 20 carbon atoms, a (meth)acrylonitrile, a vinyl halide, a vinyl ether of an alcohol comprising 1 to 10 carbon atoms, an aliphatic hydrocarbon having 2 to 8 carbon atoms and one or two double bonds, a silane-containing monomer, a (meth)acrylamide, a (meth)acrylamide derivative, a phosphorus-containing monomer, an acetoacetoxy monomer, a sulfur-based monomer, or a combination of these monomers.

Suitable vinyl aromatic compounds include styrene, α- and p-methylstyrene, α-butylstyrene, 4-n-butylstyrene, 4-n-decylstyrene, vinyltoluene, and combinations thereof. Vinyl esters of carboxylic acids having comprising up to 20 carbon atoms include, for example, vinyl laurate, vinyl stearate, vinyl propionate, versatic acid vinyl esters, vinyl acetate, and combinations thereof. The vinyl halides can include ethylenically unsaturated compounds substituted by chlorine, fluorine or bromine, such as vinyl chloride and vinylidene chloride. The vinyl ethers can include, for example, vinyl ethers of alcohols comprising 1 to 4 carbon atoms, such as vinyl methyl ether or vinyl isobutyl ether. Aliphatic hydrocarbons having 2 to 8 carbon atoms and one or two double bonds can include, for example, hydrocarbons having 4 to 8 carbon atoms and two olefinic double bonds, such as butadiene, isoprene, and chloroprene. Silane containing monomers can include, for example, vinyl silanes, such as vinyltrimethoxysilane, vinyltriethoxysilane (VTEO), vinyl tris(2-methoxyethoxysilane), and vinyl triisopropoxysilane, and (meth)acrylatoalkoxysilanes, such as (meth)acryloyloxypropyltrimethoxysilane, γ-(meth)acryloxypropyltrimethoxysilane, and γ-(meth)acryloxypropyltriethoxysilane. (Meth)acrylamide derivatives include, for example, keto-containing amide functional monomers defined by the general structure below

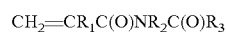

wherein $R_1$ is hydrogen or methyl; $R_2$ is hydrogen, a $C_1$-$C_4$ alkyl group, or a phenyl group; and $R_3$ is hydrogen, a $C_1$-$C_4$ alkyl group, or a phenyl group. For example, the (meth) acrylamide derivative can be diacetone acrylamide (DAAM) or diacetone methacrylamide. Examples of suitable phosphorus-containing monomers include dihydrogen phosphate esters of alcohols in which the alcohol contains a polymerizable vinyl or olefenic group, allyl phosphate, phosphoalkyl (meth)acrylates such as 2-phosphoethyl(meth)acrylate (PEM), 2-phosphopropyl(meth)acrylate, 3-phosphopropyl (meth)acrylate, and phosphobutyl(meth)acrylate, 3-phospho-2-hydroxypropyl(meth)acrylate, mono- or di-phosphates of bis(hydroxymethyl) fumarate or itaconate; phosphates of hydroxyalkyl(meth)acrylate, 2-hydroxyethyl (meth)acrylate, 3-hydroxypropyl(meth)acrylate, ethylene oxide condensates of (meth)acrylates, $H_2C{=}C(CH_3)COO(CH_2CH_2O)_nP(O)(OH)_2$, and analogous propylene and butylene oxide condensates, where n is an amount of 1 to 50, phosphoalkyl crotonates, phosphoalkyl maleates, phosphoalkyl fumarates, phosphodialkyl (meth)acrylates, phosphodialkyl crotonates, vinyl phosphonic acid, allyl phosphonic acid, 2-acrylamido-2methylpropanephosphinic acid, α-phosphonostyrene, 2-methylacrylamido-2-methylpropanephosphinic acid, (hydroxy)phosphinylalkyl(meth)acrylates, (hydroxy)phosphinylmethyl methacrylate, and combinations thereof. Suitable acetoacetoxy monomers include acetoacetoxyalkyl (meth)acrylates, such as acetoacetoxyethyl (meth)acrylate (AAEM), acetoacetoxypropyl (meth) acrylate, acetoacetoxybutyl (meth)acrylate, and 2,3-di(acetoacetoxy)propyl (meth)acrylate; allyl acetoacetate; vinyl acetoacetate; and combinations thereof. Sulfur-containing monomers include, for example, sulfonic acids and sulfonates, such as vinylsulfonic acid, 2-sulfoethyl methacrylate, sodium styrenesulfonate, 2-sulfoxyethyl methacrylate, vinyl butylsulfonate, sulfones such as vinylsulfone, sulfoxides such as vinylsulfoxide, and sulfides such as 1-(2- hydroxyethylthio) butadiene. When present, the sulfur-containing monomers are generally present in an amount greater than 0% by weight to 5% by weight.

In some embodiments, the first copolymer can be derived from one or more ethylenically-unsaturated monomers selected from styrene, butadiene, meth(acrylate) monomers, vinyl acetate, vinyl ester monomers and combinations thereof.

In some embodiments, the first copolymer can be derived from (i) one or more (meth)acrylate monomers, (ii) one or more carboxylic acid-containing monomers, and (iii) optionally one or more additional ethylenically-unsaturated monomers, excluding monomers (i) and (ii). The one or more (meth)acrylate monomers can include methyl methacrylate, butyl acrylate, 2-ethylhexylacrylate, and combinations thereof. The one or more carboxylic acid-containing monomers can include acrylic acid, methacrylic acid, itaconic acid, maleic acid, fumaric acid, and combinations thereof.

The first copolymer can have a theoretical glass-transition temperature ($T_g$) and/or a $T_g$ as measured by differential scanning calorimetry (DSC) using the mid-point temperature using the method described, for example, in ASTM 3418/82, of at least 17° C. (e.g., at least 18° C., at least 19° C., at least 20° C., at least 21° C., at least 22° C., at least 23° C., at least 24° C., at least 25° C., at least 26° C., at least 27° C., at least 28° C., at least 29° C., at least 30° C., at least 31° C., at least 32° C., at least 33° C., or at least 34° C.). The first copolymer can have a theoretical $T_g$ and/or a $T_g$ as measured by DSC using the mid-point temperature using the method described, for example, in ASTM 3418/82, of 35° C. or less (e.g., 34° C. or less, 33° C. or less, 32° C. or less, 31° C. or less, 30° C. or less, 29° C. or less, 28° C. or less, 27° C. or less, 26° C. or less, 25° C. or less, 24° C. or less, 23° C. or less, 22° C. or less, 21° C. or less, 20° C. or less, 19° C. or less, or 18° C. or less).

The first copolymer can have a theoretical $T_g$ and/or a $T_g$ as measured by DSC using the mid-point temperature using the method described, for example, in ASTM 3418/82, ranging from any of the minimum values described above to any of the maximum values described above. For example, the first copolymer can have a theoretical $T_g$ and/or a $T_g$ as measured by DSC using the mid-point temperature using the method described, for example, in ASTM 3418/82, of from 17° C. to 35° C. (e.g., from 17° C. to 30° C., from 17° C. to 25° C., from 20° C. to 30° C., or from 20° C. to 25° C.).

The first copolymer can have any suitable molecular weight. For example, the number average molecular weight of the first copolymer can be at least 15,000 Da (e.g., at least 25,000 Da, at least 50,000 Da, at least 100,000 Da, at least 200,000 Da, or more). In some cases, the number average molecular weight of the first copolymer can be 250,000 Da or less (e.g., 200,000 Da or less, 100,000 Da or less, 50,000 Da or less, or 25,000 Da or less).

The number average molecular weight of the first copolymer can range from any of the minimum values described above to any of the maximum values described above. For example, the number average molecular weight of the first copolymer can be from 15,000 Da to 250,000 Da (e.g., from 50,000 Da to 250,000 Da, or from 100,000 Da to 250,000 Da).

The second copolymer can be any suitable carboxy-functional copolymer. In some embodiments, the second copolymer can be derived from one or more carboxylic acid-containing monomers. In these embodiments, the second copolymer can be derived from varying amounts of the one or more carboxylic acid-containing monomers. For example, in some embodiments, the second copolymer can be derived from at least 5% by weight (e.g., at least 10% by weight, at least 15% by weight, at least 20% by weight, at least 25% by weight, or at least 30% by weight) of one or more carboxylic acid-containing monomers, based on the total weight of monomers from which the second copolymer is derived. In some embodiments, the second copolymer can be derived from 35% by weight or less (e.g., 30% by weight or less, 25% by weight or less, 20% by weight or less, 15% by weight or less, or 10% by weight or less) of one or more carboxylic acid-containing monomers, based on the total weight of monomers from which the second copolymer is derived.

The second copolymer can be derived from an amount of the one or more carboxylic acid-containing monomers ranging from any of the minimum values described above to any of the maximum values described above. For example, in some embodiments, the second copolymer can be derived from 5% to 35% by weight (e.g., 10% to 30% by weight, 15% to 35% by weight, 15% to 30% by weight, 15% to 25% by weight, or 10% to 25% by weight) of one or more carboxylic acid-containing monomers, based on the total weight of monomers from which the second copolymer is derived.

The second copolymer can have an acid number, as determined according to the method described in ASTM D974, of at least 50 (e.g., at least 100, at least 125, at least 150, at least 175, at least 200, or at least 225). The second copolymer can have an acid number, as determined according to the method described in ASTM D974, of 250 or less (e.g., 225 or less, 200 or less, 175 or less, 150 or less, 125 or less, or 100 or less).

The second copolymer can have an acid number ranging from any of the minimum values described above to any of the maximum values described above. For example, in some embodiments, the second copolymer can have an acid number of from 50 to 250, (e.g., from 100 to 250, from 125 to 250, from 50 to 200, or from 150 to 250).

The second copolymer can be further derived from one or more (meth)acrylate monomers, including any of those described above. In certain instances, the second copolymer can be derived from two or more, three or more, or four or more (meth)acrylate monomers. In certain embodiments, the second copolymer is derived from at least two (meth)acrylate monomers. In some examples, the second copolymer can be derived from one or more (meth)acrylate monomers selected from butyl acrylate, methyl acrylate, ethyl acrylate, methyl methacrylate, and combinations thereof. In some examples, the second copolymer can be derived from greater than 50% by weight or greater of one or more (meth)acrylate monomers (e.g., 55% by weight or greater, 65% by weight or greater, 75% by weight or greater, 80% by weight or greater, 85% by weight or greater, 88% by weight or greater, 90% by weight or greater, 91% by weight or greater, 92% by weight or greater, 93% by weight or greater, 94% by weight or greater, or 95% by weight or greater of the (meth)acrylate monomer), based on the total weight of monomers from which the second copolymer is derived.

In some embodiments, the second copolymer can be derived from greater than 0% by weight to 35% by weight of one or more additional ethylenically-unsaturated monomers, including any of those described above. For example, the second copolymer can further be derived from a vinyl aromatic monomer having up to 20 carbon atoms, a vinyl ester of a carboxylic acid comprising up to 20 carbon atoms, a (meth)acrylonitrile, a vinyl halide, a vinyl ether of an alcohol comprising 1 to 10 carbon atoms, an aliphatic hydrocarbon having 2 to 8 carbon atoms and one or two double bonds, a silane-containing monomer, a (meth)acrylamide, a (meth)acrylamide derivative, a phosphorus-containing monomer, an acetoacetoxy monomer, a sulfur-based monomer, or a combination of these monomers.

In some embodiments, the second copolymer can be derived from (i) one or more (meth)acrylate monomers, (ii) one or more carboxylic acid-containing monomers, and (iii) optionally one or more additional ethylenically-unsaturated monomers, excluding monomers (i) and (ii). The one or more (meth)acrylate monomers can include methyl methacrylate, butyl acrylate, 2-ethylhexylacrylate, methyl acrylate, and combinations thereof. The one or more carboxylic acid-containing monomers can include acrylic acid, methacrylic acid, itaconic acid, maleic acid, fumaric acid, and combinations thereof. In certain embodiments, the second copolymer can be derived from
   (i) 10-25% by weight methyl methacrylate;
   (ii) 40-60% by weight butyl acrylate;
   (iii) 0-20% by weight methyl acrylate;
   (iv) 5-35% by weight acid monomers; and
   (v) 0-10% by weight molecular weight regulators.

The second copolymer can have a theoretical $T_g$ and/or a $T_g$ as measured by DSC using the mid-point temperature using the method described, for example, in ASTM 3418/82, that is at least 20° C. lower (e.g., at least 25° C. lower, at least 30° C. lower, at least 35° C. lower, at least 40° C. lower, or at least 45° C. lower) than theoretical $T_g$ and/or measured $T_g$ of the first copolymer.

The second copolymer can have a theoretical $T_g$ and/or a $T_g$ as measured by DSC using the mid-point temperature using the method described, for example, in ASTM 3418/82, of at least −10° C. (e.g., at least −9° C., at least −8° C., at least −7° C., at least −6° C., at least −5° C., at least −4° C., at least −3° C., at least −2° C., at least −1° C., at least 0° C., at least 1° C., at least 2° C., at least 3° C., at least 4° C., at least 5° C., at least 6° C., at least 7° C., at least 8° C., or at least 9° C.). The second copolymer can have a theoretical $T_g$ and/or a $T_g$ as measured by DSC using the mid-point temperature using the method described, for example, in ASTM 3418/82, of 10° C. or less (e.g., 9° C. or less, 8° C. or less, 7° C. or less, 6° C. or less, 5° C. or less, 4° C. or less, 3° C. or less, 2° C. or less, 1° C. or less, 0° C. or less, −1° C. or less, −2° C. or less, −3° C. or less, −4° C. or less, −5° C. or less, −6° C. or less, −7° C. or less, −8° C. or less, or −9° C. or less).

The second copolymer can have a theoretical $T_g$ and/or a $T_g$ as measured by DSC using the mid-point temperature using the method described, for example, in ASTM 3418/82, ranging from any of the minimum values described above to any of the maximum values described above. For example, the second copolymer can have a theoretical $T_g$ and/or a $T_g$ as measured by DSC using the mid-point temperature using the method described, for example, in ASTM 3418/82, of from −10° C. to 10° C. (e.g., from −10° C. to 0° C., from 0° C. to 10° C., from −5° C. to 5° C., or from −5° C. to 10° C.).

The second copolymer can have any suitable molecular weight. For example, the number average molecular weight of the first copolymer can be at least 2,000 Da (e.g., at least 3,000 Da, at least 4,000 Da, at least 5,000 Da, at least 6,000 Da, at least 7,000 Da, at least 8,000 Da, at least 9,000 Da, at least 10,000 Da, at least 15,000 Da, at least 20,000 Da, or at least 25,000 Da). In some cases, the number average molecular weight of the second copolymer can be 30,000 Da or less (e.g., 25,000 Da or less, 20,000 Da or less, 15,000 Da or less, 10,000 Da or less, 9,000 Da or less, 8,000 Da or less, 7,000 Da or less, 6,000 Da or less, 5,000 Da or less, 4,000 Da or less, or 3,000 Da or less).

The number average molecular weight of the second copolymer can range from any of the minimum values described above to any of the maximum values described above.

For example, the number average molecular weight of the second copolymer can be from 2,000 Da to 30,000 Da (e.g., from 2,000 Da to 20,000 Da, from 2,000 Da to 10,000 Da, or from 4,000 Da to 8,000 Da).

The composition of the first copolymer and the second copolymer can be selected such that the second copolymer can be compatible with the first copolymer. This can allow for the second copolymer to migrate into the first copolymer during film formation. By way of example, in the case of dispersions that include (a) a plurality of particles comprising a first copolymer derived from one or more ethylenically unsaturated monomers; and (b) a second water-soluble carboxy-functional copolymer derived from one or more carboxylic acid-containing monomers, the composition of the first copolymer and the second copolymer can be selected such that the second copolymer can migrate to or into the surface of the particles comprising the first copolymer during film formation. Without wishing to be bound by theory, this can result in a plurality of latex particles having a plasticized surface, which promotes interfusion of the polymer chains from one particle to another. As a consequence, the MFFT of the composition is suppressed. In this way, the second copolymer can function as a coalescing agent.

The compatibility of the first copolymer and the second copolymer can be assessed using calculated Hoy solubility parameters. The Hoy solubility parameters of the first copolymer and the second copolymer can be calculated using group contribution methods known in the art. See, for example, "Solubility Parameter Values" *Polymer Handbook*, 3rd Ed., John Wiley and Sons, 1989, pages 519-559 for Tables of Hoy solubility parameters. In some embodiments, the first copolymer and the second copolymer have calculated Hoy solubility parameters that satisfy the equation below $$((\delta_{p1})^2 - (\delta_{p2})^2)^{1/2} < 3.90 \text{ MPa}^{1/2}$$

wherein $\delta_{p1}$ is the calculated Hoy solubility parameter of the first copolymer and $\delta_{p2}$ is the calculated Hoy solubility parameter of the second copolymer. In certain embodiments, the first copolymer and the second copolymer have calculated Hoy solubility parameters that satisfy the equation below $$((\delta_{p1})^2 - (\delta_{p2})^2)^{1/2} < 1.50 \text{ MPa}^{1/2}$$

wherein $\delta_{p1}$ is the calculated Hoy solubility parameter of the first copolymer and $\delta_{p2}$ is the calculated Hoy solubility parameter of the second copolymer.

In some embodiments, the first copolymer and the second copolymer, in combination, have a total acid content of 2% or less (e.g., 1.75% or less, 1.5% or less, 1.25% or less, or 1.0% or less). In certain embodiments, the first copolymer and the second copolymer, in combination, can have an acid content of 1% to 2%.

The aqueous dispersion containing the first copolymer and the second copolymer can be prepared by polymerizing the monomers using free-radical emulsion polymerization. The monomers for the first copolymer and the second copolymer can be prepared as aqueous dispersions. The emulsion polymerization temperature is generally from 10° C. to 95° C., from 30° C. to 95° C., or from 75° C. to 90° C. The polymerization medium can include water alone or a mixture of water and water-miscible liquids, such as methanol. In some embodiments, water is used alone. The emulsion polymerization can be carried out either as a batch, semi-batch, or continuous process. Typically, a semi-batch process is used. In some embodiments, a portion of the monomers can be heated to the polymerization temperature and partially polymerized, and the remainder of the polymerization batch can be subsequently fed to the polymerization zone continuously, in steps or with superposition of a concentration gradient.

Free-radical emulsion polymerization can be carried out in the presence of a free-radical polymerization initiator. The free-radical polymerization initiators that can be used in the process are all those which are capable of initiating a free-radical aqueous emulsion polymerization including alkali metal peroxydisulfates and $H_2O_2$, or azo compounds. Combined systems can also be used comprising at least one organic reducing agent and at least one peroxide and/or hydroperoxide, e.g., tert-butyl hydroperoxide and the sodium metal salt of hydroxymethanesulfinic acid or hydrogen peroxide and ascorbic acid. Combined systems can also be used additionally containing a small amount of a metal compound which is soluble in the polymerization medium and whose metallic component can exist in more than one oxidation state, e.g., ascorbic acid/iron(II) sulfate/hydrogen peroxide, where ascorbic acid can be replaced by the sodium metal salt of hydroxymethanesulfinic acid, sodium sulfite, sodium hydrogen sulfite or sodium metal bisulfite and hydrogen peroxide can be replaced by tert-butyl hydroperoxide or alkali metal peroxydisulfates and/or ammonium peroxydisulfates. In the combined systems, the carbohydrate derived compound can also be used as the reducing component. In general, the amount of free-radical initiator systems employed can be from 0.1 to 2%, based on the total amount of the monomers to be polymerized. In some embodiments, the initiators are ammonium and/or alkali metal peroxydisulfates (e.g., sodium persulfate), alone or as a constituent of combined systems. Commonly used redox initiation systems are described, e.g., by A. S. Sarac in *Progress in Polymer Science* 24, 1149-1204 (1999). The manner in which the free-radical initiator system is added to the polymerization reactor during the free-radical aqueous emulsion polymerization is not critical. It can either all be introduced into the polymerization reactor at the beginning, or added continuously or stepwise as it is consumed during the free-radical aqueous emulsion polymerization. In detail, this depends in a manner known to an average person skilled in the art both from the chemical nature of the initiator system and on the polymerization temperature. In some embodiments, some is introduced at the beginning and the remainder is added to the polymerization zone as it is consumed. It is also possible to carry out the free-radical aqueous emulsion polymerization under superatmospheric or reduced pressure.

The first copolymer and second copolymer can each independently be produced by single stage polymerization or multiple stage polymerization. In some embodiments, the first copolymer and the second copolymer are each polymerized separately to produce a first dispersion including a plurality of polymer particles including the first copolymer and a second dispersion comprising the second copolymer. The first and second dispersions can then be combined to provide a dispersion including the first and second copolymers. In some embodiments, the first copolymer and the second copolymer are provided in the same polymer particle by using multiple stage polymerization such that one of the first copolymer and second copolymer can be present as a first stage copolymer of a multistage polymer (e.g., as a core in a core/shell polymer particle) and one of the first copolymer and second copolymer can be present as a second stage copolymer of a multistage polymer (e.g., as a shell in a core/shell polymer particle).

An aqueous dispersion comprising a single stage copolymer can be prepared by first charging a reactor with water and optionally at least one surfactant. A seed latex, though optional, can be included in the reactor to help initiate polymerization and helps produce a polymer having a consistent particle size. Any seed latex appropriate for the specific monomer reaction can be used such as a polystyrene seed. The initial charge can also include a chelating or complexing agent such as ethylenediamine tetraacetic acid (EDTA). Other compounds such as buffers can be added to the reactor to provide the desired pH for the emulsion polymerization reaction. For example, bases or basic salts such as KOH or tetrasodium pyrophosphate can be used to increase the pH whereas acids or acidic salts can be used to decrease the pH. The initial charge can then be heated to a temperature at or near the reaction temperature, for example, a reaction temperature between 50° C. and 100° C. (e.g., between 55° C. and 95° C., between 58° C. and 90° C., between 61° C. and 85° C., between 65° C. and 80° C., or between 68° C. and 75° C.).

After the initial charge, a first monomer, and a second monomer that are to be used in the polymerization of the copolymer can be continuously fed to the reactor in one or more monomer feed streams. The monomers can be supplied as a pre-emulsion in an aqueous medium, particularly if acrylate monomers are used in the polymerization. An initiator feed stream can also be continuously added to the reactor at the time the monomer feed stream is added although a portion or all of the initiator may be added to the reactor before adding the monomer. The monomer and initiator feed streams can be continuously added to the reactor over a predetermined period of time (e.g., 1.5-5 hours) to cause polymerization of the monomers and to thereby produce the copolymer dispersion. Optionally, a surfactant can be added at this time as part of either the monomer stream or the initiator feed stream although they can be provided in a separate feed stream. Furthermore, one or more buffers can be included in either the monomer or initiator feed streams or provided in a separate feed stream to modify or maintain the pH of the reactor.

The monomer feed stream can include one or more monomers. The first and the second monomers can be fed in one or more feed streams with each stream including one or more of the monomers being used in the polymerization process. For example, (meth)acrylate monomers (when used) can be provided in separate monomer feed streams or can be added as a pre-emulsion. It can also be advantageous to delay the feed of certain monomers to provide certain polymer properties or to provide a layered or multiphase structure (e.g., a core/shell structure).

An aqueous dispersion comprising a multistage copolymer can be prepared by first charging a reactor with water and optionally at least one surfactant. The initial charge can then be heated to a temperature at or near the reaction temperature, for example, a reaction temperature between 50° C. and 100° C. After the initial charge, an initiator can be added to the reactor before adding a monomer. A monomer feed containing the monomers for a first-stage low molecular weight seed can be continuously fed to the reactor in one or more monomer feed streams. Optionally, a molecular weight regulator is added at this time. After polymerization of the first stage copolymer is complete, a monomer feed stream (containing the monomers for a second-stage high-molecular weight copolymer) and an initiator feed stream can be continuously added to the reactor over a predetermined period of time to cause polymerization of the monomers. One or more buffers can be included in either the monomer or initiator feed streams or added after polymerization in a separate feed stream to modify or maintain the pH of the reactor.

One or more surfactants can be included in the aqueous dispersions to improve certain properties of the dispersions, including particle stability. For example, oleic acid, sodium laureth sulfate, and alkylbenzene sulfonic acid or sulfonate surfactants could be used. Examples of commercially available surfactants include Calfoam® ES-303, a sodium laureth sulfate, and Calfax® DB-45, a sodium dodecyl diphenyl oxide disulfonate, both available from Pilot Chemical Company (Cincinnati, Ohio). In general, the amount of surfactants employed can be from 0.01 to 5%, based on the total amount of the monomers to be polymerized. In some embodiments, the surfactant is provided in an amount less than 2% by weight. The surfactant can be provided in the initial charge of the reactor, provided in the monomer feed stream, provided in an aqueous feed stream, provided in a pre-emulsion, provided in the initiator stream, or a combination thereof. The surfactant can also be provided as a separate continuous stream to the reactor.

The molecular weight of the copolymers can be adjusted by adding a small amount of molecular weight regulators, for example, 0.01 to 4% by weight, based on the monomers being polymerized. Particular regulators which can be used include organic thio compounds (e.g., tert-dodecylmercaptan), allyl alcohols and aldehydes. Such substances are preferably added to the polymerization zone in a mixture with the monomers to be polymerized and are considered part of the total amount of unsaturated monomers used in the polymers.

As described above, the copolymers can be polymerized in a continuous, semi-batch or batch process. Once the desired level of conversion is reached, the polymerization reaction can be terminated by the addition of a shortstop to the reactor. The shortstop reacts rapidly with free radicals and oxidizing agents, thus destroying any remaining initiator and polymer free radicals and preventing the formation of new free radicals. Exemplary shortstops include organic compounds possessing a quinonoid structure (e.g., quinone) and organic compounds that may be oxidized to a quinonoid structure (e.g., hydroquinone), optionally combined with water soluble sulfides such as hydrogen sulfide, ammonium sulfide, or sulfides or hydrosulfides of alkali or alkaline earth metals; N-substituted dithiocarbamates; reaction products of alkylene polyamines with sulfur, containing presumably sulfides, disulfides, polysulfides and/or mixtures of these and other compounds; dialkylhydroxylamines; N,N'-dialkyl-N,N'-methylenebishydroxylamines;

dinitrochlorobenzene; dihydroxydiphenyl sulfide; dinitrophenylbenzothiazyl sulfide; and mixtures thereof. In the case of high temperature polymerizations, polymerization can be allowed to continue until complete monomer conversion, i.e., greater than 99%, in which case a shortstop may not be employed.

Once polymerization is terminated (in either the continuous, semi-batch or batch process), the unreacted monomers can be removed from the polymer dispersion. This stripping process can include a chemical stripping step and/or a physical stripping step. In some embodiments, the polymer dispersion is chemically stripped by continuously adding an oxidant such as a peroxide (e.g., t-butylhydroperoxide) and a reducing agent (e.g., sodium acetone bisulfite), or another redox pair to the reactor at an elevated temperature and for a predetermined period of time (e.g., 0.5 hours). Suitable redox pairs are described by A. S. Sarac in *Progress in Polymer Science* 24, 1149-1204 (1999). An optional defoamer can also be added if needed before or during the stripping step. In a physical stripping step, a water or steam flush can be used to further eliminate the non-polymerized monomers in the dispersion. For example, butadiene monomers can be removed by flash distillation at atmospheric pressure and then at reduced pressure. Styrene monomers can be removed by steam stripping in a column. Once the stripping step is completed, the pH of the polymer dispersion can be adjusted and a biocide or other additives can be added. Cationic, anionic, and/or amphoteric surfactants or polyelectrolytes may optionally be added after the stripping step or at a later time if desired in the end product to provide a cationic or anionic polymer dispersion.

Once the polymerization reaction is complete, and the stripping step is completed, the temperature of the reactor can be reduced.

An antioxidant can be added to copolymers to prevent oxidation and/or ozone present in the atmosphere from cracking the copolymer by cleaving the double bonds in the copolymer. If desired, polymers can be vulcanized or cured to crosslink the polymer thereby increasing the tensile strength and elongation by heating the polymer, typically in the presence of vulcanizing agents, vulcanization accelerators, antireversion agents, and optionally crosslinking agents. The vulcanizing agent can be present from 0.1 to 15%, from 0.3 to 10%, or from 0.5 to 5%, by weight based on the weight of the polymer. Prevulcanization inhibitors can also be added to copolymers to prevent premature vulcanization or scorching of the polymer.

In some embodiments, the copolymer, for example the second copolymer containing acid groups can be a base-neutralized. The copolymer can be neutralized with a volatile amino base. Suitable volatile amine bases for neutralizing the second copolymer can include ammonia, ammonium hydroxide, a low molecular weight organic amine, or combinations thereof.

The aqueous dispersions described herein can have a total solids content of from 20% to 70% by weight (e.g., 25% to 65% by weight, 35% to 60% by weight, or 45% to 50% by weight). In some embodiments, the dispersions can have a total solids content of 45% or greater by weight. In some cases, the aqueous dispersions disclosed herein can have a Brookfield viscosity of 50 cP to 2,500 cP (e.g., 50 cP or greater, 150 cP or greater, 250 cP or greater, 500 cP or greater, 750 cP or greater, 1,000 cP or greater, 1,500 cP or greater, or 1,000 cP or greater, such as from 50 cP to 2,000 cP, 500 cP to 2,500 cP, 500 cP to 2,000 cP, or 1,000 cP to 2,500 cP) at 20° C. The viscosity can be measured using a viscometer with a #2 spindle at 50 rpm at 20° C.

Also provided are coating formulations that include the aqueous dispersions described herein. The coating formulations can further include an additive such as a filler, a pigment, a dispersing agent, a thickener, a defoamer, a surfactant, a biocide, a coalescing agent, a flame retardant, a stabilizer, a curing agent, a flow agent, a leveling agent, a hardener, or a combination thereof. In some embodiments, the additive can be added to impart certain properties to the coating such as smoothness, whiteness, increased density or weight, decreased porosity, increased opacity, flatness, glossiness, decreased blocking resistance, barrier properties, and the like.

The pigment can be selected from $TiO_2$ (in both anastase and rutile forms), clay (aluminum silicate), $CaCO_3$ (in both ground and precipitated forms), aluminum oxide, silicon dioxide, magnesium oxide, talc (magnesium silicate), barytes (barium sulfate), zinc oxide, zinc sulfite, sodium oxide, potassium oxide and mixtures thereof. Examples of commercially titanium dioxide pigments are KRONOS® 2101, KRONOS® 2310, available from Kronos WorldWide, Inc., TI-PURE® R-900, available from DuPont, or TIONA® AT1 commercially available from Millennium Inorganic Chemicals. Titanium dioxide is also available in concentrated dispersion form. An example of a titanium dioxide dispersion is KRONOS® 4311, also available from Kronos World-Wide, Inc. Suitable pigment blends of metal oxides are sold under the marks MINEX® (oxides of silicon, aluminum, sodium and potassium commercially available from Unimin Specialty Minerals), CELITE® (aluminum oxide and silicon dioxide commercially available from Celite Company), and ATOMITE® (commercially available from Imerys Performance Minerals). Exemplary fillers also include clays such as attapulgite clays and kaolin clays including those sold under the ATTAGEL® and ANSILEX® marks (commercially available from BASF Corporation). Additional fillers include nepheline syenite, (25% nepheline, 55% sodium feldspar, and 20% potassium feldspar), feldspar (an aluminosilicate), diatomaceous earth, calcined diatomaceous earth, talc (hydrated magnesium silicate), aluminosilicates, silica (silicon dioxide), alumina (aluminum oxide), mica (hydrous aluminum potassium silicate), pyrophyllite (aluminum silicate hydroxide), perlite, baryte (barium sulfate), Wollastonite (calcium metasilicate), and combinations thereof. More preferably, the at least one filler includes TiO2, CaCO3, and/or a clay.

The pigment can also undergo a thermal treatment process and then, with or without the thermal treatment, can be treated with a material that will facilitate repulsion of water and/or significantly slow the rate of diffusion of the target species (high surface tension or contact angle). In some embodiments, the pigment can be treated with a copolymer such as a styrene acrylic copolymer derived from monomers including styrene, (meth)acrylic acid, (meth)acrylic acid esters, (meth)acrylamide, (meth)acrylonitrile, and mixtures thereof. For example, the styrene acrylic copolymer can include styrene and at least one of (meth)acrylic acid, itaconic acid, methyl (meth)acrylate, ethyl (meth)acrylate, n-butyl (meth)acrylate, isobutyl (meth)acrylate, tert-butyl (meth)acrylate, 2-ethylhexyl (meth)acrylate, (meth)acrylamide, (meth)acrylonitrile, and hydroxyethyl (meth)acrylate.

The coating formulation can include fillers and/or pigments in weight ratios of 90:10, 80:20, 70:30, 60:40, 50:50, 40:60, 30:70, 20:80 or 10:90). In some cases, the coating formulation can include from 1% to 60% by weight (e.g., 1% to 55% by weight, 1% to 50% by weight, or 5% to 50% by weight) of fillers and/or pigments.

Examples of suitable pigment dispersing agents are polyacid dispersants and hydrophobic copolymer dispersants. Polyacid dispersants are typically polycarboxylic acids, such as polyacrylic acid or polymethacrylic acid, which are partially or completely in the form of their ammonium, alkali metal, alkaline earth metal, ammonium, or lower alkyl quaternary ammonium salts. Hydrophobic copolymer dispersants include copolymers of acrylic acid, methacrylic acid, or maleic acid with hydrophobic monomers. In certain embodiments, the composition includes a polyacrylic acid-type dispersing agent, such as Pigment Disperser N, commercially available from BASF SE.

Examples of suitable thickeners include hydrophobically modified ethylene oxide urethane (HEUR) polymers, hydrophobically modified alkali soluble emulsion (HASE) polymers, hydrophobically modified hydroxyethyl celluloses (HMHECs), hydrophobically modified polyacrylamide, and combinations thereof. HEUR polymers are linear reaction products of diisocyanates with polyethylene oxide endcapped with hydrophobic hydrocarbon groups. HASE polymers are homopolymers of (meth)acrylic acid, or copolymers of (meth)acrylic acid, (meth)acrylate esters, or maleic acid modified with hydrophobic vinyl monomers. HMHECs include hydroxyethyl cellulose modified with hydrophobic alkyl chains. Hydrophobically modified polyacrylamides include copolymers of acrylamide with acrylamide modified with hydrophobic alkyl chains (N-alkyl acrylamide). In certain embodiments, the coating composition includes a hydrophobically modified hydroxyethyl cellulose thickener.

Defoamers serve to minimize frothing during mixing and/or application of the coating component. Suitable defoamers include organic defoamers such as mineral oils, silicone oils, and silica-based defoamers. Exemplary silicone oils include polysiloxanes, polydimethylsiloxanes, polyether modified polysiloxanes, and combinations thereof. Exemplary defoamers include BYK®–035, available from BYK USA Inc., the TEGO® series of defoamers, available from Evonik Industries, the DREWPLUS® series of defoamers, available from Ashland Inc., and FOAMASTER® NXZ, available from BASF Corporation.

Suitable surfactants include nonionic surfactants and anionic surfactants. Examples of nonionic surfactants are alkylphenoxy polyethoxyethanols having alkyl groups of about 7 to about 18 carbon atoms, and having from about 6 to about 60 oxyethylene units; ethylene oxide derivatives of long chain carboxylic acids; analogous ethylene oxide condensates of long chain alcohols, and combinations thereof. Exemplary anionic surfactants include ammonium, alkali metal, alkaline earth metal, and lower alkyl quaternary ammonium salts of sulfosuccinates, higher fatty alcohol sulfates, aryl sulfonates, alkyl sulfonates, alkylaryl sulfonates, and combinations thereof. In certain embodiments, the composition comprises a nonionic alkylpolyethylene glycol surfactant, such as LUTENSOL® TDA 8 or LUTENSOL® AT-18, commercially available from BASF SE. In certain embodiments, the composition comprises an anionic alkyl ether sulfate surfactant, such as DISPONIL® FES 77, commercially available from BASF SE. In certain embodiments, the composition comprises an anionic diphenyl oxide disulfonate surfactant, such as CALFAX® DB-45, commercially available from Pilot Chemical.

Other suitable additives that can optionally be incorporated into the first coating component include coalescing agents (coalescents), pH modifying agents, biocides, co-solvents and plasticizers, crosslinking agents (e.g., quick-setting additives, for example, a polyamine such as polyethyleneimine), dispersing agents, rheology modifiers, wetting and spreading agents, leveling agents, conductivity additives, adhesion promoters, anti-blocking agents, anti-cratering agents and anti-crawling agents, anti-freezing agents, corrosion inhibitors, anti-static agents, flame retardants and intumescent additives, dyes, optical brighteners and fluorescent additives, UV absorbers and light stabilizers, chelating agents, cleanability additives, flatting agents, humectants, insecticides, lubricants, odorants, oils, waxes and slip aids, soil repellants, stain resisting agents, and combinations thereof.

Suitable coalescents, which aid in film formation during drying, include ethylene glycol monomethyl ether, ethylene glycol monobutyl ether, ethylene glycol monoethyl ether acetate, ethylene glycol monobutyl ether acetate, diethylene glycol monobutyl ether, diethylene glycol monoethyl ether acetate, dipropylene glycol monomethyl ether, 2,2,4-trimethyl-1,3-pentanediol monoisobutyrate, and combinations thereof.

Examples of suitable pH modifying agents include bases such as sodium hydroxide, potassium hydroxide, amino alcohols, monoethanolamine (MEA), diethanolamine (DEA), 2-(2-aminoethoxy)ethanol, diisopropanolamine (DIPA), 1-amino-2-propanol (AMP), ammonia, and combinations thereof.

Suitable biocides can be incorporated to inhibit the growth of bacteria and other microbes in the coating composition during storage. Exemplary biocides include 2-[(hydroxymethyl)amino]ethanol, 2-[(hydroxymethyl) amino]2-methyl-1-propanol, o-phenylphenol, sodium salt, 1,2-benzisothiazolin-3-one, 2-methyl-4-isothiazolin-3-one (MIT), 5-chloro2-methyland-4-isothiazolin-3-one (CIT), 2-octyl-4-isothiazolin-3-one (OIT), 4,5-dichloro-2-n-octyl-3-isothiazolone, as well as acceptable salts and combinations thereof. Suitable biocides also include biocides that inhibit the growth of mold, mildew, and spores thereof in the coating. Examples of mildewcides include 2-(thiocyanomethylthio)benzothiazole, 3-iodo-2-propynyl butyl carbamate, 2,4,5,6-tetrachloroisophthalonitrile, 2-(4-thiazolyl)benzimidazole, 2-N-octyl4-isothiazolin-3-one, diiodomethyl p-tolyl sulfone, as well as acceptable salts and combinations thereof. In certain embodiments, the coating composition contains 1,2-benzisothiazolin-3-one or a salt thereof. Biocides of this type include PROXEL® BD20, commercially available from Arch Chemicals, Inc. The biocide can alternatively be applied as a film to the coating and a commercially available film-forming biocide is Zinc Omadine® commercially available from Arch Chemicals, Inc.

Exemplary co-solvents and humectants include ethylene glycol, propylene glycol, diethylene glycol, and combinations thereof.

In some embodiments, the coating composition can include the following components (based on total weight of the composition): water 6.8-17.2% by weight, propylene glycol 0.5-2.5% by weight, pigment dispersing agent 0.4-0.85% by weight, a aqueous polymer dispersion described above (at 55-65% by weight polymer(s)) 37.8-41.3% by weight, plasticizer 0-1.0% by weight, defoamer 0.3-1.4% by weight, non-ionic surfactant 0.1% by weight, thickener 0.1-0.4% by weight, titanium dioxide 3.0-11.2% by weight, zinc oxide 0-3.4% by weight, calcium carbonate 27.7-33.7% by weight, talc or kaolin 0.1-18.3% by weight, biocide 0.1-0.3% by weight, and ammonia 0.1-0.3% by weight.

In some embodiments, the coating compositions is substantially free of volatile organic compounds. "Substantially free" means that to the extent the dispersions contain volatile organic compounds, the amount does not result in classification as a material that contributes to the formation of ground-level ozone or smog by the United States Environmental Protection Agency. For example, the dispersion can include less than 0.1%, less than 0.01%, less than 0.001%, less than 0.0001%, or 0% volatile organic compounds based on the aqueous dispersion. In some embodiments, the coating composition include less than or equal to 50 grams per liter (e.g., 45 g/L or less, 40 g/L or less, 35 g/L or less, 30 g/L or less, 25 g/L or less, 20 g/L or less, 15 g/L or less, 10 g/L or less, 9 g/L or less, 8 g/L or less, 7 g/L or less, 6 g/L or less, 5 g/L or less, 4 g/L or less, 3 g/L or less, 2 g/L or less, or 1 g/L or less) of volatile organic compounds. Without wishing to be bound by theory, the acid containing polymer, when added to a latex, the acid-containing polymer can migrate to or into the surface of the latex particles during particle compaction to give the latex particles a plasticized surface. The plasticized surface promotes interfusion of polymer chains at the surface of the later from one particle to another. This event can result in a suppressed minimum filming temperature. Thus, the level of volatile organic solvent added to a composition to promote coalescence can be significantly reduced or eliminated.

The coating compositions can be used for several applications, including adhesives, coatings, carpet backing, paints, foams, textiles, sound absorbing compounds, tape joint compounds, asphalt-aggregate mixtures, waterproofing membranes, and asphalt roofing compounds. In some embodiments, the coating can be provided as a paint, such as a semi-gloss paint. Generally, coatings are formed by applying the coating composition as described herein to a surface, and allowing the coating to dry to form a dried coating. The surface can be, for example, a PVC pipe, concrete, brick, mortar, asphalt, a granulated asphaltic cap sheet, carpet, a granule, pavement, a ceiling tile, a sport surface, an exterior insulation and finish system (EIFS), a vehicle, a spray polyurethane foam surface, a metal, a thermoplastic polyolefin surface, an ethylene-propylene diene monomer (EPDM) surface, a modified bitumen surface, a roof, a wall, a storage tank, and another coating surface (in the case of recoating applications).

The coating composition can be applied to a surface by any suitable coating technique, including spraying, rolling, brushing, or spreading. The composition can be applied in a single coat, or in multiple sequential coats (e.g., in two coats or in three coats) as required for a particular application. Generally, the coating composition is allowed to dry under ambient conditions. However, in certain embodiments, the coating composition can be dried, for example, by heating and/or by circulating air over the coating.

The thickness of the resultant coatings can vary depending upon the application of the coating. For example, the coating can have a dry thickness of at least 10 mils (e.g., at least 15 mils, at least 20 mils, at least 25 mils, at least 30 mils, or at least 40 mils). In some instances, the coating has a dry thickness of less than 100 mils (e.g., less than 90 mils, less than 80 mils, less than 75 mils, less than 60 mils, less than 50 mils, less than 40 mils, less than 35 mils, or less than 30 mils). In some embodiments, the coating has a dry thickness of between 10 mils and 100 mils. In certain embodiments, the coating has a dry thickness of between 10 mils and 40 mils.

The tensile strength of coatings formed from the coating composition can be measured according to ASTM D-2370. Generally, the coatings display tensile after a drying period of at least 14 days, as measured according to ASTM D-2370 of at least 140 psi (e.g., at least 150 psi, at least 160 psi, at least 170 psi, at least 180 psi, at least 190 psi, at least 200 psi, at least 210 psi, at least 220 psi, or at least 225 psi). In some embodiments, the coatings display tensile strength after 1,000 of accelerated weathering, as measured according to ASTM D-2370 of at least 140 psi (e.g., at least 150 psi, at least 160 psi, at least 170 psi, at least 180 psi, at least 190 psi, at least 200 psi, at least 210 psi, at least 220 psi, or at least 225 psi).

The coating composition may exhibit minimal tendencies of blocking (i.e., the adhesion of the coated surface to another coated surface, or the adhesion of the coated surface to an uncoated surface) of the coated substrate. The adhesion of the coating compositions can be measured using the method described in ASTM D 4946-89(2012) entitled "Standard Test Method for Blocking Resistance of Architectural Paints". Briefly, coatings are applied as a 7 mil wet film thickness to a Leneta plain white chart and allowed to dry for a designated period before testing (1 day, 3 days and 7 days). A 1000 g weight is placed on top of a rubber stopper on top of a face-to-face specimen and held for 30 minutes at either room temperature or 50° C. Samples are cooled to room temperature and rated using the ten point scale described in the ASTM standard (10=no tack, perfect; 9=trace tack, excellent; 8=slight tack, very good; 7=slight tack, good; 6=moderate tack, good; 5=moderate tack, fair; 4=severe tack, no seal, fair; 3=5-25% seal, poor; 2=25-50% seal, poor; 1=50-75% seal, poor; 0=complete seal, very poor tack). In some embodiments, the coating compositions exhibit a block resistance of at least 8 or greater as measured in accordance with ASTM D 4946-89.

The scrub resistance of the coating compositions can be measured using the method described in ASTM D 2486-06 (2012) entitled "Standard Test Methods for Scrub Resistance of Wall Paints". Briefly, a controlled coating thickness is applied to a substrate, dried for 7 days, and then scrubbed with an automated device in the presence of a cleaning solution or an abrasive scrub media. The total number of cycles is reported when the underlying substrate appeared in a solid line across a shimmed distance. In some embodiments, the coating compositions exhibit scrub resistance of at least 200 cycles (e.g., at least 250 cycles, at least 300 cycles, at least 350 cycles, at least 400 cycles, at least 450 cycles, at least 500 cycles, at least 600 cycles, at least 700 cycles, at least 800 cycles, at least 900 cycles, at least 1,000 cycles, at least 1,100 cycles, at least 1,200 cycles, at least 1,300 cycles, at least 1,400 cycles, at least 1,500 cycles, at least 1,600 cycles, at least 1,700 cycles, at least 1,800 cycles, or at least 1,900 cycles) as measured in accordance with ASTM D 2486. In some embodiments, the coating compositions exhibit scrub resistance of 2,000 cycles or less (e.g., 1,900 cycles or less, 1,800 cycles or less, 1,700 cycles or less, 1,600 cycles or less, 1,500 cycles or less, 1,400 cycles or less, 1,300 cycles or less, 1,200 cycles or less, 1,100 cycles or less, 1,000 cycles or less, 900 cycles or less, 800 cycles or less, 700 cycles or less, 600 cycles or less, 500 cycles or less, 450 cycles or less, 400 cycles or less, 350 cycles or less, 300 cycles or less, or 250 cycles or less) as measured in accordance with ASTM D 2486.

The coating compositions can exhibit a scrub resistance ranging from any of the minimum values described above to any of the maximum values described above. For example, the coating compositions can exhibit a scrub resistance of from 200 cycles to 2,000 cycles, or from 400 to 2,000 cycles.

The minimum film forming temperature (MFT) of the coating compositions can be measured by initially casting films using a 76 μm gap bar. The films are allowed to equilibrate for two hours. Temperature measurements were obtained on the MFT bar where the film transitioned from a continuous clear film to a cloudy or cracked film (crack point). In some embodiments, the coating compositions exhibit a minimum film forming temperature of from 5° C. or less.

The examples below are intended to further illustrate certain aspects of the methods and compositions described herein, and are not intended to limit the scope of the claims.

EXAMPLES

The following examples are put forth so as to provide those of ordinary skill in the art with a complete disclosure and description of how the compositions and methods described herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1

Low and Zero VOC Waterborne Coatings Using Ammonia Carboxylate-Based Oligomers as Filming Aid Promoters Methods Preparation of Acrylic Particle Dispersions and Acid-Oligomers: A general description of the composition of the particle dispersions and acid-oligomers used in this example is given in Table 1.

TABLE 1

Composition of Acrylic Dispersions A-C and acid-based oligomers A-D

| Sample | Percent Monomer | | | | | Tg (° C.) | MFT (° C.) | Paricle Size (nn) | Mn | Mw | Acid Number | Solids[a] |
|---|---|---|---|---|---|---|---|---|---|---|---|---|
| | MMA | BA | MA | MAA | IOMPA | | | | | | | |
| Dispersion A | 55.5% | 44.0% | | | 0.5% | 21.7 | 15.5 | 89 | 23,500 | 98,200 | 0.0 | 43.3% |
| Dispersion A$_2$ | 55.5% | 44.0% | | | 0.5% | 28.3 | 15.9 | 91 | | | 0.0 | 43.3% |
| Dispersion A$_3$ | 55.5% | 44.0% | | | 0.5% | 25.5 | 16.0 | 89 | 16,371 | 104,270 | 0.0 | 43.3% |
| Dispersion A$_4$ | 55.5% | 44.0% | | | 0.5% | 26.4 | 15.50 | 86 | 16,192 | 100,634 | 0.0 | 42.4% |
| Dispersion A$_5$ | 55.5% | 44.0% | | | 0.5% | 24.4 | 15.00 | 80 | 16,988 | 100,558 | 0.0 | 43.6% |
| Dispersion A$_6$ | 55.5% | 44.0% | | | 0.5% | 26.3 | 16.0 | 77 | 19,242 | 96,418 | 0.0 | 43.3% |
| Dispersion B | 53.5% | 44.0% | | 2.0% | 0.5% | 23.5 | 16.0 | 91 | | | 12.9 | 43.7% |
| Dispersion C | 58.5% | 41.0% | | | 0.5% | 30.8 | 22.0 | 200 | | | 0.0 | 44.0% |
| Polymer A | 11.6% | 61.9% | | 20.0% | 6.5% | −8.4 | | | 3,327 | 6,992 | 129.1 | 22.8% |
| Polymer A$_2$ | 11.6% | 61.9% | | 20.0% | 6.5% | −7.5[c] | <0 | | 2,878 | 6,415 | 129.1 | 23.1% |
| Polymer A$_3$ | 11.6% | 61.9% | | 20.0% | 6.5% | −9.0 | | | 3,360 | 7,007 | 129.1 | 23.8% |
| Polymer B | 11.6% | 66.9% | | 20.0% | 1.5% | 6.7 | | | 8,484 | 31,000 | 129.1 | 25.1% |
| Polymer B$_2$ | 11.6% | 66.9% | | 20.0% | 1.5% | 7.8[d] | <0 | | 7,814 | 32,296 | 129.1 | 23.1% |
| Polymer C | 13.9% | 54.4% | 19.7% | 10.0% | 2.0% | −2.1[e] | <0 | | 6,300 | 20,800 | 64.6 | 22.6% |
| Polymer D | 13.9% | 56.4% | 19.7% | 10.0% | 0.75%[b] | −4.7 | | | 4,420 | 23,120 | 64.6 | 35.0% |

[a]The solids of Polymer's A-D were taken after the resins are cut in water using one equilivant of ammonium hydroxide.
[b]Polymer D using t-BPB (t-butyl peroxybenzoate) as the initiator. The molecular weight was controlled by the temperature in the SGO process.
[c]Hydroplasticized Tg = −29° C.
[d]Hydroplasticized Tg = −7.5° C.
[e]Hydroplasticized Tg = −16° C.

Preparation of Acrylic Dispersions A (MMA/BA/IOMPA: 55.5/44/0.5):

To a 1000 mL reactor equipped with a condenser, feed tube, and three-blade impeller, water (396 g) and di-(2-ethylhexyl) sodium sulfosuccinate (AOT-75, 75% active, 3.50 g) were added. The system was purged with nitrogen while the mixture was heated to 80° C. Ammonium persulfate (2.70 g) dissolved in water (36 g) was then added to the heated mixture. The temperature was held for three minutes. A monomer feed, composed of methyl methacrylate (MMA; 182.3 g), butyl acrylate (BA; 144.5 g), isooctyl 3-mercaptopropionate (IOMPA; 1.64 g), and Aerosol OT-75 (0.88 g) was then started. The monomer feed continued for about 180 minutes. The temperature of the reactor was held at 80° C. for 15 minutes, following completion of the monomer feed. The reactor was cooled to <50° C. Ammonium hydroxide (28%; 4.64 g) was added to the reactor while cooling to give Dispersion A. $T_g$ 21.7° C., MFT=15.5° C., $D_n$=89 nm, pH=9.12, Solids=43.3%, $M_n$=23,500 Daltons (Da), Mw=98,200 Da; MMA/BA/IOMP, 55.5%/45%/0.5%. Grit or scrap was negligible. The calculated solubility parameter and oxygen content of the polymer were 9.53 $(cal/cm^3)^{1/2}$ and 31.4%, respectively. The critical micelle concentration (CMC) of AOT is $2.45 \times 10^{-3}$ M at 25° C. NMR experiments show that the area occupied per AOT molecule on the surface of MMA/BA-based particles of Dispersion A is 7.43 $nm^2$ $mole^{-1}$.

Preparation of Acrylic Dispersions $A_2$:

Dispersion $A_2$ was prepared as described for Dispersion A. Solids=43.3%, Tg=28.4° C., MFT=15.9° C., Dn=91 nm, pH=9.8, η=846 cps at 60 rpm (spindle #2). Grit or scrap was negligible.

Preparation of Acrylic Dispersions $A_3$:

Dispersion $A_3$ was prepared as described for Dispersion A. Solids=43.3%, $T_g$=25.5° C.±0.8° C. at a confidence limit of 95%, MFT=16.0±1.3° C. (95% confidence level), MFT (resist MFT at one hour), 21.0±0.1° C. (95% confidence level). The hydro-plasticized $T_g$ for Dispersion $A_3$ with a $T_g$ of 25.5° C. is 20.1° C. (half-height). At the hydro-plasticized $T_g$, the polymer contains 0.7% bound water. Additional Analyses: Dn=89 nm, pH=9.8, Mn=16,351 Da, Mw=104,270 Da. Grit or scrap was negligible.

Preparation of Acrylic Dispersions $A_4$:

Dispersion $A_4$ was prepared as described for Dispersion A. Solids=42.4%, $T_g$=26.4° C., MFT=15.5° C., Dn=86 nm, pH=9.8, 32 cps at 60 rpm (spindle #1), Mn=16,192 Da, Mw=100,635 Da. Grit or scrap was negligible.

Preparation of Acrylic Dispersions $A_5$:

Dispersion $A_5$ was prepared as described for Dispersion A. Solids=43.6%, $T_g$=24.4° C., MFT=15.0° C., Dn=80 nm, pH=9.8, η=24 cps at 60 rpm (spindle #2), Mn=16,988 Da, Mw=99,127 Da. Grit or scrap was negligible.

Preparation of Acrylic Dispersions $A_6$:

Dispersion $A_6$ was prepared as described for Dispersion A. $T_g$=26.3° C., MFT=15.0° C., Dn=77 nm, pH=9.9, Solids=43.3%, Mn=19242, Mw=96418. Grit or scrap was negligible.

The average $T_g$ and MFT from five separate samples of Dispersion A were as follows: $T_g$=25.4±2° C. (half-height of DSC trace), and MFT=15.5±0.4° C. with a confidence limit of 95%. $M_n$=18,485±3847 Da, $M_w$=100,558±3710 Da. The measured $T_g$ of the polymer from each individual dispersion was used to construct the plots for the Fox-Flory calculations.

Preparation of Acrylic Dispersions B (MMA/BA/MAA/IOMPA: 53.5/44/2/0.5): Dispersion B was prepared as described for Dispersion A except MMA (6.57 g) was replaced with methacrylic acid (MAA, 6.57 grams), $T_g$=23.5° C., MFT=16.0° C., Dn=91 nm, pH=9.1, Solids=43.7%. Grit or scrap was negligible.

Preparation of Acrylic Dispersions C (MMA/BA/IOMPA: 58.5/41.0/0.5): To a 1000 mL reactor equipped with a condenser, feed tube, and three-blade impeller, water (355 g) and Aerosol OT-75 (3.50 g) were added. The system was purged with nitrogen while the mixture was heated to 80° C. Ammonium persulfate (2.70 g) dissolved in water (36 g) was then added to the heated mixture. The temperature was held for three minutes. A monomer feed, composed of methyl methacrylate (MMA; 187.1 g), butyl acrylate (BA; 131.2 g), isooctyl 3-mercaptopropionate (IOMPA; 1.64 g), and Aerosol OT-75 (0.88 g) was then started. The monomer feed continued for about 180 minutes. The temperature of the reactor was held at 80° C. for 15 minutes, following completion of the monomer feed. The reactor was cooled to <50° C. Ammonium hydroxide (28%; 4.64 g) was then added to the reactor to give Dispersion C. $T_g$=30.8° C., MFT=22° C., Dn=200 nm, pH=9.12, Solids=44.0%. The calculated solubility parameter and oxygen content of the polymer were 9.53 $(cal/cm^3)^{1/2}$ and 31.5%, respectively. Grit or scrap was negligible.

Preparation of Polymer A (MMA/BA/MAA/IOMPA:11.6/61.9/20/6.46) by emulsion polymerization: To a 1000 mL reactor equipped with a condenser, feed tube, and three-blade impeller, water (575 g) and Aerosol OT-75 (2.33 g) were added. The system was purged with nitrogen while the mixture was heated to 80° C. Ammonium persulfate (3.45 g) dissolved in water (50 g) was then added to the heated mixture. The temperature was held for three minutes. A monomer feed, composed of methyl methacrylate (21.59 g), butyl acrylate (115.14 g), methacrylic acid (37.19 g), isooctyl 3-mercaptopropionate (12.03 g), and Aerosol OT-75 (0.58 g) was then started. The monomer feed continued for about 90 minutes. The temperature of the reactor was held at 80° C. for 15 minutes, following completion of the monomer feed. The reactor cooled to <50° C. Ammonium hydroxide (28%; 24.9 g) was then added to the reactor to give solubilized polymer A. Solids=22.8%, $T_g$=-8.4° C., Mn=3,327 Da, Mw=6,992 Da. The calculated solubility parameter and oxygen content of the polymer were 9.59 $(cal/cm^3)^{1/2}$ and 30.0%, respectively. Grit or scrap was negligible.

Preparation of Polymer $A_2$:

Polymer $A_2$ was prepared as described for Polymer A. Solids=23.1%, $T_g$=-7.5° C., $T_{g(hydro-plasticized)}$=-29° C.±1° C. (10.2% volatiles, 100% DN with ~1.5 molecules of $H_2O$ per ammonium carboxylate moiety), pH=8.1, Mn=2,878 Da, Mw=6,415 Da, η=580 cps at 60 rpm (spindle #3). Grit or scrap was negligible.

Preparation of Polymer $A_3$:

Polymer $A_3$ was prepared as described for Polymer A. Solids=23.8%, $T_g$=-9.0° C., pH=8.2, Mn=3,360 Da, Mw=7,007 Da, η=1296 cps at 60 rpm (spindle #3). Grit or scrap was negligible.

The average $T_g$ for Polymer A (based on three separate samples, Polymer A, $A_2$, and $A_3$) was as follow: $T_g$=-8.3±1.8° C. (acid form, half-height), Mn=3188±668 Da, Mw=6804±837 Da.

Preparation of Polymer B (MMA/BA/MAA/IOMPA:11.6/66.9/20/1.5) by emulsion polymerization: To a 1000 mL reactor equipped with a condenser, feed tube, and three-blade impeller, water (555 g) and Aerosol OT-75 (2.33 g) were added. The system was purged with nitrogen while the mixture was heated to 80° C. Ammonium persulfate (3.45 g) dissolved in water (50 g) was then added to the heated mixture followed by holding the temperature for three minutes. A monomer feed, composed of methyl methacrylate (21.58 g), butyl acrylate (124.44 g), methacrylic acid (37.19 g), isooctyl 3-mercaptopropionate (2.73 g), and Aerosol OT-75 (0.58 g) was then started. The monomer feed continued for about 90 minutes. The temperature of the reactor was held at 80° C. for 15 minutes, following completion of the monomer feed. The reactor cooled to <50° C. Ammonium hydroxide (28%; 24.9 g) was then added to the reactor to give solubilized polymer B. Solids=25.1%, $T_g$=6.7° C., Mn=8,484 Da, Mw=31,000 Da, pH=8.2. The calculated solubility parameter and oxygen content of the polymer were 9.65 $(cal/cm^3)^{1/2}$ and 30.0%, respectively. Grit or scrap was negligible.

Preparation of Polymer $B_2$:

Polymer $B_2$ was prepared as described for Polymer B. Solids=23.1%, Tg=7.8° C., $Tg_{(hydro-plasticized)}$=−7.5° C., pH=8.5, Mn=7,814 Da, Mw=32,296 Da, η>10,000 cps at 30 rpm (spindle #1). Grit or scrap was negligible.

Preparation of Polymer C (MMA/BA/MA/MAA/IOMPA:13.9/54.4/19.7/10/2) by emulsion polymerization: To a 1000 mL reactor equipped with a condenser, feed tube, and three-blade impeller, water (900 g) and Aerosol OT-75 (2.88 g) were added. The system was purged with nitrogen while the mixture was heated to 80° C. Ammonium persulfate (4.27 g) dissolved in water (31 g) was then added to the heated mixture followed by holding the temperature for three minutes. The monomer feed was then started. The monomer feed was composed of methyl methacrylate (40.0 g), butyl acrylate (156.0 g), methacrylic acid (28.73 g), methyl acrylate (56.72 g), and 5.71 g of isooctyl 3-mercaptopropionate. The monomer feed continued for about 90 minutes. The temperature of the reactor was held at 80° C. for 15 minutes, following completion of the monomer feed, then the reactor cooled to <50° C. Ammonium hydroxide (28%; 21.1 g) was then added to the reactor to give solubilized polymer C. Solids=22.6%, $T_g$=2.1° C., $M_n$=6,300 Da (est), Mw=20,800 Da, pH=8.2. The calculated solubility parameter and oxygen content of the polymer were 9.65 $(cal/cm^3)^{1/2}$ and 43.4%, respectively. Grit or scrap was negligible. Three repeat syntheses of this low-molecular weight acid-based polymer gave $M_n$'s of 5994, 6516 and 5731 Da and Mw's of 20,203, 21,785, 17007 Da, respectively. The $T_g$'s of these three repeat samples were 0.3, −0.6, and −3.1° C. The average Mn, Mw, and Tg values are as follows: 6135±551 Da, 19949±3307 Da, and −1.7±2.8° C.

The hydro-plasticized Tg for the oligomer with a Tg of −3.1° C. as an ammonium carboxylate-based oligomer hydrated with molecularly bound water is −16° C.

Preparation of Polymer D by the SGO Process: Un-neutralized polymer D resin was supplied by the N-GMU/H group. The composition of polymer D was MMA/BA/MA/MAA/t-BPB: 13.9/56.4/19.7/10/0.75. $T_g$=−4.7° C., $M_n$=4220 Da; Mw=23120 Da. To a 1000 mL reactor equipped with a condenser, feed tube, and three-blade impeller, 120 g of polymer D resin, 275 g of water, and 8.2 g of ammonium hydroxide (28%) were added. The mixture was heated to 60° C. and stirred until a homogenous resin solution was obtained. Solids=35%.

Rheology Controlled Domain (RCD):

A general description of the composition of the RCDs used in this example is given in Table 2. RCD encompasses a support resin that is prepared by emulsion polymerization which is then added to a polymerization reactor to a support an emulsion polymerization process. RCD also encompasses in-situ preparation of a support resin during a total emulsion polymerization process to prepare a resin supported emulsion. Rheology Controlled (RC) emulsion encompasses a process wherein the disclosed acid-based solid grade oligomer (SGO), prepared by the high-temperature process in Wyandotte, Mich., are added to water with a suitable base such as ammonium hydroxide. The resulting mixture can then be used to support the emulsion polymerization process.

TABLE 2

Composition of Rheology Controlled Domain (RCD)

| Samples | Percent Monomer Resin Phase | | | | | Resin Tg (° C.) | Resin | Percentrcent Monomer Resin Pha | | | | | RCD Tg (° C.) | MFT | Solids |
| --- | --- | --- | --- | --- | --- | --- | --- | --- | --- | --- | --- | --- | --- | --- | --- |
| | MMA | BA | MA | MAA | IOMPA | | | MMA | BA | UMA | DAAM | IOMPA | | | |
| RCD A | 13.9% | 54.3% | 19.7% | 10.0% | 2.0% | −0.1 | 25.0% | 55.0% | 44.0% | | | 0.50% | 23.0 | 10.0 | 44.8% |
| RCD B | 13.9% | 54.3% | 19.7% | 10.0% | 2.0% | 0.3 | 25.0% | 55.0% | 44.0% | | | 0.50% | 21.3 | 0.0 | 49.2% |
| RCD C | 13.9% | 53.8% | 22.7% | 7.0% | 2.5% | −5 (cal'd) | 22.0% | 49.0% | 49.4% | 1.0% | 0.25% | 0.50% | 14.0 | 0.0 | 50.2% |
| RCD D | 13.9% | 53.8% | 22.8% | 7.0% | 2.5% | −5 (cal'd) | 22.0% | 49.0% | 49.3% | 1.0% | 0.25% | 0.50% | 14.0 | 0.0 | 50.2% |
| RCD E | 13.9% | 53.8% | 22.8% | 7.0% | 2.5% | −5 (cal'd) | 22.0% | 51.6% | 46.7% | 1.0% | 0.25% | 0.50% | 21.0 | 2.5 | 50.6% |
| RCD F | 13.9% | 53.8% | 22.8% | 7.0% | 2.5% | −5 (cal'd) | 22.0% | 54.1% | 44.2% | 1.0% | 0.25% | 0.50% | 22.8 | 4.5 | 49.9% |
| RCD G | 13.9% | 53.8% | 22.8% | 7.0% | 2.5% | −5 (cal'd) | 22.0% | 49.0% | 49.5% | 1.0% | 0.25% | 0.25% | 13.9 | 0.0 | 50.3% |
| RCD H | 13.9% | 53.8% | 22.8% | 7.0% | 2.5% | −5 (cal'd) | 22.0% | 49.0% | 49.7% | 1.0% | 0.25% | 0.12% | 14.0 | 0.5 | 49.6% |
| RCD I | 13.9% | 53.8% | 22.8% | 7.0% | 2.5% | −5 (cal'd) | 22.0% | 49.0% | 49.8% | 1.0% | 0.25% | 0.00% | 14.2 | 1.2 | 50.0% |
| RCD J[a] | 13.9% | 53.8% | 22.8% | 7.0% | 2.5% | −5 (cal'd) | 22.0% | 51.6% | 46.7% | 1.0% | 0.25% | 0.50% | 18.2 | 3.8 | 49.6% |
| RCD K[b] | 13.9% | 53.8% | 22.8% | 7.0% | 2.5% | −5 (cal'd) | 22.0% | 51.6% | 46.7% | 1.0% | 0.25% | 0.50% | 18.8 | 0.7 | 49.6% |

[a]RCD's A-I were prepared using AOT to improve the process.
[b]RCD J contained no surfactant. b. RCD K was prepared using SDS. The acid number of RCD A and B is 16. The acid number of RCD C thru RCD K is 9.9.

Preparation of RCD A:

To a 1000 mL reactor equipped with a condenser, feed tube, and three-blade impeller, 138.0 g of water, 164.9.0 g of Polymer C, and 4.0 g of ammonium hydroxide were added. Residual ammonium hydroxide was rinsed into the reactor using 8.5 g of water. The system was purged with nitrogen while the mixture was heated to 80° C. Ammonium persulfate (1.89 g) dissolved in water (25.2 g) was then added to the heated mixture followed by holding the temperature for three minutes. Residual ammonium persulfate was rinsed from the flask using 7 g of water. The monomer feed was then started. The monomer feed was composed of 127.6 g of methyl methacrylate (MMA), 101.2 g of butyl acrylate, and 1.15 g of isooctyl 3-mercaptopropionate. The monomer feed continued for about 180 minutes. A total of 7.0 g of water was used to flush the monomer line. The temperature of the reactor was held at 80° C. for 30 minutes, following completion of the monomer feed, then the reactor cooled to <50° C.

Ammonium hydroxide (28%; 4.64 g) was then added to the reactor to give RCD A. Solids=44.8%, $T_g$=23° C., MFT=10.0° C., Dn=103 nm, pH=9, Mn=14,200 Da, Mw=66,400 Da. Grit or scrap was negligible.

Preparation of RCD B:

To a 1000 mL reactor equipped with a condenser, feed tube, and three-blade impeller, 273 g of water, 245 g of Polymer C, 3.7 g of AOT-75, and 2.62 g of sodium carbonate were added. The system was purged with nitrogen while the mixture was heated to 65° C. A monomer feed containing 190 g of MMA, 150 g of BA, 1.7 g of IOMPA, and 0.9 g of Aerosol OT-75 was prepared. The monomer feed (12.0 g), ammonium persulfate (0.2 g) dissolved in water (3.0 g), sodium hydrosulfite (0.1 g) dissolved in water (3.0 g), and a 0.25% of a ferrous sulfated water solution (0.32 g) where the ferrous ion was complexed with ethylenediaminetetraacetic acid were added to the reactor. The contents in the reactor were held for 5 minutes after which, t-butyl hydroperoxide (1.24 g) was added. The remainder of the monomer feed and ascorbic acid (0.4 g) dissolved in water (19 g) were fed into the reactor over 90 minutes. t-Butyl hydroperoxide (0.4 g) was then added to the reactor, immediately followed by adding isoascorbic acid (0.2 g), then iron (II) sulfate (0.01 g) dissolved in water (11 g). The temperature of the reactor was held at 65° C. for 30 minutes, then the reactor cooled to 45° C. The pH was adjusted by adding ammonium hydroxide (28%; 4.8 g) to give RCD B. Solids=50.1%, Tg=21.3° C. ($3^{rd}$ heat), MFT=0° C., Dn=135 nm, pH=8.3. No filterable grit or scrap was collected.

Preparation of RCD C:

To a 2000 mL reactor equipped with a condenser, feed tube, and three-blade impeller, 656 g of water and 2.44 g of Aerosol OT-75 were added. The system was purged with nitrogen while the mixture was heated to 80° C. Ammonium persulfate (2.75 g) dissolved in water (6.4 g) was then added to the heated mixture followed by holding the temperature for three minutes. The monomer feed was then started. The monomer feed was composed of 28.72 g of MMA, 111.0 g of BA, 14.4 g of MAA, 46.9 g of methyl acrylate (MA), and 5.2 g of isooctyl 3-mercaptopropionate (IOMPA). The monomer feed continued for about 90 minutes. The temperature of the reactor was held at 80° C. for 30 minutes, following completion of the monomer feed. Water (167.5 g), sodium carbonate (5.5 g), and AOT-75 (7.8 g) were added to the reactor and then the reactor cooled to 65° C. A 0.25% solution of ferrous sulfated water solution, where the ferrous ion was complexed with ethylenediaminetetraacetic acid, was then added to the reactor. A second monomer feed was then started. The second monomer feed was composed of 29.23 g of a ureidoethyl methacrylate (UMA) solution (25% UMA in MMA), 1.8 g of diacetone acrylamide (DAAM), 335.1 g of MMA, 361 g of BA, 1.8 g of IOMPA, and 1.9 g of Aerosol OT-75. After addition of 18.0 g of the monomer feed, the reactor was held for 5 minutes at 65° C. An initiator solution composed of APS (0.44 g) dissolved in water (6.4 g) and sodium hydrosulfite (0.22 g) dissolved in water (6.4 g) were added to the reactor. After about 3 minutes, t-butyl hydroperoxide (2.6 g) was added to the reactor. The remainder of the monomer feed and isoascorbic acid (0.8 g) dissolved in water (40 g) were added to the reactor over 90 minutes. t-Butyl hydroperoxide (0.8 g) was then added to the reactor, immediately followed by adding isoascorbic acid (0.4 g), then iron (II) sulfate (0.01 g) dissolved in water (12 g). The temperature of the reactor was held at 65° C. for 30 minutes, then the reactor cooled to 45° C. The pH was adjusted by adding ammonium hydroxide (28%; 10 g) to give RCD C. Solids=50.2%, $T_g$=14° C., MFT=0° C., Dn=87 nm, pH=9.3. Filterable grit or scrap was 4.2 g.

Preparation of RCD D:

A first-stage low-molecular weight seed, (MMA/BA/MA/MAA:13.93/53.82/22.76/7.0/2.5) with a volume fraction of total polymer of 22% was prepared as follows. To a 2000 mL reactor equipped with a condenser, feed tube, and three-blade impeller, 656 g of water and 2.44 g of Aerosol OT-75 were added. The system was purged with nitrogen while the mixture was heated to 80° C. Ammonium persulfate (2.75 g) dissolved in water (6.4 g) was then added to the heated mixture followed by holding the temperature for three minutes. A monomer feed containing 28.72 g of MMA, 111.0 g of BA, 14.4 g of MAA, 46.9 g of methyl acrylate (MA), and 5.2 g of isooctyl 3-mercaptopropionate (IOMPA) was prepared. The monomer feed was then started. The monomer feed continued for about 90 minutes. The temperature of the reactor was held at 80° C. for 30 minutes, following completion of the monomer feed. Water (167.5 g), sodium carbonate (5.5 g), and AOT-75 (7.8 g) were added to the reactor and then the reactor cooled to 65° C. A 0.25% solution of ferrous sulfated water solution (0.32 g), where the ferrous ion was complexed with ethylenediaminetetraacetic acid, was then added to the reactor.

A second-stage high-molecular weight polymer, (UMA/DAAM/MMA/BA/IOMPA: 4.01/0.25/45.97/49.28/0.49), Mw=96,500 Da was prepared as follows. A monomer feed composed of 29.23 g of ureidoethyl methacrylate (UMA) solution (25% UMA in MMA), 1.8 g of diacetone acrylamide (DAAM), 335.1 g of MMA, 369.2 g of BA, 3.6 g of IOMPA, and 1.9 g of Aerosol OT-75 was prepared. The monomer feed (18.0 g) was started in a reactor. The temperature of the reactor was held at 65° C. for 5 minutes, then an initiator solution composed of APS (0.44 g) dissolved in water (6.4 g) and sodium hydrosulfite (0.22 g) dissolved in water (6.4 g) was added to the reactor. The temperature of the reactor was held for 3 minutes after which, t-butyl hydroperoxide (2.6 g) was added. The remainder of the monomer feed and ascorbic acid (0.8 g) dissolved in water (40 g) were fed into the reactor over 90 minutes. t-Butyl hydroperoxide (0.8 g) was then added to the reactor, immediately followed by adding isoascorbic acid (0.4 g), then iron (II) sulfate (0.01 g) dissolved in water (12 g). The temperature of the reactor was held at 65° C. for 30 minutes, then the reactor cooled to 45° C. The pH was adjusted by adding ammonium hydroxide (28%; 10 g) to give RCD D. Solids=50.2%, $T_g$=14° C., MFT=0° C., pH=9.5, η=82 cps (#4 spindle @ 30 rpm). Filterable grit or scrap was <0.5 g.

Preparation of RCD E:

a first-stage low-molecular weight seed, (MMA/BA/MA/MAA: 13.93/53.82/22.76/7.0/2.5), with volume fraction of total polymer of 22% was prepared as follows. To a 2000 mL reactor equipped with a condenser, feed tube, and three-blade impeller, 656 g of water and 2.44 g of Aerosol OT-75 were added. The system was purged with nitrogen while the mixture was heated to 80° C. Ammonium persulfate (2.75 g) dissolved in water (6.4 g) was then added to the heated mixture followed by holding the temperature for three minutes. A monomer feed containing 28.72 g of MMA, 111.0 g of BA, 14.4 g of MAA, 46.9 g of methyl acrylate (MA), and 5.2 g of isooctyl 3-mercaptopropionate (IOMPA) was prepared. The monomer feed was then started. The monomer feed continued for about 90 minutes. The temperature of the reactor was held at 80° C. for 30 minutes, following completion of the monomer feed. Water (167.5 g), sodium carbonate (5.5 g), and AOT-75 (7.8 g) were added to the reactor and then the reactor cooled to 65° C. A 0.25% solution of ferrous sulfated water solution (0.32 g), where the ferrous ion was complexed with ethylenediaminetetraacetic acid, was then added to the reactor.

A second-stage high-molecular weight polymer, (UMA/DAAM/MMA/BA/IOMPA: 4.01/0.25/48.97/46.68/0.49), Mw=502,300 Da was prepared as follows. A monomer feed composed of 29.23 g of an ureidoethyl methacrylate (UMA) solution (25% UMA in MMA), 1.8 g of diacetone acrylamide (DAAM), 354.04.1 g of MMA, 340.24 g of BA, 3.6 g of IOMPA, and 1.9 g of Aerosol OT-75 was prepared. The monomer feed (18.0 g) was started in a reactor. The temperature of the reactor was held at 65° C. for 5 minutes, then an initiator solution composed of APS (0.44 g) dissolved in water (6.4 g) and sodium hydrosulfite (0.22 g) dissolved in water (6.4 g) was added to the reactor. The contents of the reactor was held for 3 minutes after which, t-butyl hydroperoxide (2.6 g) was added. The remainder of the monomer feed and ascorbic acid (0.8 g) dissolved in water (40 g) were fed into the reactor over 90 minutes. t-Butyl hydroperoxide (0.8 g) was then added to the reactor, immediately followed by adding isoascorbic acid (0.4 g), then iron (II) sulfate (0.01 g) dissolved in water (12 g). The temperature of the reactor was held at 65° C. for 30 minutes, then the reactor cooled to 45° C. The pH was adjusted by adding ammonium hydroxide (28%; 10 g) to give RCD E. Solids=50.6%, $T_g$=20.2° C. (Fox-Flory calculated Tg for the polymer formed from second-stage of monomer addition is 21° C.), MFT=2.5° C., pH=9.2, η=389 cps (#2 spindle @ 60 rpm). Filterable grit or scrap was <0.5 g.

Note:

The 1$^{st}$ stage of the process was repeated and the $T_g$ of polymer in its acid form and molecular weight were measured. The $T_g$, Mn and Mw of the 1$^{st}$ phase are −7.1° C., 5660 and 19620 Da, respectively.

Preparation of RCD F:

A first-stage low-molecular weight seed, (MMA/BA/MA/MAA:13.93/53.82/22.76/7.0/2.5), with a volume fraction of total polymer of 22% was prepared as follows. To a 2000 mL reactor equipped with a condenser, feed tube, and three-blade impeller, 656 g of water and 2.44 g of Aerosol OT-75 were added. The system was purged with nitrogen while the mixture was heated to 80° C. Ammonium persulfate (2.75 g) dissolved in water (6.4 g) was then added to the heated mixture followed by holding the temperature for three minutes. A monomer feed containing 28.72 g of MMA, 111.0 g of BA, 14.4 g of MAA, 46.9 g of methyl acrylate (MA), and 5.2 g of isooctyl 3-mercaptopropionate (IOMPA) was prepared. The monomer feed was then started. The monomer feed continued for about 90 minutes. The temperature of the reactor was held at 80° C. for 30 minutes, following completion of the monomer feed. Water (167.5 g), sodium carbonate (5.5 g), and AOT-75 (7.8 g) were added to the reactor and then the reactor cooled to 65° C. A 0.25% solution of ferrous sulfated water solution (0.32 g), where the ferrous ion was complexed with ethylenediaminetetraacetic acid, was then added to the reactor.

A second-stage high-molecular weight polymer, (UMA/DAAM/MMA/BA/IOMPA:4.01/0.25/51.0/44.15/0.49), Mw=76,600 Da was prepared as follows. A monomer feed composed of 29.23 g of a ureidoethyl methacrylate (UMA) solution (25% UMA in MMA), 1.8 g of diacetone acrylamide (DAAM), 372.52 g of MMA, 321.8 g of BA, 3.6 g of IOMPA, and 1.9 g of Aerosol OT-75 was prepared. The monomer feed (18.0 g) was started in a reactor. The temperature of the reactor was held at 65° C. for 5 minutes, then an initiator solution composed of APS (0.44 g) dissolved in water (6.4 g) and sodium hydrosulfite (0.22 g) dissolved in water (6.4 g) was added to the reactor. The contents of the reactor was held for 3 minutes after which, t-butyl hydroperoxide (2.6 g) was added. The remainder of the monomer feed and ascorbic acid (0.8 g) dissolved in water (40 g) were fed into the reactor over 90 minutes. t-Butyl hydroperoxide (0.8 g) was then added to the reactor, immediately followed by adding isoascorbic acid (0.4 g), then iron (II) sulfate (0.01 g) dissolved in water (12 g). The temperature of the reactor was held at 65° C. for 30 minutes, then the reactor cooled to 45° C. The pH was adjusted by adding ammonium hydroxide (28%; 10 g) to give RCD F. Solids=49.9%, Tg=22.9° C., MFT=4.5° C., pH=9.4, η=56 cps (#1 spindle @ 30 rpm), Dn=87 nm; Dv=105 nm. Filterable grit or scrap was 2 g.

Preparation of RCD G:

a first-stage low-molecular weight seed was prepared as follows. Polymerization and the composition of the first stage polymer for RCD G are the same as described for RCD D. A second-stage high-molecular weight polymer, (UMA/DAAM/MMA/BA/IOMPA: 4.01/0.25/45.97/49.52/0.25), Mw=146,100 Da was prepared as follows. Polymerization of the second stage polymer for RCD G are the same as described for RCD D. The monomer feed of the second stage was composed of 29.23 g of an ureidoethyl methacrylate (UMA) solution (25% UMA in MMA), 1.8 g of diacetone acrylamide (DAAM), 335.12 g of MMA, 359.2 g of BA, 3.6 g of IOMPA. Solids=50.3%, Tg=13.9° C., MFT=0° C., pH=9.3, Dn=87 nm; Dv=104 nm. Filterable grit or scrap was 4.2 g.

Preparation of RCD H:

A first-stage low-molecular weight seed was prepared as follows. Polymerization and the composition of the first stage polymer for RCD H are the same as described for RCD D. A second-stage high-molecular weight polymer, (UMA/DAAM/MMA/BA/IOMPA: 4.01/0.25/45.97/49.65/0.12), Mw=240,050 Da was prepared as follows. Polymerization of the second stage polymer for RCD H are the same as described for RCD D. The monomer feed of the second stage was composed of 29.23 g of a ureidoethyl methacrylate (UMA) solution (25% UMA in MMA), 1.8 g of diacetone acrylamide (DAAM), 335.12 g of MMA, 359.2 g of BA, 3.6 g of IOMPA. Solids=50.3%, Tg=14.0° C., MFT=0.5° C., pH=9.3, η=61 cps (#1 spindle @ 60 rpm), Dn=85 nm; Dv=98 nm. Filterable grit or scrap was 1.2 g.

RCD I:

Polymerization process and the composition of the first stage were the same as that for RCD D. The composition of the second-stage high-molecular weight polymer, (UMA/DAAM/MMA/BA: 4.01/0.25/45.97/49.77, Mw=468,691 Da) was prepared as follows. The monomer feed of the second stage was composed of 29.23 g of an ureidoethyl methacrylate (UMA) solution (25% UMA in MMA), 1.8 g of diacetone acrylamide (DAAM), 335.12 g of MMA, 362.8 g of BA. Solids=50.0%, Tg=17.5° C. (2$^{nd}$ heat); 14.2° C. (3$^{rd}$ heat), MFT=1.2° C., pH=9.3, η=85 cps (#1 spindle @ 30 rpm), Dn=85 nm; Dv=101 nm. Filterable grit or scrap was 2.8 g.

Preparation of RCD J:

The polymerization and composition of the polymer for RCD J were the same as described for RCD E, except no AOT (surfactant) was used in the process or composition of the dispersion. Solids=49.6%, Tg=18.2° C., MFT=3.8° C., pH=9.3, η=49 cps (#1 spindle @ 60 rpm), Dn=70 nm. Dv is bi-modal: 77 and 384 nm. Filterable grit or scrap was <1 g.

Preparation of RCD K:

The polymerization and composition of the polymer for RCD K were the same as described for RCD D, except 12.2 g of SDS-15 (15% solids) was used in placed of the AOT-75 for the first-stage monomer feed. No surfactant is used in the second-stage monomer feed. Solids=49.6%, Tg=18.8° C., MFT=0.7° C., pH=9.3, η=44 cps (#1 spindle @ 60 rpm), Dn=58 nm (unimodal). Dv is bi-modal: 74 and 733 nm (small in comparison to the peak at 74 nm). Filterable grit or scrap was <1 g.

Preparation of Joncryl 624:

Joncryl 624 is a commercial RC emulsion that contains (on a dry basis) 26% of an ammonium neutralized acid-based oligomers and a high-molecular weight polymer. The oligomer contains monomer units from styrene, alpha-methyl styrene, acrylic acid, and carbitol acrylate (acid number of oligomer, 205). The high-molecular weight polymer contains methyl methacrylate, 2-ethyl hexyl acrylate, and butyl acrylate. Joncryl J624 characterization: pH, 8.2-8.7; acid number, 50; MFT, 12° C.; two Tgs; −25 and 137° C.; particle size, 76 nm; gel fraction, 65% (MEK). Molecular weight of the oligomer, Mn=3,100 Da; Mw=8,900 Da; surface tension, 40 dyne/cm.

Preparation of Semi-Gloss Paints and Property Measurements:

235 g of the copolymer dispersion (50% solids), 2 g Foam Brake 798, 2 g Pluracoat Performa CF 20, and 1 g $NH_3$ (28%) were weighed and added to a metal container. The container was placed on a Dispermat mixer equipped with a pigment grinding blade. The mixture was stirred rapidly (800 rpm) for about 5 minutes. The stirred mixture was slowly added to Minex 7 (30 g) and Ti-Pure R706 (200 g). The rate at which the mixture was stirred was adjusted as needed to achieve a "rolling doughnut" effect (2500 rpm). Stirring was then slowed (800 rpm). 235 g polymer (50% solids), 2 g Foam Brake 798, 100 g DI Water, and 0.5 g Foamstar ST 2445 were then added and the mixture stirred for an additional 10 minutes. Rheovis PE 1331 and Rheovis PU1191 were then added and the mixture slowly stirred for an additional 15 minutes to achieve the desired viscosity. (ICI=1.25±0.25 and KU=95±5).

Method for Block Test:

A paint film was cast using a 7 mil Dow Latex Film Caster onto Leneta Form WB and allowed to dry at CTH (25° C. and 50% relative humidity) for 24 hours. Dried samples were cut into squares 1.5 inch by 1.5 inch. 4 squares allow duplicate runs. The samples were placed face to face in a 50° C. oven on a steel plate. On top of the samples was placed a #7 rubber stopper with the large side down and on top was placed a 1 kg weight (93 g/cm$^2$). Samples were left in the oven for 30 minutes, removed and allowed to stand at CTH for 10 minutes. The samples were separated and block performance rated on a scale of 1 to 10 (10 high).

Another set of 4 samples was prepared and placed face to face on a steel panel at CTH. On top of the samples was placed a #7 rubber stopper with the large side down and on top was placed a 1 kg weight. Samples were left at CTH for 24 hours, the weights were removed and the samples were separated and block performance rated on a scale of 1 to 10 (10 high). Both tests were repeated with films dried 7 days at CTH.

Method for Scrub Test:

A paint film was cast using a 7 mil Dow Latex Film Caster onto Leneta Form P-121-10N and allowed to dry at CTH (25° C. and 50% relative humidity) for 7 days. Dried samples were framed and clamped, coated side up onto a Gardco Washability & Wear Tester fitted with a custom-made plate with steel shims. Instrument was fitted with previously conditioned scrub brushes each loaded with 7.5 mL "Leneta Standardized Scrub Media" Item SC-2 and turned on. Immediately, 5 mL deionized water was placed along the path of each brush.

Paint film was observed and the number of cycles at which paint was fully removed in a continuous line across the shim was noted for each of 4 test areas. If failure did not occur after 400 cycles, testing was paused to add an additional 7.5 mL scrub media to each brush testing was resumed and immediately 5 mL deionized water were added along the path of each brush. Add additional scrub media and water as previously every 400 cycles until film failure for all 4 test areas.

Method for MFT Measurements:

MFT measurements were made on a minimum film forming temperature bar designed by Paul Gardner Company. Films were cast using a 76 μm gap bar. Films were allowed to equilibrate for 2 hours. Temperature measurements were obtained on the MFT bar where the film transitioned from a continuous clear film to a cloudy or cracked film (crack point).

Method for Atomic Force Microscopy Measurements:

For selected films, the films were cast over Al foil on an MFT bar and samples taken at a specific temperature after one hour. The film surface and cryo-ultramicrotomed (−30° C./50 nm) X-sections were imaged using TappingMode™[1] on a Multimode AFM and Nanoscope IIIa Controller (Bruker Nanosurfaces, Santa Barbara, Calif.) Samples were kept in a freezer until imaged. Images shown in this example are in the phase mode.

Method for DSC measurements of Dry and Hydro-plasticized:

DSC measurements of dried films were taken at 15° C./minutes except where noted. Tg measurements were taken at the half-height. The films were dried, using the method discussed in the results and discussion section of this example.

Hydro-Plasticized Tg Measurement of Dispersion $A_2$.

The films were cast over glass from samples (e.g. Polymer A) at 22.8% solids. The dry film thickness was 5 μm. Samples were aged at laboratory temperature (~22° C.) and samples (~12 mg) were taken every two minutes for DSC analysis. The scan speed was 15 degrees per minute from −80 to 55° C. Measurements were made every two minutes. An ice endothermic transition was visible at −11° C. indicating bulk water. After 13 minutes, a Tg of −20° C. was visible for Polymer $A_2$ as bulk water evaporated from the film. Weight loss measurements show the film contained 18.4% ammonia and water. After 15 minutes no ice endothermic transition was observed indicating the loss of bulk water from the film. A hydro-plasticized Tg of −7.5 was observed. Mass loss measurement shows the film now contains 9.3% ammonia and water. The water present after 15 minutes was assumed to be molecularly bounded water.

Hydro-Plasticized $T_g$ Measurement of Dispersion $A_3$.

The polymer was dried over glass for 2 hour at room temperature, then it was heated at 80° C. for 5 minutes in a forced-air oven. A sample was scraped from the glass and placed in a sealed TO container with 3.8% water (based on sample weight). The first heat in the DSC was from 20 to 90° C. (to condition the sample), the second heat was from −15 to 90° C., $T_g$=20.4; third heat was from −30 to 90° C., Tg=20.1° C. $T_g$'s were taken at the half-height and the heating rate was 10° C./minute.

Results and Discussion

It is preferred that latex films in paints form clear films at temperatures <4° C.

Minimum film formation temperature (MFT) is one useful measurement to test if waterborne films meet this characteristic. MFT measurements are obtained on the MFT bar where the latex film transitions from a continuous clear film to a cloudy or cracked film. Architectural paints are usually formulated with solvents so that the paint has a MFT that is ≤4° C., but >0° C. to minimize the level of filming aid added. The solvents allow the paint to form a continuous film at lower temperatures because solvents lower the $T_g$ or modulus of the binder in the paint formulation. As the paint film ages, the filming aids leave the paint film. The result is that the $T_g$ of the binder in the paint film increases allowing block resistance to be obtained.

Rhoplex SG-30, an architectural dispersion designed by Rohm and Haas, was chosen as the control dispersion for this example. Rhoplex SG-30 is a MMA/BA-based polymer with a Tg of 22° C. and a MFT of 14° C. The difference between the Tg and MFT of the acrylate-based dispersions can be maximized to increase the scrub resistance, as described by Even et al. (U.S. Pat. No. 6,524,656). Analytical analyses of the redox composition show the presence of t-butanol and acetone in the water phase of Rhoplex SG-30. These compounds are by-products of the redox reaction that uses t-butyl hydroperoxide. In addition, a t-butyl moiety is detected as a possible end group in the polymer. The composition also contains levels of fluorinated surfactants, presumably to improve block resistance of this relatively soft polymer. The fluorinated surfactants detected were $CF_3(CH_2)_6CH_2CH_2)OH$ (major component) and $CF_3(CH_2)_8CH_2CH_2)OH$.

Figure 2:
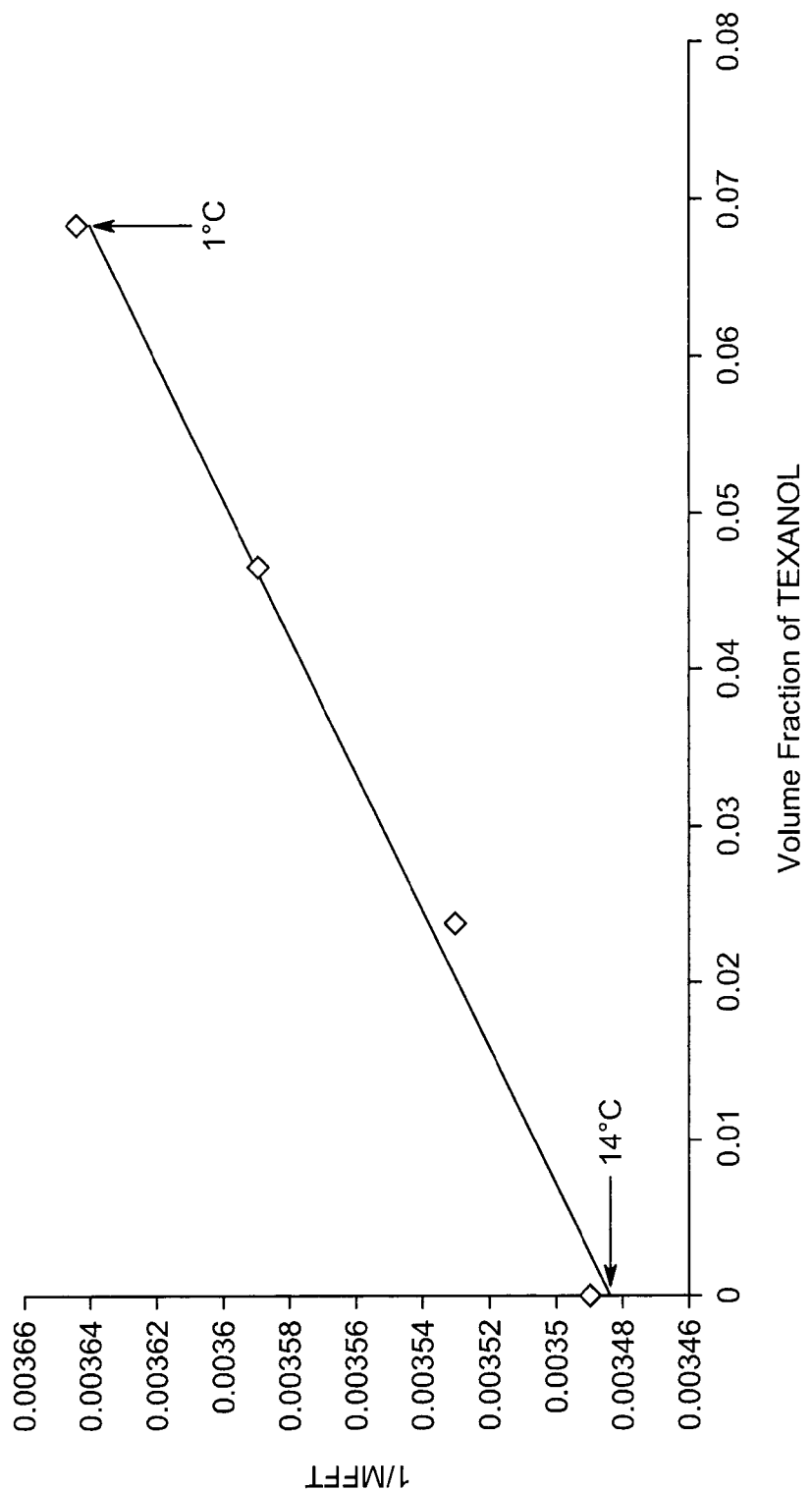
FIG. 2 is a Hoy-modified Fox Flory plot showing the variation in the amount of TEXANOL® (as a filming aid) as a function of 1/MFT. The plot shows that this dispersion obeys the equation.

Dispersions designed for architectural coatings, such as Rhoplex SG-30, are often formulated with Texanol™ to lower the MFT of the paint film. Texanol™ is a hydrophobic filming aid. Texanol resides inside the latex particles at equilibrium (FIG. 1 (left)). The level of Texanol™ required for a MFT at ~1° C. is illustrated by the Hoy-modified Fox-Flory plot in (FIG. 2).

To ensure film formation at temperatures <4° C., paints are often formulated to give a MFT of <4° C. Controlled experiments show that when Rhoplex SG-30 is formulated with Texanol™ to give a MFT of 1° C. (5.9 g of Texanol™ per 100 g of dry polymer for Rhoplex SG-30), the Tg of its latex film (dry-film thickness 25 microns) after aging for 24 hours in a constant temperature humidity room at 50% relative humidity is estimated to be 10±2° C. Such a low Tg of the film shows why there is a need for a fluorinated surfactant in Rhoplex SG-30 to give acceptable block resistance. In other words, block resistance tests typically are performed after aging architectural paint films for 24 hours.

Figure 3:
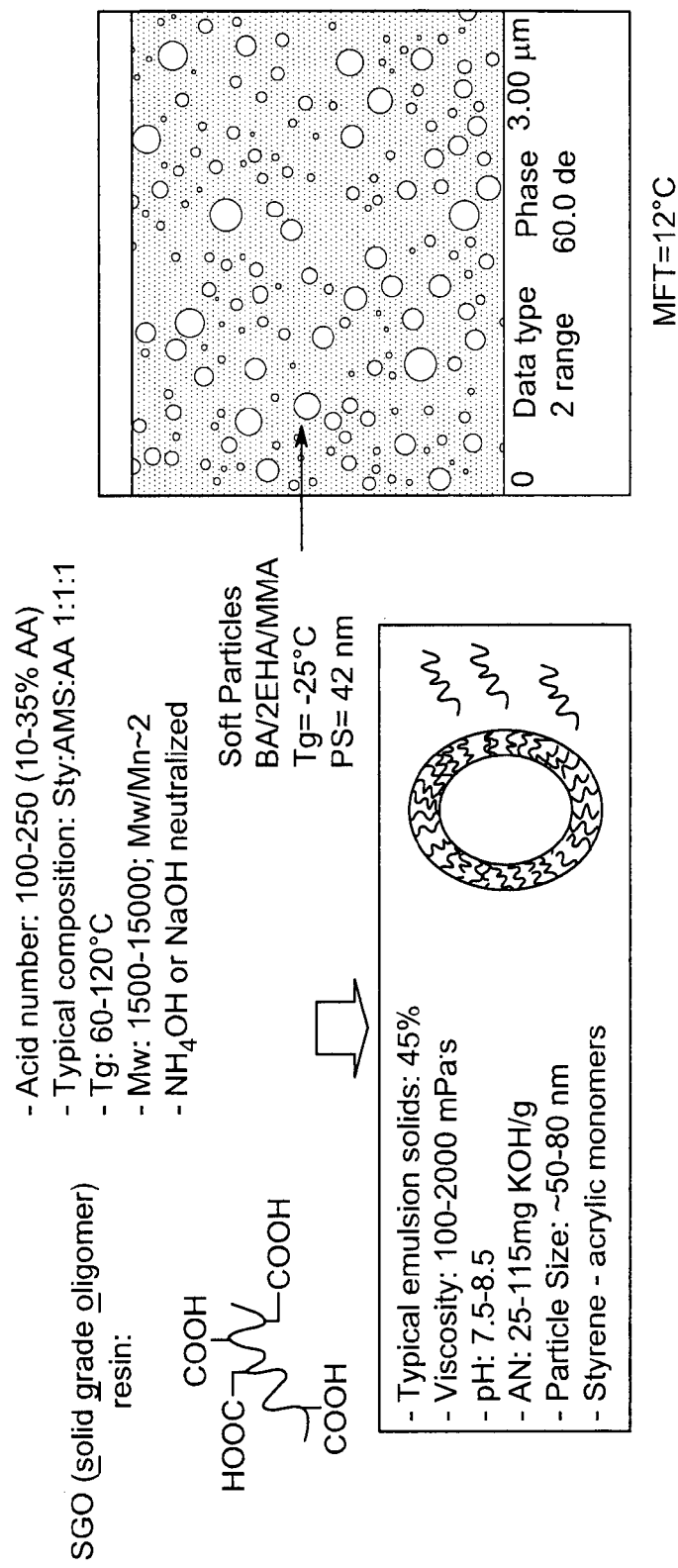
FIG. 3 is a schematic diagram showing the general description of a RC dispersion (left) and an AFM of the surface of a film prepared from JONCRYL 624 (right). The light continuous phase is composed of styrene, alpha-methyl styrene, acrylic acid, and carbitol acrylate. The $T_g$ of this phase is 137° C.

The atomic force microscopy (AFM) image in (FIG. 3) illustrates the film morphology of a typical RC emulsion sold commercially as Joncryl 624. RC emulsion is an emulsion prepared using an emulsion polymerization process where high-molecular polymeric particles are produced in the presence of a low-molecular ammonia-neutralized acid-based polymer (ammonium carboxylate-based oligomer). Before the oligomer is neutralized with ammonium hydroxide in the RC process, the acid-based oligomer is prepared by the high-temperature continuous polymerization process. A general description of a typical RC emulsion is given on the left-hand side of (FIG. 3). Typically the water-soluble ammonium carboxylate-based oligomer (Mw: 1500 to 15,000 Da) is high in carboxylate salt content (10 to 35% acrylic acid moieties before neutralization), and it contains styrene, the α-methyl styrene and lower levels of carbitol acrylate. These types of oligomers are surface active when neutralized with bases such as sodium or ammonium hydroxide and support (stabilize) acrylate or styrene-based particles during the emulsion polymerization process.

After film formation the acrylic acid-based oligomer (the $T_g$ ranges from 55 to 137° C. in commercial products) surrounds the particles; thus, the acid-based oligomer is the continuous phase. It is clear from the AFM in FIG. 3 that there is negligible diffusion of the continuous oligomer and particle phases, indicating complete phase separation of the support oligomer and dispersed polymer. Because of the high-Tg oligomer, this morphology gives good block resistance; however, the high-acid level from acrylic acid moieties in the continuous phase also results in poor water resistance. For water-borne inks this morphology is highly desirable because ink films need excellent block resistance and the ability to re-solubilized and re-disperse the polymeric and pigment particles under basic conditions on the printing press. FIG. 1 shows a simplified processes for three film formation concepts discussed in this example. The process on the right-hand side of FIG. 1 illustrates the use of solvents to improve particle coalescence. The middle process shown in FIG. 1 illustrates the film formation process for a RC (i.e. Joncryl 624) or RCD emulsion where the ammonium carboxylate-based oligomer is partially dissolved in the water phase and partially absorbed and grafted onto the individual polymer particles. The left side of FIG. 1 shows the concept for this work and was previously discussed.

Figure 4:
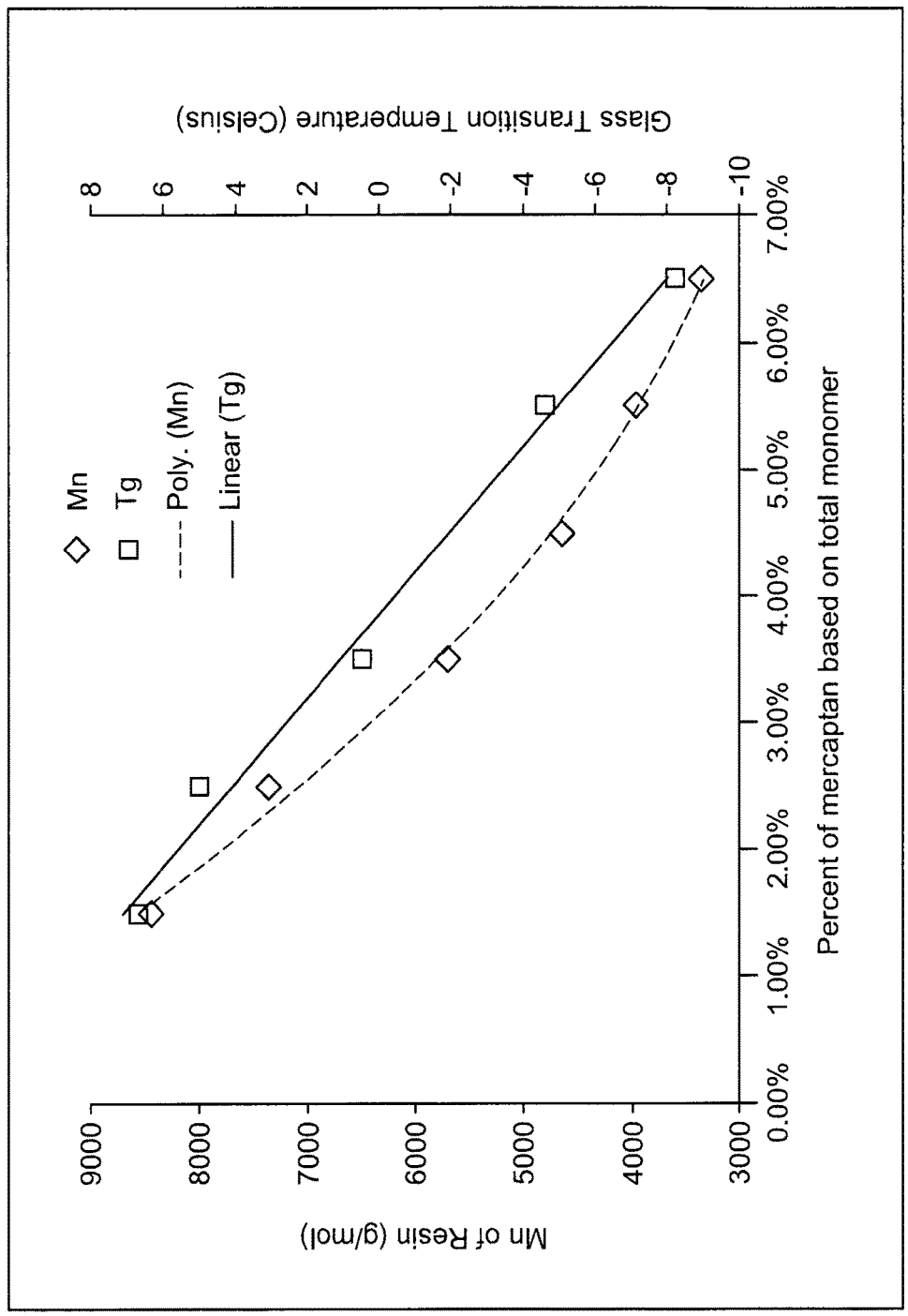
FIG. 4 is a line graph showing the variation in $M_n$ and $T_g$ of acid-based oligomers as a function of IOMPA level in the monomer feed.

Acid Oligomers: The acid oligomers were prepared by emulsion polymerization. The molecular weight and Tg of the oligomers were varied by substituting IOMPA for BA where the sum of BA and IOMPA was 68.4% and the IOMPA level, based on total monomer, varied from 1.5 to 6.5%. The MMA was kept constant at 11.6%. The $T_g$'s shown were measured on the $2^{nd}$ heat of the DSC at 15° C./minute. The first heat ranged from −50 to 225° C. The high temperature on the $1^{st}$ heat was used to decompose the ammonium carboxylate moieties attached to the oligomer to methacrylic acid. FIG. 4 shows a plot of $M_n$ and $T_g$ of the acid oligomers as a function of IOMPA level based on total monomer.

Zero VOC relies on the inter-diffusion of the oligomers with the particles in the dispersion during the drying/curing process. Various indirect methods were used to indicate the existence of diffusion between the two polymers.

The first indirect method to indicate the existence of diffusion is using the Hoy-modified Fox-Flory equations (Eq. 1) in combination with DSC. By examining the $T_g$ of the particles in the dispersion (typically ≥75% by weight of the total polymer), diffusion of the lower $T_g$ acid oligomers into the particles can be detected by a drop in the $T_g$ of the combined particle-oligomer in the polymeric film.

$$\frac{1}{Tg} = \frac{V_p}{Tg_p} + \frac{\alpha V_s}{Tg_s} \qquad (1)$$

By measuring the $T_g$ of the acid oligomer film before solubilizing with ammonium hydroxide and the Tg of the polymeric particles from the dispersion, Eq. 1 can be used to predict the $1/T_g$ parameter as a function of volume fraction of acid oligomer.

The film was placed in its thermodynamic state by heat treating the film from −50 to 250° C. during the heating cycle in the DSC experiment. During the first heat ramp by DSC the approximate kinetic state of ammonium carboxylate-based oligomer and particles from the dispersion is captured by scanning from −50 to 250° C. (15° C./min, 1$^{st}$ heat ramp).

During the second heat ramp, the polymer film has been exposed to a transient high temperature, and it is assumed in this example, that this temperature conditioning gives a film in its thermodynamic state. It is assumed that during the first heat ramp to 250° C., the ammonium carboxylate-based oligomers decomposed to put the oligomer in its protonated form; thus, maximizing compatibility. If the acid-based oligomer and particles from the dispersion are compatible, the T$_g$ should be predictable and Eq. 1 should be followed on the second DSC heat ramp. The compatibility of selected blends will be illustrated below.

The second indirect method to indicate the existence of diffusion is to use MFT experiments. MFT measurements are made after 2 hours on the MFT bar. It is postulated that the MFT values represent the early stages of film formation and that it represents the early kinetic state of the film. The MFT results are interpreted in light of T$_g$ results that are complimented with AFM results.

The third method to indicate the existence of diffusion is AFM where the surface and cross-section of a film are observed. The AFM method shows the amount of each phase and gives a qualitative indication of mutual diffusion between the two phases.

The second heat by DSC gives a T$_g$ value that represents the thermodynamic state of the film. The data points fall on the theoretical line from Eq. 1 (solid line in plot) if the polymer and filming aid (oligomer) are compatible. If the data are not in line with the linear relationship predicted by Eq. 1, it can be inferred that the two components are not in a single phase.

An ammonia carboxylate-based oligomer using the lowest molecular acid-based oligomer (Polymer A, IOMPA level, 6.5%, Mn=3327 Da, GK 030317-92) was prepared. Polymer A, was blended into two dispersions, Dispersions A and B at volume fractions up to 0.35. Dispersions A and B are MMA/BA-based dispersions with T$_g$'s of 22 and 24° C., respectively. Dispersion A contains no MAA moieties whereas Dispersion B has 2% MAA monomer units in the polymer phase. The T$_g$ of dried films and the MFT of each sample were measured. The results are shown in FIGS. 5A and 5B and are plotted in the Hoy-modified Fox Flory format.

Samples were heated from −50° C. to 250° C. (15 degrees per minute) on the 1$^{st}$ heating of the sample. For FIG. 5A, the T$_g$ measurements were taken on the 2$^{nd}$ heating of the sample. For FIG. 5B, the T$_g$'s from the 1$^{st}$ and 2$^{nd}$ heating of the samples were used. For FIGS. 5A and 5B the Tg from the 2$^{nd}$ heating of the sample produced 1/Tg data that fall on the theoretical Fox-Flory plot. The fact that the experimental data correlate with the theoretical plot show that Polymer A is compatible with the polymers from Dispersions A and B up to a volume fraction of 0.35. In FIG. 5A complete mixing of Polymer A with the polymer from Dispersion B doesn't appear to have occurred during the 1$^{st}$ heating of the sample since the data does not follow the linear model; however, a drop in the Tg (increase in 1/Tg) shows some mixing between Polymer A and Dispersion B under ambient laboratory conditions.

Figure 5A:
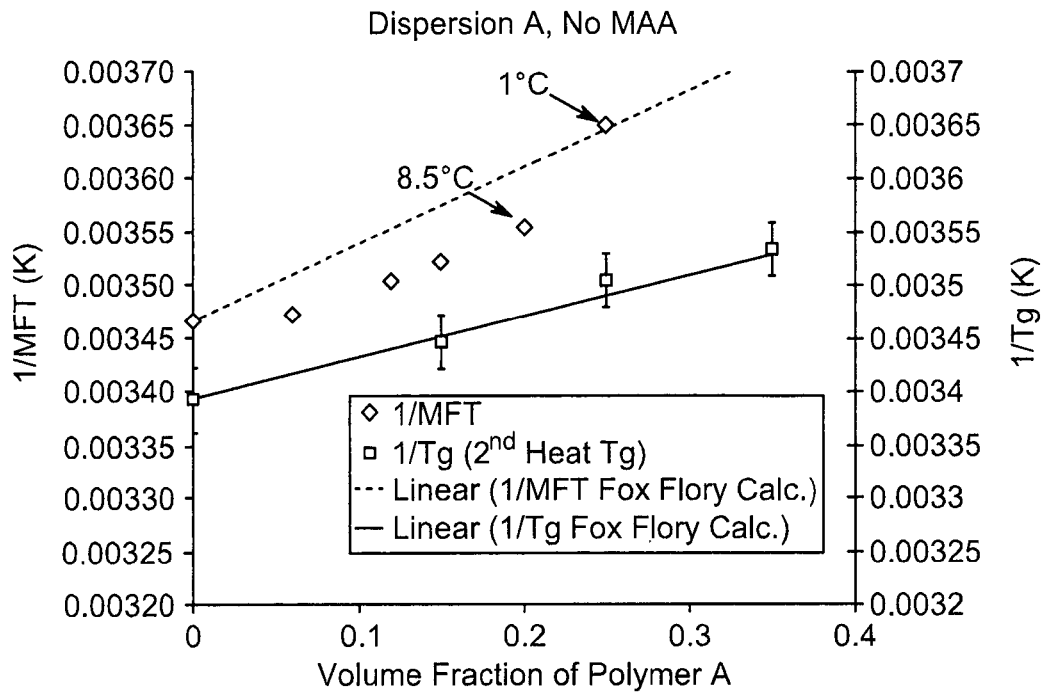
FIGS. 5A-5B are line graphs showing plots of the theoretical 1/MFT versus volume fraction for Polymer A neutralized with one equivalent of ammonium hydroxide prior to blending with Dispersion A (FIG. 5A) or Dispersion B (FIG. 5B).
Figure 5B:
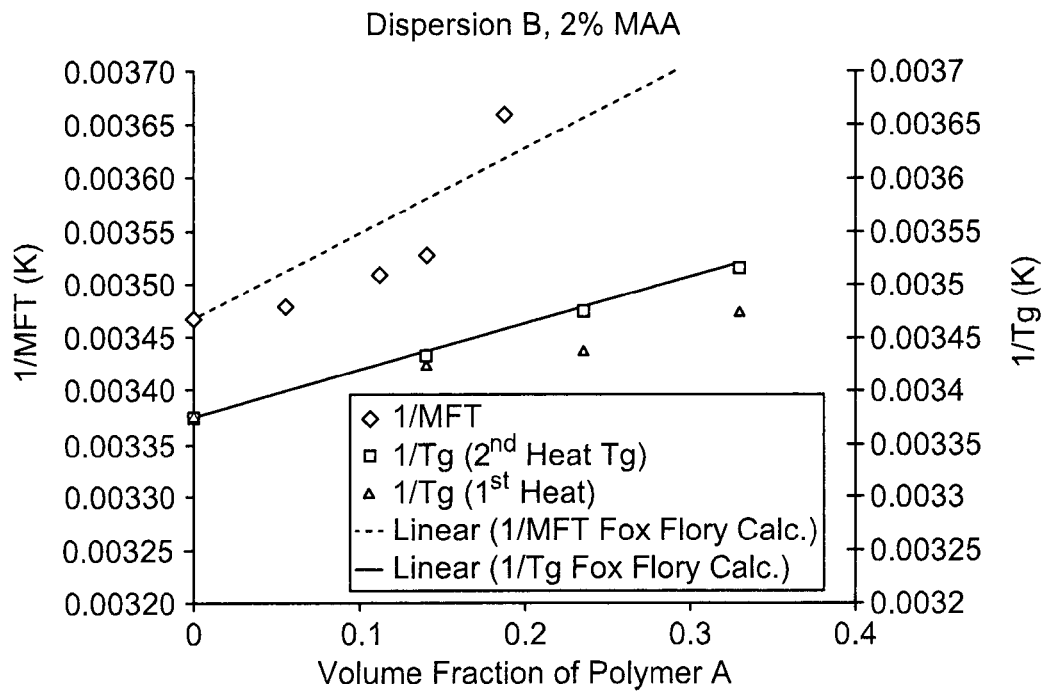

The theoretical 1/MFT as a function of the volume fraction of oligomer added is shown in FIGS. 5A and 5B. A hydro-plasticized Tg of −29° C. is used for the ammonium carboxylate-based oligomer for the theoretical 1/MFT versus volume fraction plots. The experimental 1/MFT does not correlate with the theoretical 1/MFT generated by Eq. 1. There is curvature in the data. As the amount of oligomer increases, there is a drop in MFT. Overall, substituting 2% MAA for 2% MMA in the polymer from Dispersion A does not affect the compatibility of Polymer A. Polymer A is compatible in the matrix of the polymer films from Dispersion A or Dispersion B.

Figure 6:
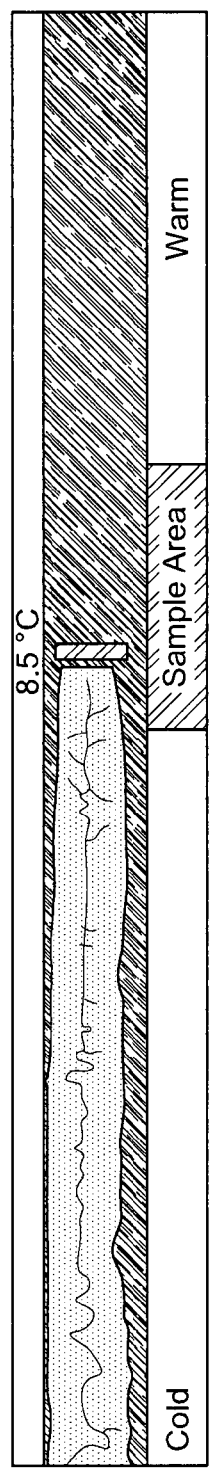
FIG. 6 is an image of a sampling area on an MFT bar.
Figure 7:
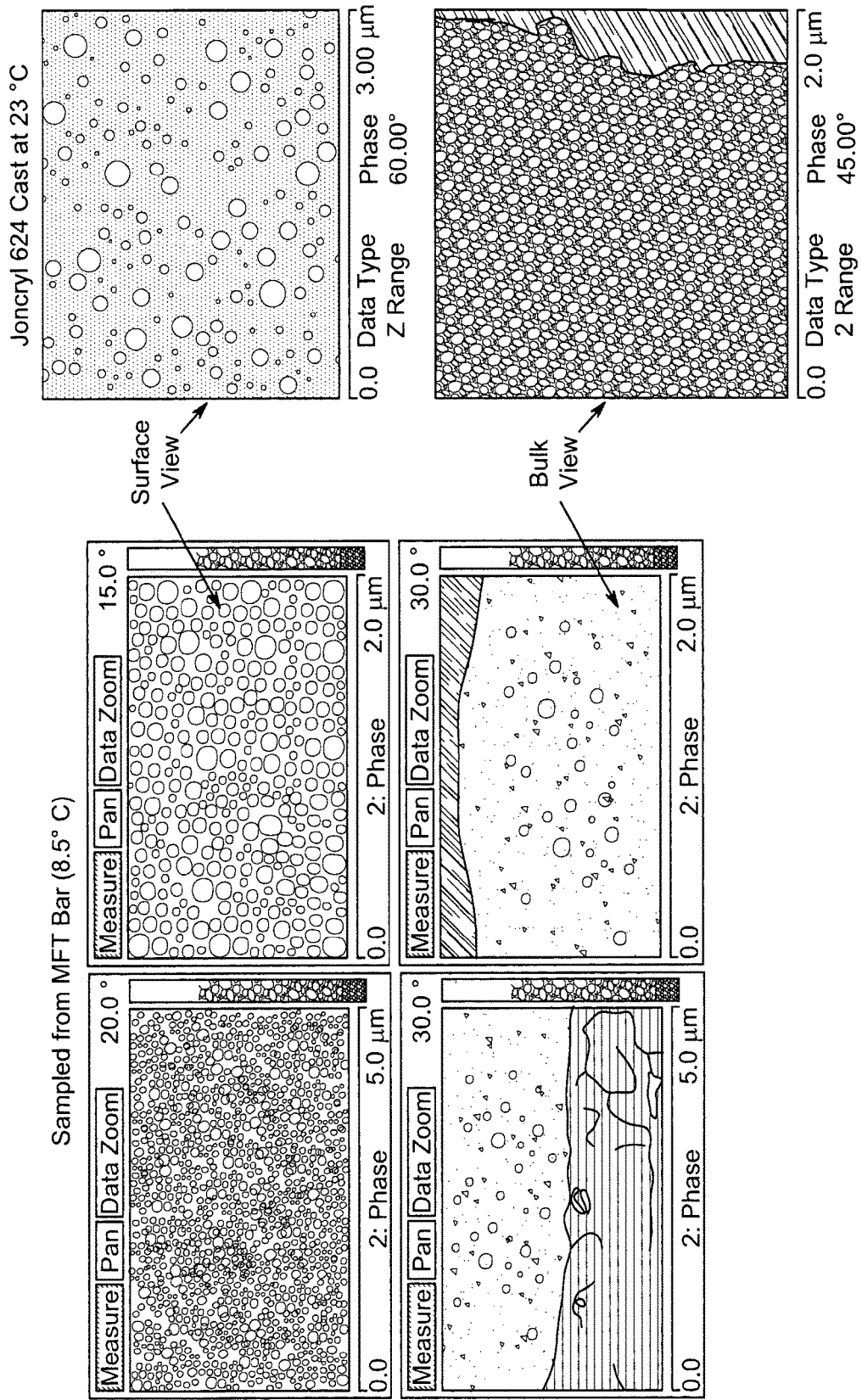
FIG. 7 are AFM images of the top surface of a film from a MFT bar (top) and a bulk view of a film micro-toned for bulk analysis. The films were prepared from a blend of Polymer A and Dispersion A. The volume fraction of Polymer A in the dry film is 0.20. The right images were prepared from films of JONCRYL 624, a commercial RC dispersion. The resin or oligomer (SGO) level of JONCRYL 624 is 0.25.

The data point at 8.5° C. (marked in FIG. 5A) was studied by AFM and FT-IR spectroscopy. A sample representing the data point at 8.5° C. was removed from the MFT bar (FIG. 6) and kept at 0° C. until AFM and FT-IR analysis. The AFM images are shown in FIG. 7.

A 75-micron wet film was cast on the MFT bar and allowed to dry for two hours.

Figure 8:
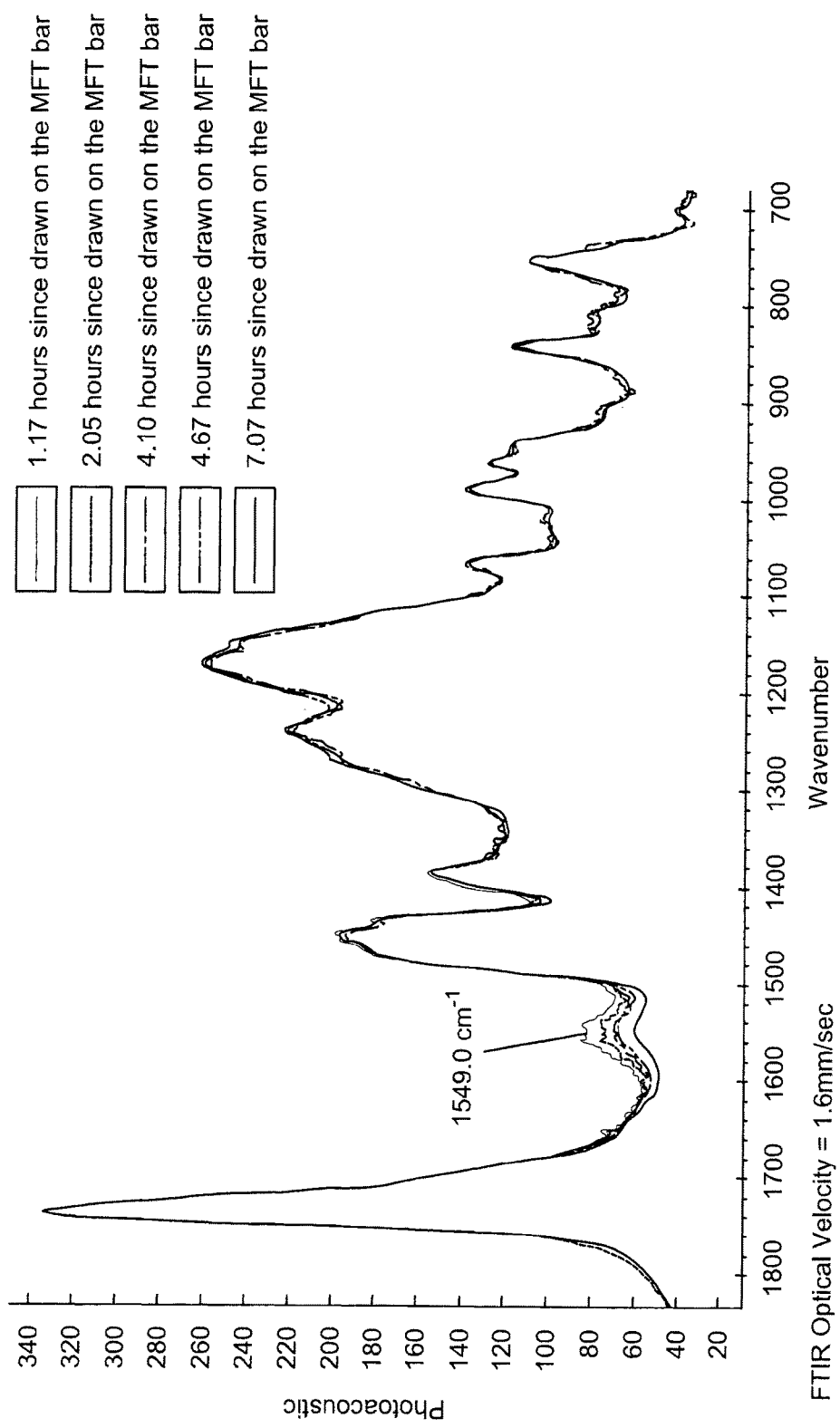
FIG. 8 is a line graph showing photoacoustic FT-IR spectra of a polymer blend as a function of time. The ammonium-carboxylate absorbance is visible at 1549 cm$^{-1}$. The corresponds to the data point in FIG. 5A at a volume fraction of Polymer A of 0.20

The sample was taken, placed in a plastic bag then stored in ice prior to AFM and FT-IR analysis. The AFM image in FIG. 7 (top, left side) shows a layer of particles on the surface of the film from the dispersion. This layer of particle is estimated to be less than 1% of the total volume of films. Below this layer the bulk polymer appears uniform. No distinguishable particles are visible in the bulk of the film. No ammonium carboxylate-based oligomer is visible as a separate phase. For comparison Joncryl 624, a typical RC emulsion known to phase separate, shows particles in the bulk of the film and a continuous phase is visible. Photoacoustic FT-IR spectra were taken of a sample used to generate the AFM (MFT=8.5° C.) on the left side of FIG. 7. The results are shown FIG. 8. The ammonium-carboxylate absorbance is clearly visible and mostly disappears over seven hours. The AFM and FT-IR data shows that the blend is at the early stages of the film formation process.

As shown in FIG. 5B, the ammonium carboxylate-based oligomer shows some mixing with the bulk of the individual particles. One hypothesis is one that the ammonium carboxylate-based oligomer mixes with the outer boundaries of the particles. This mixing would affect only the outer boundaries of the particles and result in coalescence of the particles but little diffusion between the particles. For this picture to be viable and explain the MFT results (or 1$^{st}$ heat Tg results for FIG. 7b) more than 70% of the volume of the particle must not be effected; otherwise, a drop in the Tg of the particles would be observed. Heating the film during the first DSC heating ramp decomposes the ammonium carboxylate-base oligomer to its protonated form. Compatibility and diffusion of the protonated oligomer then occurs throughout the film. During the drying process a few layers of particles percolate to the surface of the film. The explanation of this percolation of particles to the surface of the film remains unclear; however, the AFM data shows that cross section of the film is continuous and this temperature (8.5° C.) on the MFT bar gives a clear transparent film.

Figure 9:
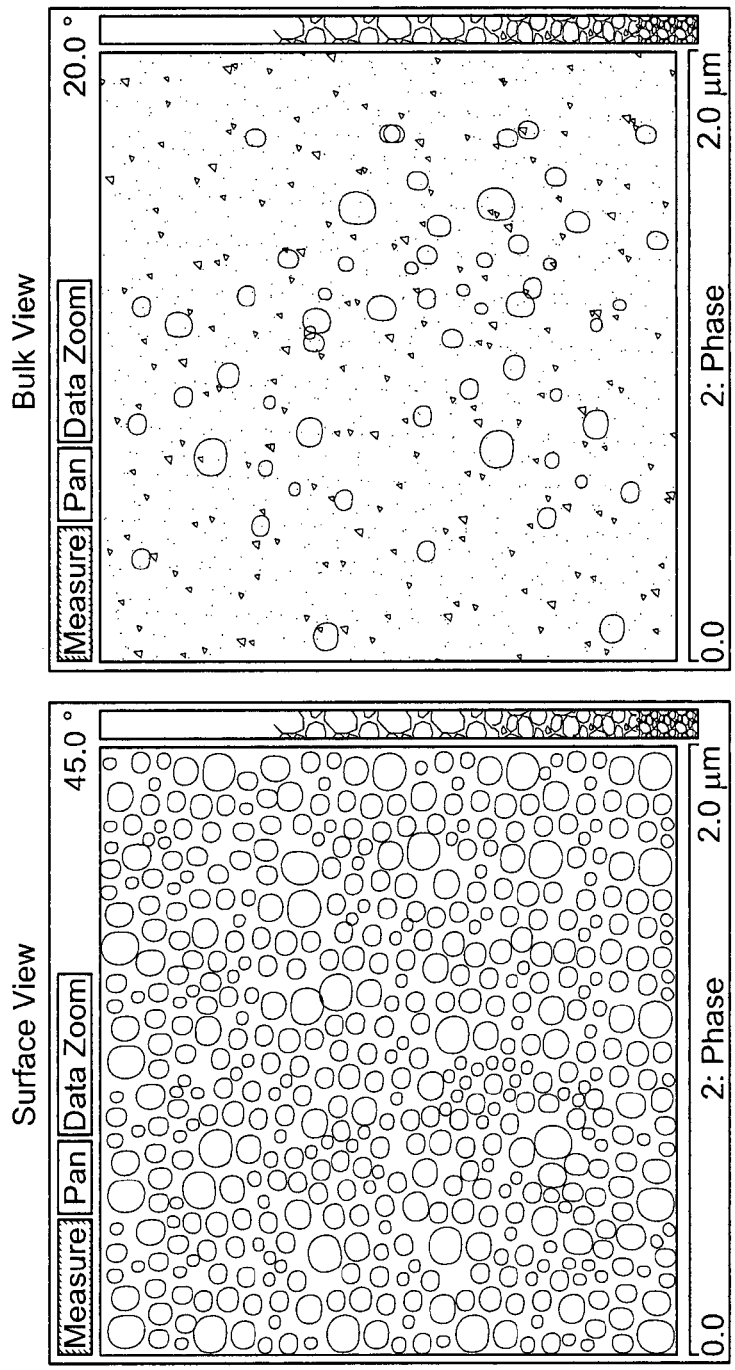
FIG. 9 shows AFM images of the top surface and bulk region (micro-toned) of a sample taken from the MFT bar at 1° C. The images are phase images at 2×2 μm. Prior to analysis the sample was placed in a plastic bag and held at ice temperature. The left image shows particles on the surface of the film. The right image shows no distinct particles. The white spots in the image are assumed to be pools of surfactant or an artifact from the micro-toning process.

A sample for AFM analysis was taken from an area on the MFT bar where the temperature on the bar was 1° C. For a MFT of 1° C. a volume fraction of 0.25 of Polymer A is required in the polymer blend (see FIG. 5A). FIG. 9 shows the AFM results. The sample was taken directly from the MFT bar, placed in a plastic bag, and stored in ice until analysis.

The image of FIG. 11 shows a layer of particles on the surface of the film, but no particles are visible in the bulk or cross section of the film. No particles were observed in the bulk. These AFM images give supporting evidence that the ammonium carboxylate-based polymer used to prepare the blends is compatible to some degree with the outer boundaries of the MMA/BA-based particles of the dispersion.

Figure 10:
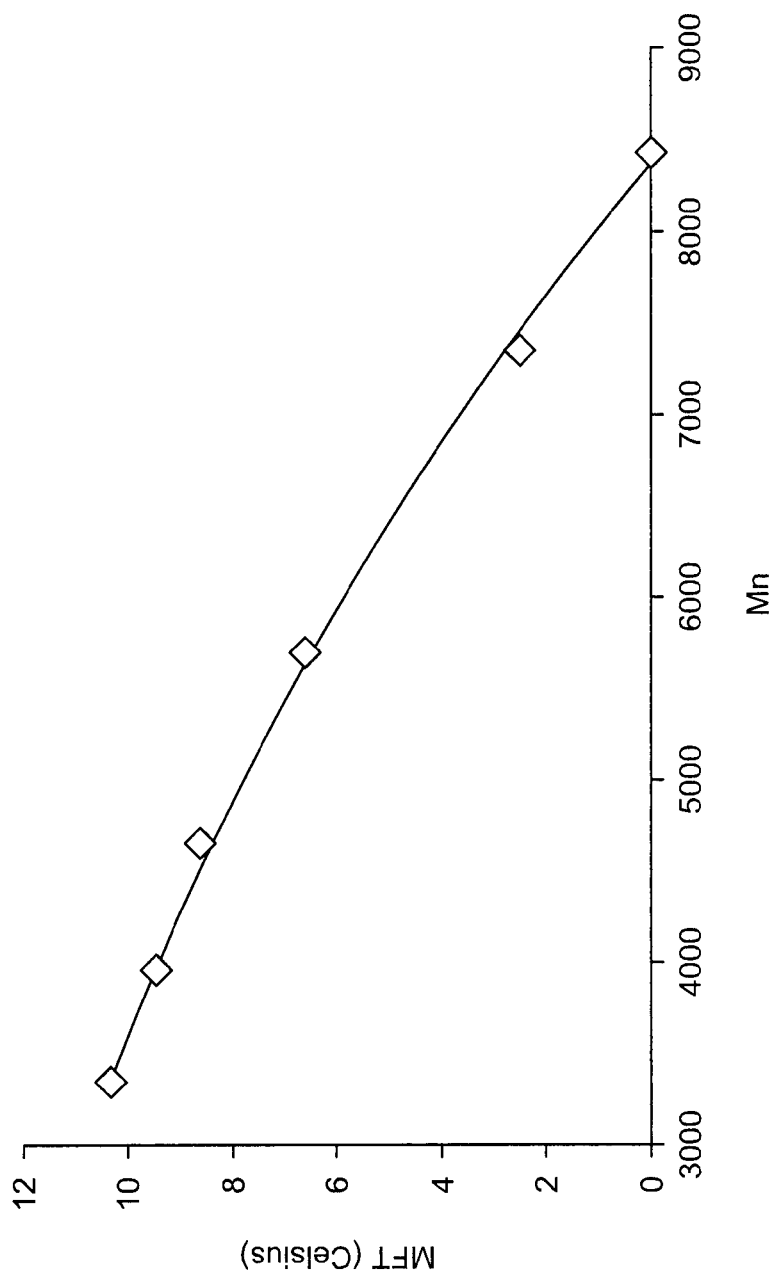
FIG. 10 is a line graph showing the effect of varying molecular weights of the ammonium carboxylate-based oligomers on the MFT of blends prepared from the oligomers and a MMA/BA-based dispersion (Dispersion A). The volume fraction of oligomer (based on dry solids) is kept constant at 0.20 for each blend.

The rate of polymer diffusion has an inverse power relationship to molecular weight. MFT measurements were made from blends of Dispersion A and ammonia carboxylate-based oligomers (based on Polymer A) of varying molecular weights. The volume fraction of oligomer was kept constant at 0.20. The results are shown in FIG. 10. As the Mn of oligomer increases, the MFTs of the films prepared from the blends decreased. As shown in FIG. 6, the Tg's of the oligomers increase as their molecular weight increases, and the rate of inter-diffusion is inversely proportional to Mn for a polymer below its entanglement molecular weight. Therefore, as the molecular weight of the oligomer increases its inter-diffusion rate into the particle slows, thus, concentrating the polymer at the surface of the particles and lowering the MFT of the film. FIG. 10 shows a decrease in MFT of the blend as the molecular weight of the oligomer increases. The MFT decrease to as low as 0° C. The acid-form of this oligomer has a Tg of 6.7° C. and the MFT of Dispersion A is 15.5° C. The hydro-plasticized Tg of the oligomer in its ammonium salt form appears to be less than zero.

Hoy-modified Fox-Flory plots (FIGS. 11A and 11B) were constructed using the highest molecular weight ammonia-neutralized acid-based oligomer from FIG. 10 (Polymer B, Mn=8484 Da) and compare it to the lower molecular weight polymer (Polymer A, Mn=3327 Da) used to construct FIGS. 5A and 5B. The MMA/BA-based dispersion (Dispersion A) was used as the vehicle for the high molecular weight polymer.

Films for Tg analysis were prepared by cast wet films over glass using blends prepared from Dispersion A and various levels of Polymer B. The films were aged for 24 hours in a constant temperature humidity room (50% RH, 25° C.), then the samples were scraped from the glass and analyzed by DSC. The final dry film thickness was 23 microns. During the first DSC heat ramp, samples were heated from −50° C. to 250° C. at 15° C./minute. The Fox-Flory plot for 1/Tg versus volume fraction of Polymer B shows that the samples at volume fractions of 0.15, 0.20, and 0.25 did not appear to be molecularly mixed into the matrix of the polymeric film as indicated by the horizontal line. The experimental data points correlate with the theoretical predictions of Eq. 1 ($\alpha$=1.0) during the second heat ramp. The high heat from the first DSC heat ramp to 250° C. appears to have resulted in complete mixing of Polymer B and the MMA/BA-based polymer from Dispersion A.

Figure 11A:
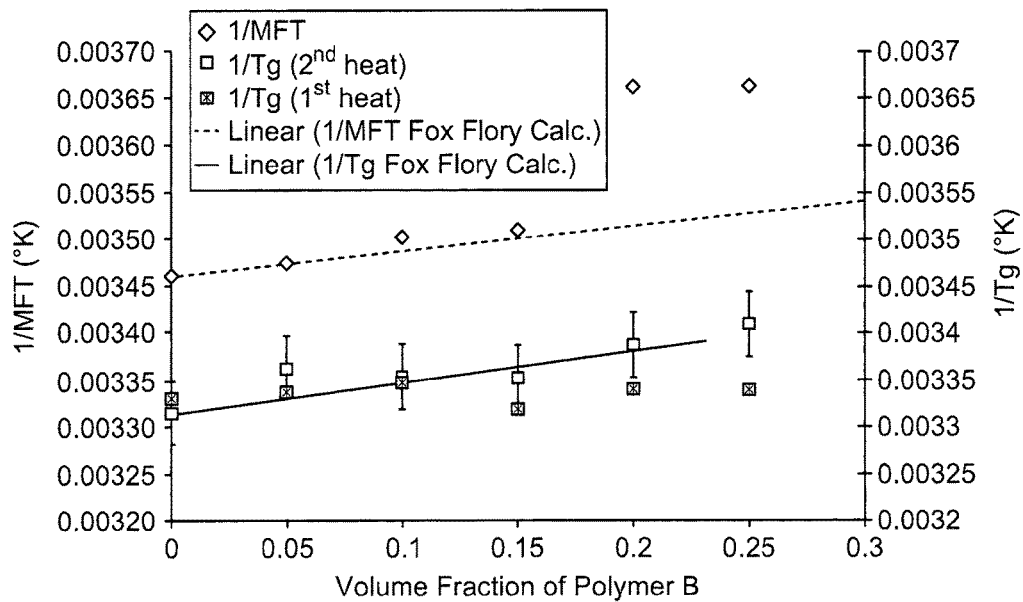
FIGS. 11A-11D are graphs showing properties of the acid-based Polymer B. For FIG. 11A, the $T_g$ of the Polymer B in its acid form ($T_g$=6.7° C.) is used to calculate the theoretical 1/MFT and 1/Tg versus volume fraction plots. For FIG. 11B a hydro-plasticized $T_g$ of −7.5° C. is used to the calculate the theoretical 1/MFT versus volume fraction plot.
Figure 11B:
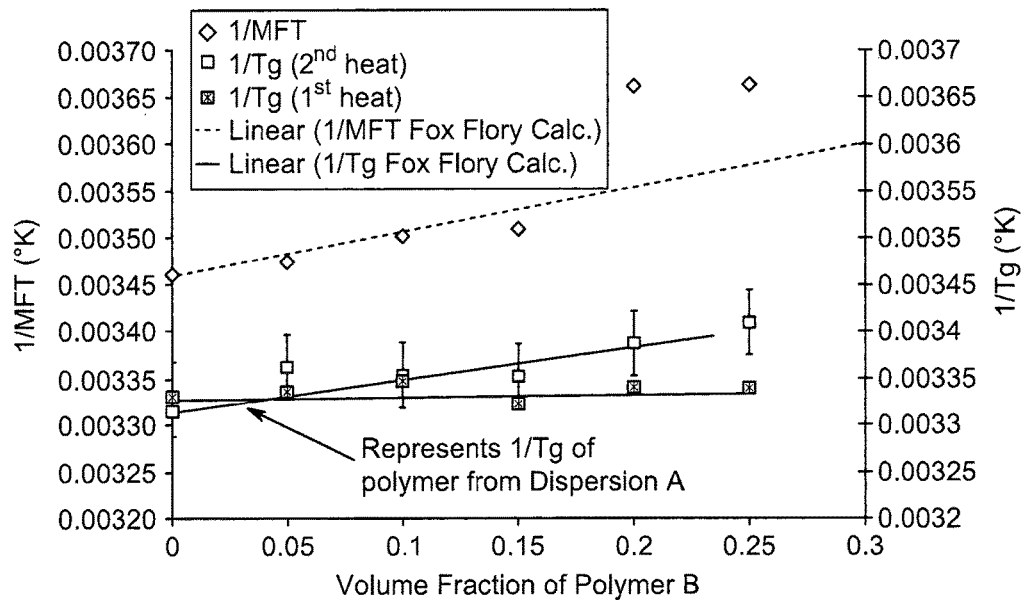

There is a discontinuity in the 1/MFT plot versus volume fraction plot (FIG. 11A) as volume fraction of Polymer B increases from 0.15 to 0.20. There is a dramatic decrease in the MFT (increase in 1/MFT). At a volume fraction of 0.2 and 0.25 the MFT is 0° C. (1/MFT=0.00366° $K^{-1}$). FIG. 11A is comparable to FIG. 5A except that a lower MFT is obtained at a volume fraction of 0.20 for reasons previously discussed.

Overall, miscibility at volume fractions of 0.1 and 0.15 during the $1^{st}$ heating ramp was shown. This shows that complete mixing between the phases occurred. At higher volume fractions of 0.2 and 0.25, little detectable mixing on the first DSC heat ramp was observed.

Figure 11C:
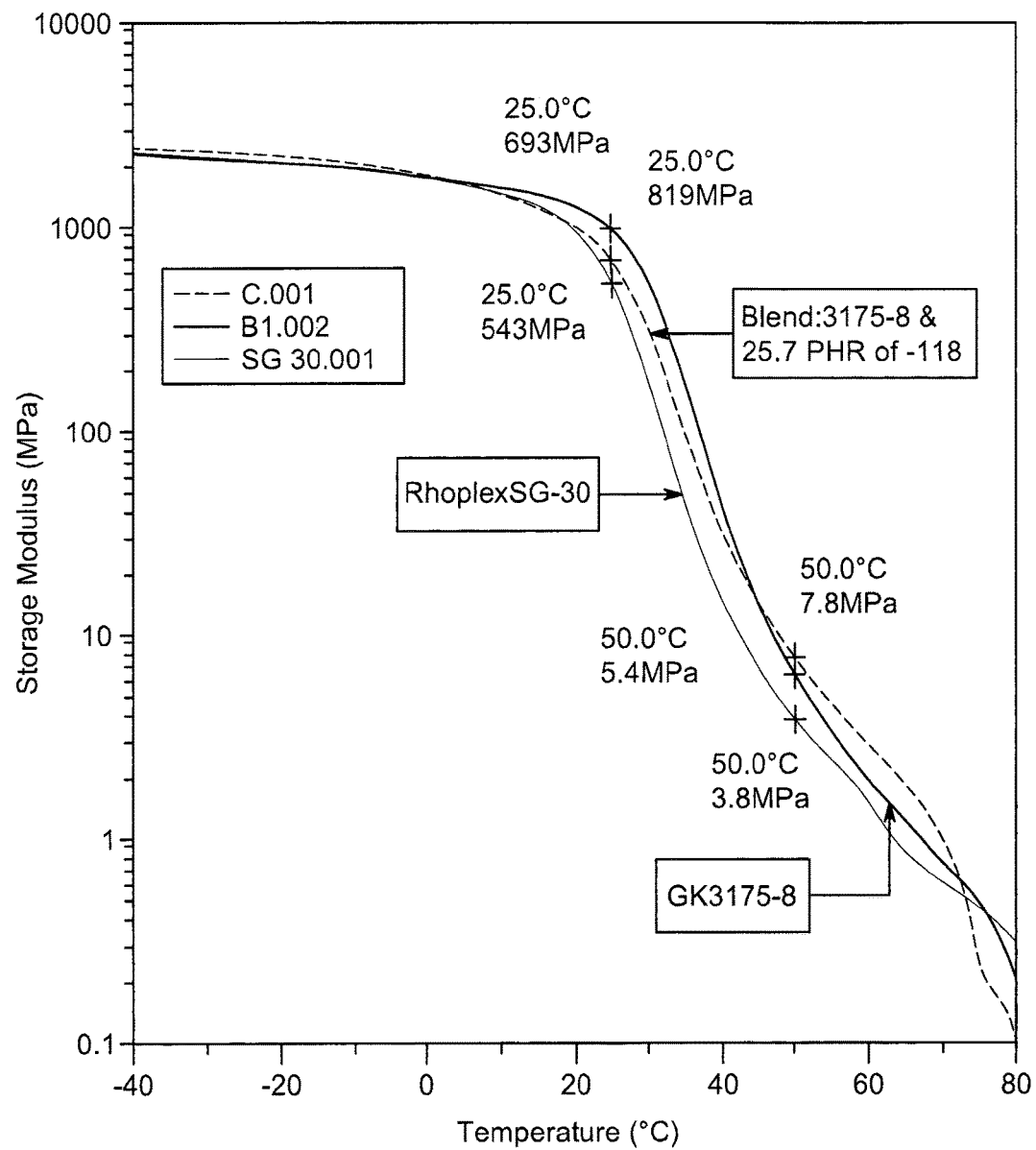
Figure 11D:
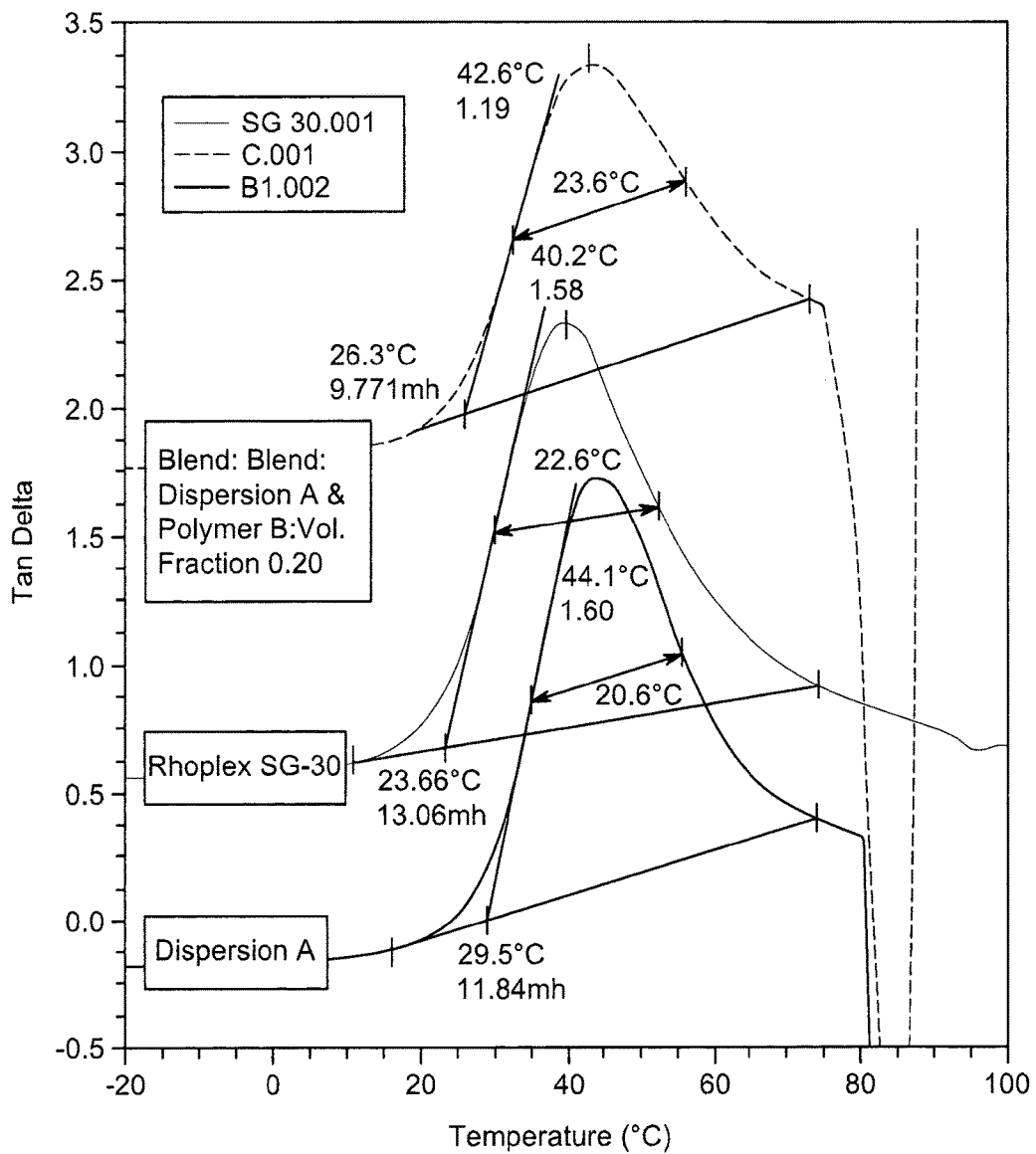

A film was cast from the blend at the data point at a volume fraction of 0.20 (see FIG. 11A) for DMA analysis. The data was compared to DMA analysis of the MMA/BA-based particles from dispersion (Dispersion A) and Rhoplex SG-30. The results are shown in FIGS. 11C and 11D. The results show that the storage modulus of the blend is similar to Rhoplex SG-30. A single tan δ curve is observed for the blend. The blend has a lower dynamic Tg than Dispersion A which suggests plasticization or mixing of the oligomer with Dispersion A. The mechanical properties of the blend are similar to Rhoplex SG-30. Rhoplex SG-30 contained no Texanol™ for the sample used to generate the DMA plots in FIGS. 11C and 11D.

Figure 12:
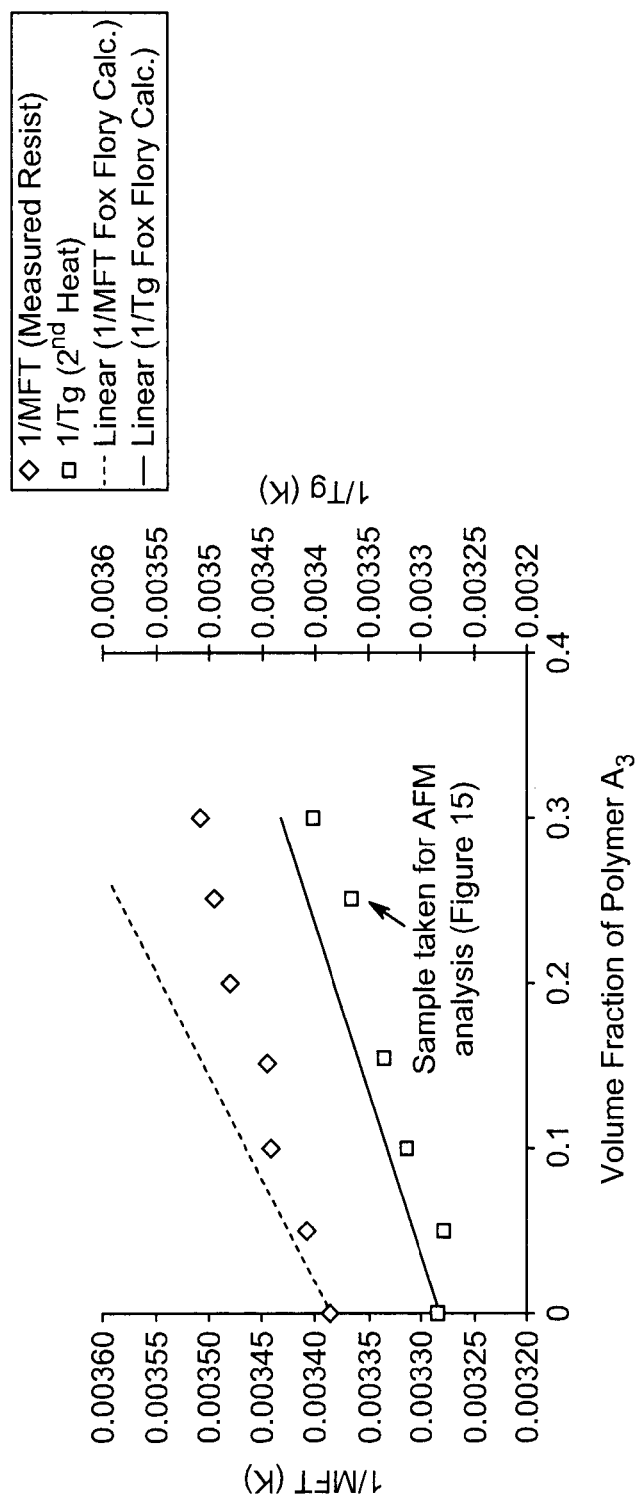
FIG. 12 is a line graph showing a plot of 1/MFT versus volume fraction for the acid-based Polymer A3. The $T_g$ and $M_n$ of the acid-based oligomer used to prepare the blends were −9.1° C. and 3,360 Da, respectively. MFT measurements were made after one hour. For $T_g$ measurements of the particle's composition the half-heights on the DSC plots were used. The hydro-plasticized $T_g$ of Polymer A3 as an ammonium-carboxylate salt is estimated (from Polymer A2) by DSC to be −29° C.

The MMA content of the particles in Dispersion C (MMA/BA/IOMPA; 58.5/41/0.5) was increased relative to the polymer of the Dispersion A. The polymer in Dispersion C has a Tg of 31° C. and a particle size of 200 nm. The acid-based oligomer Polymer A (in particular, Polymer $A_3$, Mn=3360 Da, Tg=−9° C.) was blended with Dispersion C. During the first heat ramp from −50 to 250° C., neither the experimental 1/MFT nor 1/Tg follow the theoretical predictions of Eq. 1. During the second heat ramp, the experimental data showed some correlation to the predicted data in Eq. 1. However, the blend does not appear to have complete compatibility since it does not follow the theoretical Fox-Flory line (solid line in FIG. 12). The Tg data used to calculated the 1/Tg data points in FIG. 12 were obtained from the $2^{nd}$ DSC heat.

Figure 13:
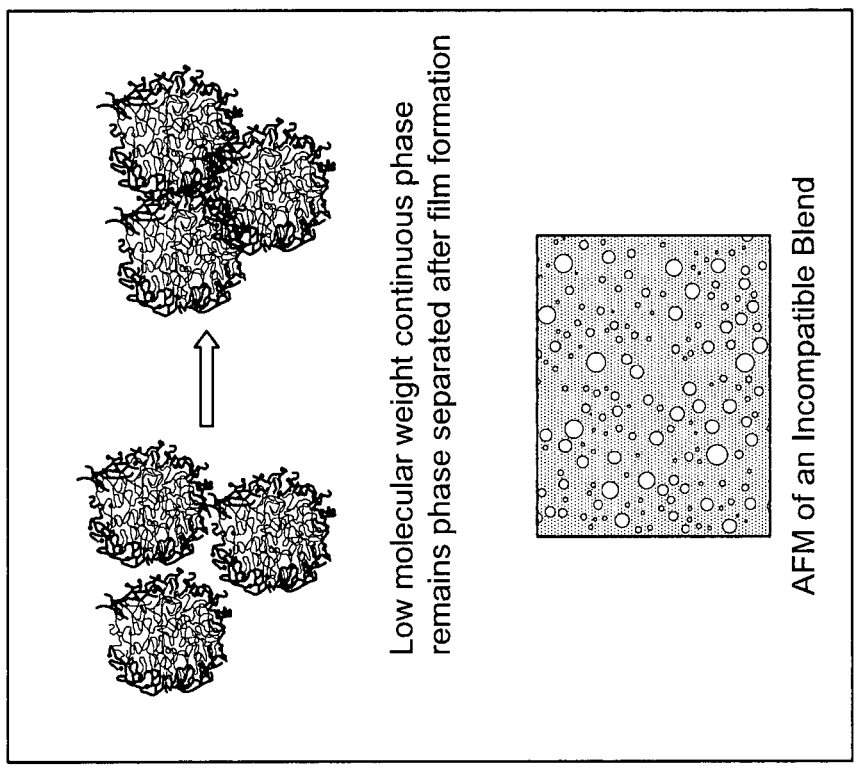
FIG. 13 is a diagram showing results from AFM. The figure shows the incompatibility between an acid-based oligomer (Polymer A3) and the polymer from a MMA-BA-based dispersion (Dispersion C). The AFM is from a cross section of the film.

AFM analysis using the film obtained at a volume fraction of 0.20 (data point shown in FIG. 12) was conducted. FIG. 13 shows the AFM results of a micro-toned sample. The AFM from a cross section of the film clearly shows incompatibility between the acid-based oligomer and base polymer from the Dispersion C.

In another experiment Polymer B (Mn=8484 g/mol, Tg=6.7° C.) was blended with Dispersion C. The 1/Tg versus volume fraction plot (FIG. 14) using Polymer B shows no statistical compatibility between the acid-based polymer and the MMA/BA-based polymer from Dispersion C. Increasing the molecular weight of the acid-based polymer and the Tg of the dispersion (increasing the MMA content) decreases the compatibility between the polymers.

Figure 14:
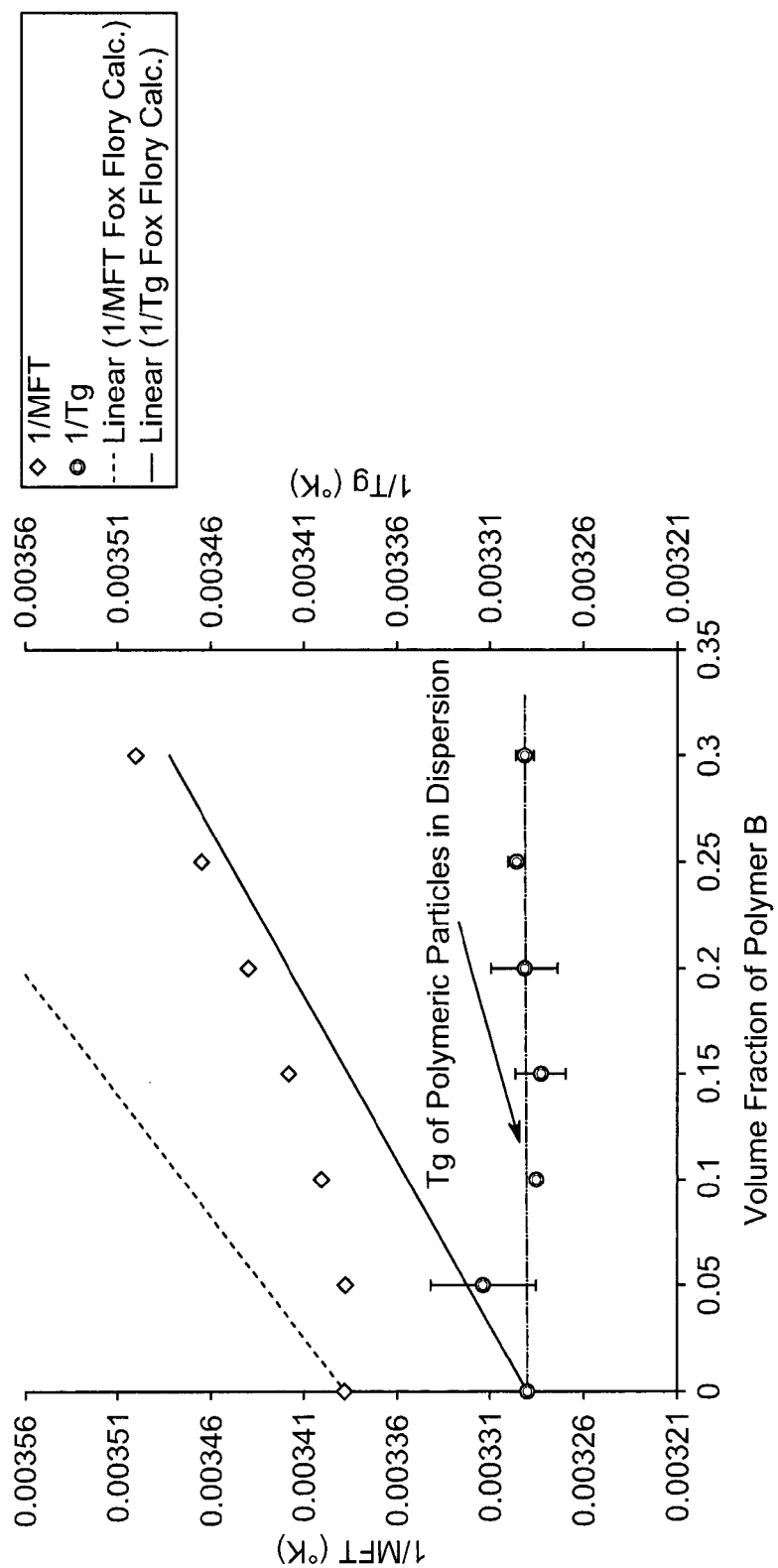
FIG. 14 is a line graph showing a plot of the theoretical 1/MFT versus volume fraction for a composition with the acid-based oligomer, Polymer B. The hydro-plasticized $T_g$ of Polymer B neutralized to its ammonium-carboxylate salt form is −7.5° C. This value was used to calculate the theoretical 1/MFT versus volume fraction plot. The dispersion (Dispersion C) samples were freeze-dried overnight prior to DSC measurements. Samples were scanned from −50 to 250° C. at 15° C./min obtaining the $T_g$. Error bars are based on three measurements and represent a confidence limit of 95%. Glass transition temperature measurements of films (23 μm film thickness) dried over glass plates (not shown) in a CTH room overnight also showed no immiscibility. The $1/T_g$ versus volume fraction data was generated on the second DSC heating ramp.

Overall, the oligomers used in FIG. 15 had a lower molecular weight that what was used in FIG. 14. The blend in FIG. 16 is more compatible than the blend in FIG. 15. The MFT at a volume fraction of 0.25 is 15° C. (FIG. 16) versus 1° C. in FIG. 5A. The 1/MFT as a function of volume fraction in FIG. 16 is not linear and does not correlate with the theoretical 1/MFT data. In conclusion, the ammonium-carboxylate oligomer used in FIG. 16 is incompatible with the polymer from the dispersion.

Figure 15A:
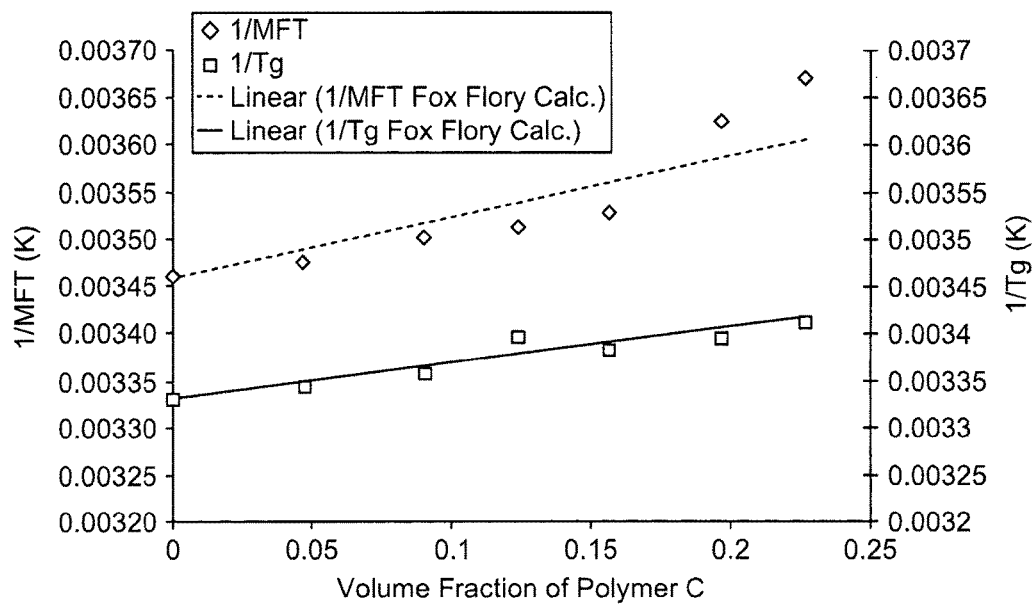
FIGS. 15A-15B are line graphs showing a comparison of Hoy-modified Fox Flory plots prepared from blends using Dispersion A4, and an ammonium carboxylate-base oligomer (Polymer C) prepared by emulsion polymerization (FIG. 15A) and an essentially identical polymer (Polymer D or resin) prepared using the high temperature continuous polymerization process (FIG. 15B). A hydro-plasticized $T_g$ of −16° C. was used to construct the theoretical 1/MFT versus volume fraction plots for Polymer C and Polymer D (dash lines). The $1/T_g$ versus volume fraction plots were constructed using the $2^{nd}$ heat ramp data from the DSC analysis.
Figure 15B:
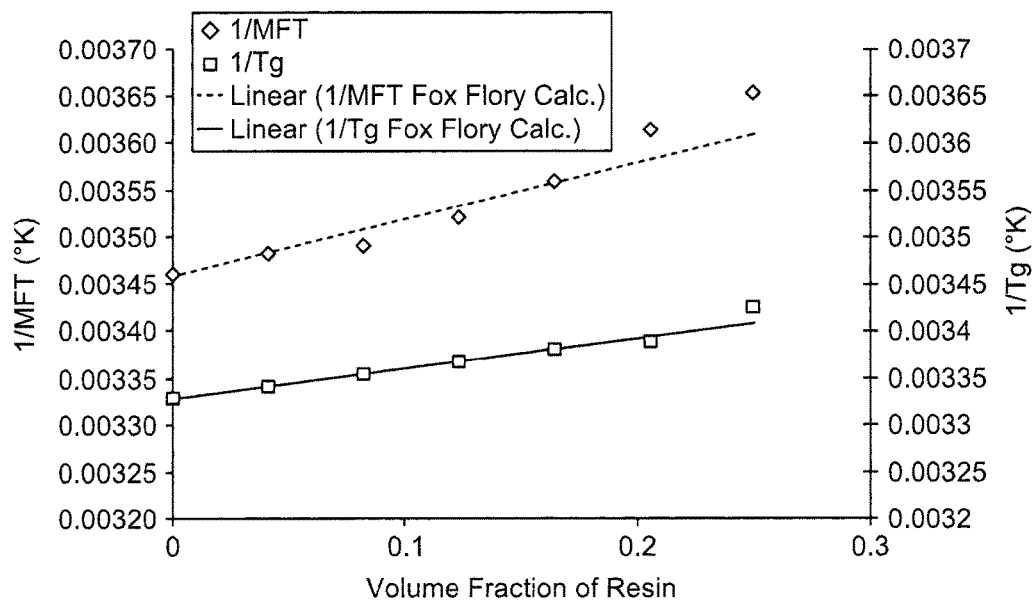

Comparison of Acid-Based Oligomers Prepared by Emulsion Polymerization and the SGO Process:

SGO-supported emulsions or RC emulsions are prepared by using a continuous radical polymerization process at temperatures between 180 and 280° C. SGO-supported emulsions (RC emulsions) typically give clear films that have a bi-phasic morphology. A comparison of an acid-based oligomer prepared by an emulsion polymerization process (Polymer C) to an oligomer prepared by the high temperature radical polymerization process (Polymer D) was done. Except for small amounts of chain transfer agent (emulsion polymerization) or initiator (SGO process) the composition and Mn of Polymer C and Polymer D are essentially identical. FIG. 15 show the Fox-Flory plots of blends prepared using Dispersion A and Polymer C or Polymer D. A comparison of the plots in FIGS. 15A and 15B show that the results are also essentially identical. Oligomers prepared by emulsion polymerization have similar compatibility and MFT suppression to those prepared by the high temperature polymerization process.

RCD Process:

An RCD approach can produce higher solids dispersions (~50%) compared to a blending approach (~33%). MMA/BA-based dispersions for development of RCDs processes were prepared using either ammonium persulfate as a sole initiator (FIG. 16C) or a process that used a combination of persulfate and redox initiators, t-butyl hydroperoxide and isoascorbic acid (FIG. 16D). For the blending approach described in FIG. 16B, the emulsion (primary particles based on Dispersion A) uses ammonium persulfate as the initiator for its preparation in the emulsion polymerization process. Lower MFTs and higher solids using the persulfate/redox combination was obtained (FIG. 16D).

Scrub Resistance Studies:

The scrub resistance, to indirectly illustrate film formation, was investigated. Semi-gloss architectural paint formulations were prepared and the coatings applied over the appropriate substrate for scrub resistance testing. The experimental latex was prepared using the process described in FIG. 16D and Example 2. Films were cast in a constant temperature room (25° C., 50% RH) and aged for different lengths of time. The number of scrubs was counted to film failure. A semi-gloss Behr paint was used as a control. The results are shown in FIG. 17.

Figure 17:
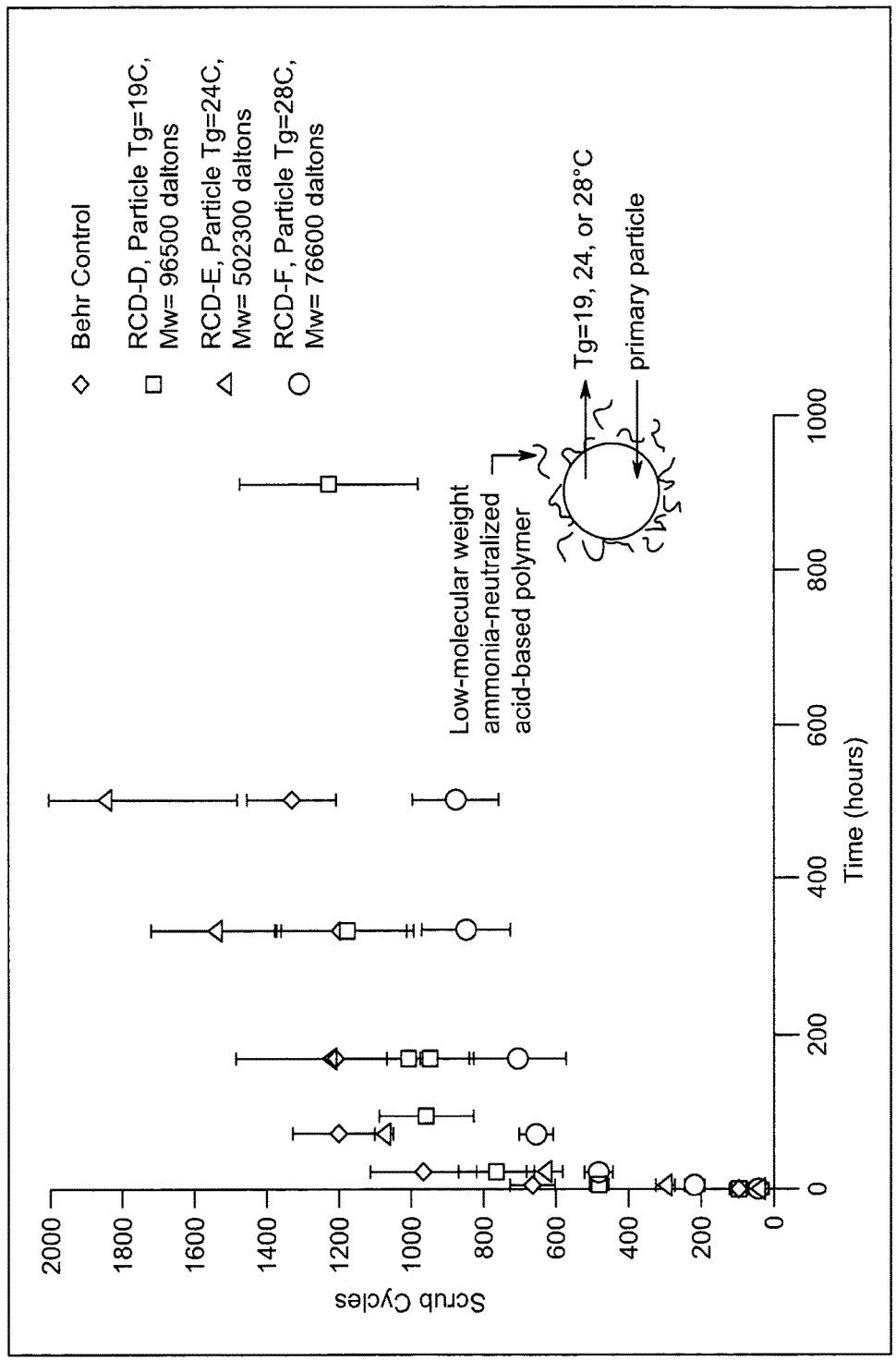
FIG. 17 is a scatter plot of the scrub resistance as a function of time. The scrub data is for semi-gloss architectural paints aged in a constant temperature humidity room for various lengths of time. The data shows an increase in scrub resistance as a function of time. Each scrub value is an average of four measurements. The error bars give the range at a confidence limit of 95%.

FIG. 17 shows an increase in scrub resistance as the paint films age in a constant temperature humidity room (25° C., 50% RH). FT-IR data show that the ammonium-carboxylate from the oligomer decomposes over time to form the acid-based oligomer. Maximum scrub values were estimated by heating paint films in an oven at 95° C. for 20 minutes and are as follows: Behr control, 1880±205; RCD-D, 1470±190; RCD-E, 2310±468; RCD-F, 1100±160. Confidence limit is 95% based on four measurements. The RCD's were prepared using the process described in FIG. 16D (RCD C in experimental section).

Film formation is a dynamic process. In the systems tested, film formation occurs as the ammonium carboxylate-based oligomer decomposes to its protonated form and diffusion occurs within the polymeric particles from the dispersion. Initially the surface of the particles has a lower modulus than the bulk of the particles due to the presence of the oligomer. As inter-diffusion occurs between the surfaces of the particles in the dispersion and the oligomers, the modulus of the film increased, thereby improving scrub properties.

Figure 18:
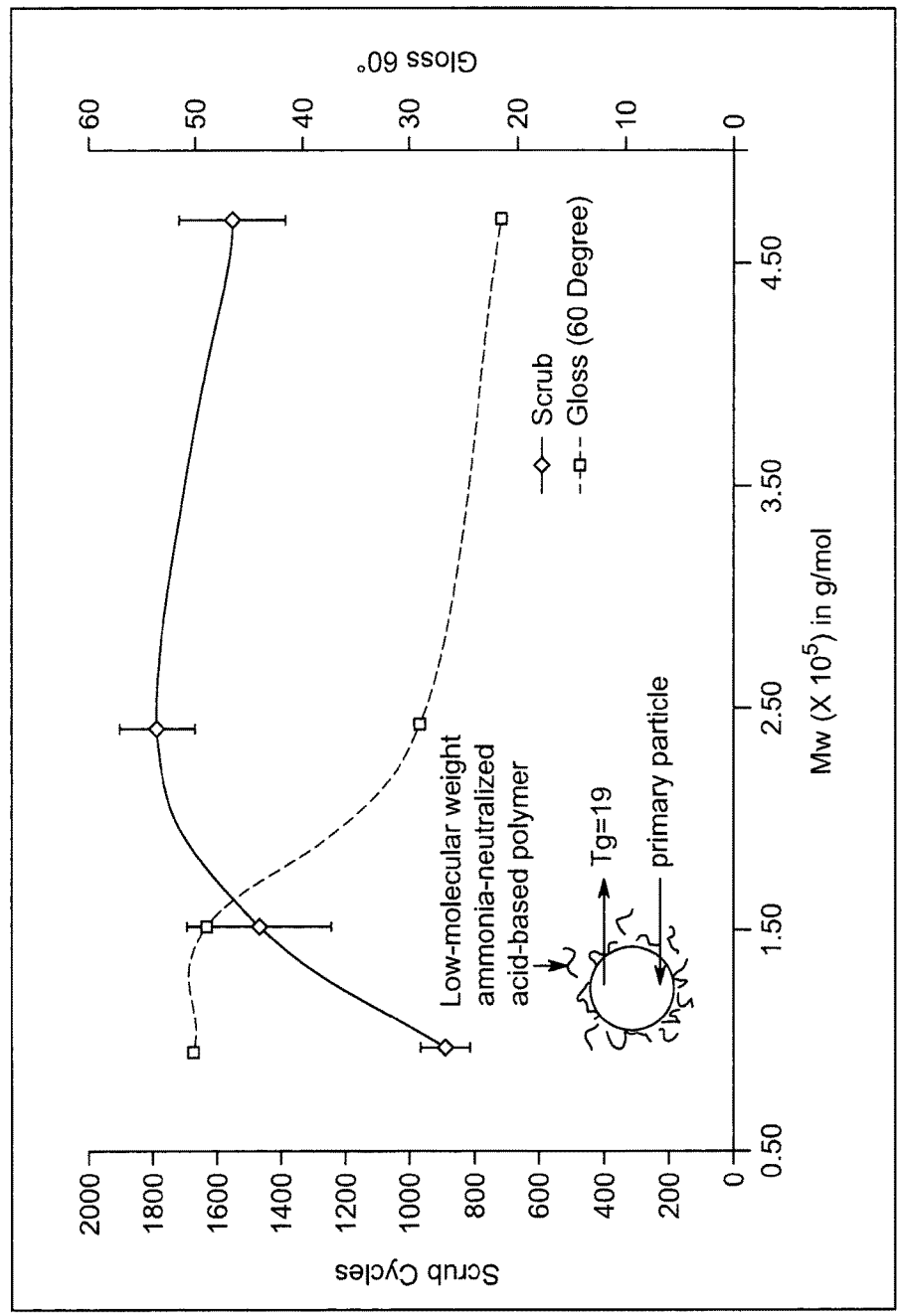
FIG. 18 is a line graph showing the optimum molecular weight of particles for scrub resistance and gloss in paint films.

Scrub resistance and gloss was also evaluated as a function of Mw. The data is shown in FIG. 18. Paints films were aged for 7 days in a constant temperature humidity room (25° C., 50% RH). The volume fraction of acid-base support oligomer was 22% and it contained 7% MAA (MMA/BA/MA/MAA/IOMPA; 13.9/53.2/22.8/7/2.5, Mn=5660 Da). From lower to higher Mw, the dispersions are RCD-D, RCD-G, RCD-H, and RCD-I. The MFT's of the dispersions are 0 to 1° C. The Tg's of cured films were ~14° C. The error bars represent a confidence limit of 95%. The data in FIG. 18 shows that the optimum $M_w$ of the primary particle is ~250,000 Da for scrub resistance; however, the best balance for scrub resistance and gloss is ~150,000 Da.

Figure 19:
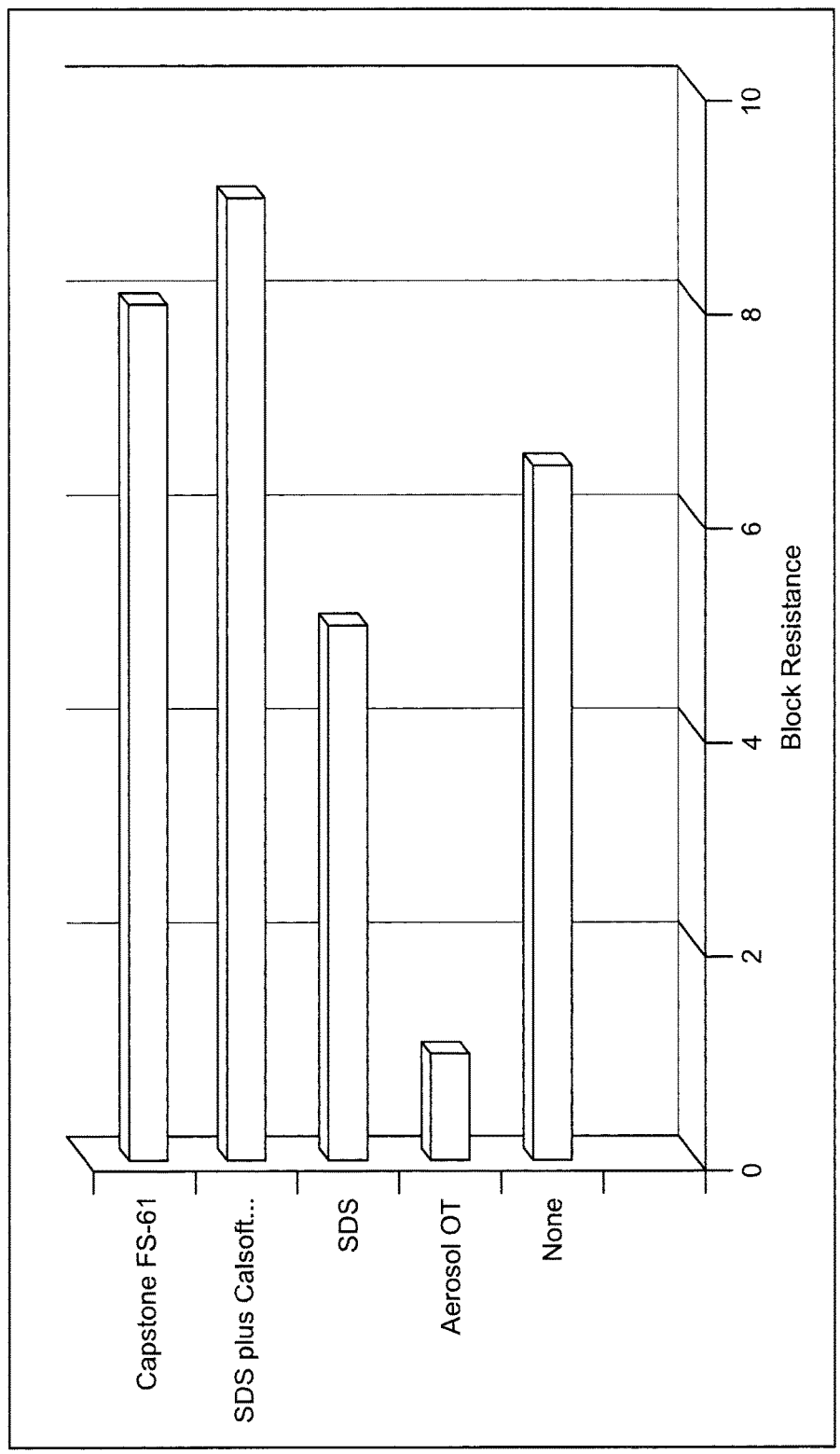
FIG. 19 is a bar graph showing the block resistance of films containing various surfactants and aged for 24 hours. The level of Aerosol OT and SDS in the latex films is 0.8%. The level of CALSOFT L-40 is 0.5%. The Capstone sample contains 0.8% Aerosol OT and 0.2% Capstone FS-61. The percent of surfactant is based on dry latex solids.

Effect of Surfactants on the Hot Block Properties of Architectural Paint Films:

The 50° C. block test was used to study the effect of surfactants on block resistance. The surfactants studied are di-(2-ethylhexyl) sodium sulfosuccinate (Aerosol OT or AOT), sodium dodecyl sulfate (SDS), Capstone FS-61, (a fluorinated surfactant sold by Dupont), and sodium 2-dodecylbenzenesulfonate (CAS #: 94187-92-5, sold as Calsoft L-40). The monomer composition and process for the RCD's used in this study are the same. The selection of surfactant used in the process (AOT or SDS) or the surfactant post added to the final RCD (Capstone or Calsoft L-40) can have a strong influence on block resistance. As shown in FIG. 19, removing the surfactant or using SDS (RCD-K) in place of AOT (RCD-E) increases the block resistance of architectural films relative to AOT. Addition of 0.2% Capstone FS-61 to a RCD (RCD-I) prepared using AOT or SDS as the surfactant improves block resistance of the paint.

SUMMARY

Ammonia carboxylate-based oligomers can lower the MFT of MMA/BA-based dispersions. The Fox-Flory equation and AFM data can be used to predict oligomers that are compatible with high-molecular weight MMA, BA-based dispersions. The 1/MFT versus volume fraction plots show the initial stages of film formation when high-molecular weight filming aids (oligomers) are used to generate the plots and should be interpreted in view of AFM images. Scrub resistance of semi-gloss architectural paints based on RCD technology increases as paint films age. This example shows through property improvement that film formation occurs at a reasonable rate at room temperature. This occurs presumably via inter-diffusion between polymer particles which increases as the paint films age and that the acid moieties from the oligomer reach a more uniform concentration throughout the matrix of the film. For RCD technology it is demonstrated that an optimum Mw exists for scrub resistance and gloss in the high-molecular weight portion of the RCD. Surfactant selection is important in obtaining adequate block resistance in architectural paints. The technology discussed in the report demonstrates an effective approach to Zero VOC coatings.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An aqueous dispersion, comprising:
    (a) a plurality of particles comprising a first copolymer derived from one or more ethylenically unsaturated monomers, wherein the first copolymer has a first number average molecular weight of 15,000 Da or greater and a first theoretical $T_g$ from 17° C. to 35° C.; and
    (b) a second water-soluble carboxy-functional copolymer derived from one or more carboxylic acid-containing monomers, wherein the second copolymer has a second number average molecular weight and a second theoretical $T_g$ from −10° C. to 10° C.;
    wherein the second copolymer has an acid number of from 50 to 250;
    wherein the second number average molecular weight is less than 30,000 Da; and wherein the second copolymer is at least partially neutralized with a volatile amine base, and wherein the second copolymer is completely soluble in water.

2. The aqueous dispersion of claim 1, wherein the second theoretical $T_g$ is at least 20° C. lower than the first theoretical $T_g$.

3. The aqueous dispersion of claim 1, wherein second number average molecular weight is from 4,000 Da to 8,000 Da.

4. The aqueous dispersion of claim 1, wherein the first copolymer is derived from one or more ethylenically-unsaturated monomers selected from the group consisting of styrene, butadiene, meth(acrylate) monomers, vinyl acetate, vinyl ester monomers and combinations thereof.

5. The aqueous dispersion of claim 1, wherein the first copolymer is derived from:
  (i) one or more (meth)acrylate monomers;
  (ii) one or more carboxylic acid-containing monomers;
  (iii) optionally one or more additional ethylenically-unsaturated monomers, excluding monomers (i) and (ii).

6. The aqueous dispersion of claim 1, wherein the first copolymer is derived from greater than 80% by weight of one or more (meth)acrylate monomers, based on the total weight of all of the monomers used to form the first copolymer.

7. The aqueous dispersion of claim 1, wherein the first copolymer is derived from greater than 0% by weight to 5% by weight of one or more carboxylic acid-containing monomers, based on the total weight of all of the monomers used to form the first copolymer.

8. The aqueous dispersion of claim 1, wherein the second copolymer is derived from:
  (i) one or more (meth)acrylate monomers;
  (ii) one or more carboxylic acid-containing monomers;
  (iii) optionally one or more additional ethylenically-unsaturated monomers, excluding monomers (i) and (ii).

9. The aqueous dispersion of claim 1, wherein the second copolymer is derived from greater than 50% to 95% by weight of one or more (meth)acrylate monomers, based on the total weight of all of the monomers used to form the second copolymer.

10. The aqueous dispersion of claim 1, wherein the second copolymer is derived from 10% by weight to 25% by weight of one or more carboxylic acid-containing monomers, based on the total weight of all of the monomers used to form the second copolymer.

11. The aqueous dispersion of claim 1, wherein the second copolymer is derived from:
  10-25% by weight methyl methacrylate;
  40-60% by weight butyl acrylate;
  0-20% by weight methyl acrylate;
  10-35% by weight acid monomers; and
  0-10% by weight molecular weight regulators.

12. The aqueous dispersion of claim 1, wherein the second copolymer is present in the composition in an amount of from 1% by weight and 20% by weight, based on the dry weight of the plurality of particles present in the composition.

13. The aqueous dispersion of claim 1, wherein the first copolymer and the second copolymer have calculated Hoy solubility parameters that satisfy the equation below)

$$((\delta_{p1})^2-(\delta_{p2})^2)^{1/2} < 3.90 \text{ MPa}^{1/2}$$

wherein $\delta_{p1}$ is the calculated Hoy solubility parameter of the first copolymer and $\delta_{p2}$ is the calculated Hoy solubility parameter of the second copolymer.

14. A coating formulation comprising the aqueous dispersion of claim 1 and one or more fillers.

15. The coating formulation of claim 14, wherein the coating formulation comprises less than or equal to 50 grams per liter of volatile organic compounds.

16. A method of producing a coating on a surface comprising:
  (a) applying to the surface the coating formulation of claim 14; and
  (b) allowing the formulation to dry to produce the coating.

17. The aqueous dispersion of claim 1, comprising multistage polymer particles having:
  (a) a first stage comprising the first copolymer; and
  (b) a second stage comprising the second water-soluble carboxy-functional copolymer.

* * * * *